(12) United States Patent
Yoshida

(10) Patent No.: US 11,762,253 B2
(45) Date of Patent: Sep. 19, 2023

(54) ACTIVE MATRIX SUBSTRATE AND DISPLAY DEVICE

(71) Applicant: Sharp Display Technology Corporation, Kameyama (JP)

(72) Inventor: Masahiro Yoshida, Kameyama (JP)

(73) Assignee: SHARP DISPLAY TECHNOLOGY CORPORATION, Kameyama (JP)

( * ) Notice: Subject to any disclaimer, the term of this patent is extended or adjusted under 35 U.S.C. 154(b) by 0 days.

(21) Appl. No.: 17/960,250

(22) Filed: Oct. 5, 2022

(65) Prior Publication Data

US 2023/0126425 A1 Apr. 27, 2023

(30) Foreign Application Priority Data

Oct. 26, 2021 (JP) ................................ 2021-174420

(51) Int. Cl.
  *G02F 1/1362* (2006.01)
  *G02F 1/1368* (2006.01)

(52) U.S. Cl.
  CPC ...... *G02F 1/136286* (2013.01); *G02F 1/1368* (2013.01); *G02F 1/136227* (2013.01)

(58) Field of Classification Search
  None
  See application file for complete search history.

(56) References Cited

U.S. PATENT DOCUMENTS

| | | | |
|---|---|---|---|
| 6,429,909 B1 | 8/2002 | Kim et al. | |
| 6,717,634 B2 | 4/2004 | Kim et al. | |
| 7,463,323 B2 | 12/2008 | Kim et al. | |
| 2002/0158996 A1* | 10/2002 | Kim | G02F 1/1309 349/47 |
| 2004/0141099 A1 | 7/2004 | Kim et al. | |
| 2010/0315377 A1* | 12/2010 | Chang | G06F 3/042 345/175 |
| 2011/0090144 A1* | 4/2011 | Rajamani | A63F 13/358 345/156 |
| 2011/0102359 A1* | 5/2011 | Chiba | G06F 3/0412 345/173 |
| 2019/0235331 A1* | 8/2019 | Li | G02F 1/136286 |
| 2019/0319046 A1* | 10/2019 | Tominaga | H01L 27/0296 |
| 2020/0033994 A1* | 1/2020 | Shin | G06F 3/0412 |
| 2020/0278585 A1* | 9/2020 | Kajita | G06F 3/0446 |

FOREIGN PATENT DOCUMENTS

JP 11-194369 A 7/1999

* cited by examiner

*Primary Examiner* — Sang V Nguyen
(74) *Attorney, Agent, or Firm* — KEATING & BENNETT, LLP

(57) ABSTRACT

An active matrix substrate includes first lines, a second line, third lines, a first connection electrode, and a second connection electrode. The first lines extend along a first direction and are arranged in a second direction and are portions of a first conductive film. The second line extends along the second direction and cross the first lines and is a portion of a second conductive film. The third lines extend along the second direction and overlap the second line and sandwich one first line and are portions of the first conductive film that differ from the portions configured as the first lines. The first connection electrode crosses the one first line and a second insulating film and is connected to the third lines sandwiching the one first line. The second connection electrode crosses another first line and is connected to the second line and one of the third lines.

15 Claims, 32 Drawing Sheets

ACTIVE MATRIX SUBSTRATE AND DISPLAY DEVICE

CROSS REFERENCE TO RELATED APPLICATION

This application claims priority from Japanese Patent Application No. 2021-174420 filed on Oct. 26, 2021. The entire contents of the priority application are incorporated herein by reference.

TECHNICAL FIELD

The present technology described herein relates to an active matrix substrate and a display device.

BACKGROUND

A liquid crystal display device including an active matrix substrate has been known. One example of such a liquid crystal display device includes a transparent insulating substrate, a gate line formed on the insulating substrate and extending in a first direction, an auxiliary correction line formed in a same layer as the gate line and made of a same substance as the gate line and extending in a second direction and including portions separated by the gate line, a first insulating layer covering the gate line and the auxiliary correction line, and a data line formed on the first insulating layer and extending along the auxiliary correction line in the second direction. In the liquid crystal display device, a transparent conductive connection pattern whose substance is same as that of the pixel electrode extends in an area including the auxiliary correction line, an intersection of the gate line and the data line, and another auxiliary correction line. The transparent conductive connection pattern is connected to ends of the auxiliary correction lines that project obliquely from a side surface of the data line via contact holes in the gate insulating film and the protection insulating film. The transparent conductive connection pattern is connected to the data line at an upper portion of the data line via the contact hole in the protection insulating film.

In such a liquid crystal display device, three contact holes including two contact holes via which the transparent conductive connection pattern is connected to the two auxiliary correction lines and a contact hole via which the transparent conductive connection pattern is connected to the data line are provided near the gate line. Since three contact holes are formed for every gate line, the number of contact holes is obtained by multiplying the number of gate lines by three. Therefore, the number of contact holes arranged in the second direction is too large. Alignment of liquid crystal molecules is likely to be disordered near the contact hole and this likely causes display errors. To obviate such errors, the light blocking area of the black matrix needs to be increased but this may lower the aperture ratio.

SUMMARY

The technology described herein was made in view of the above circumstances. An object is to reduce the number of connection points.

An active matrix substrate according to the technology described herein includes first lines, a first insulating film, a second line, at least two third lines, a second insulating film, a first connection electrode, and a second connection electrode. The first lines extend along a first direction and are arranged at intervals with respect to a second direction that crosses the first direction. The first lines are portions of a first conductive film. The first insulating film is included in an upper layer than the first conductive film. The second line extends along the second direction and crosses the first lines via the first insulating film. The second line is a portion of a second conductive film included in an upper layer than the first insulating film. The at least two third lines extend along the second direction and are disposed to overlap the second line via the first insulating film and sandwich one first line of the first lines with respect to the second direction. The at least two third lines are portions of the first conductive film that are different from the portions of the first conductive film configured as the first lines. The second insulating film is included in an upper layer than the second conductive film. The first connection electrode is included in an upper layer than the second insulating film and crosses the one first line via the first insulating film and the second insulating film. The first connection electrode is connected to the at least two third lines that sandwich the one first line. The second connection electrode is included in an upper layer than the second insulating film and crosses another first line of the first lines that is different from the one first line. The second connection electrode is connected to the second line and one of the at least two third lines.

According to the technology described herein, the number of connection points can be reduced.

DETAILED DESCRIPTION

First Embodiment

Figure 1:
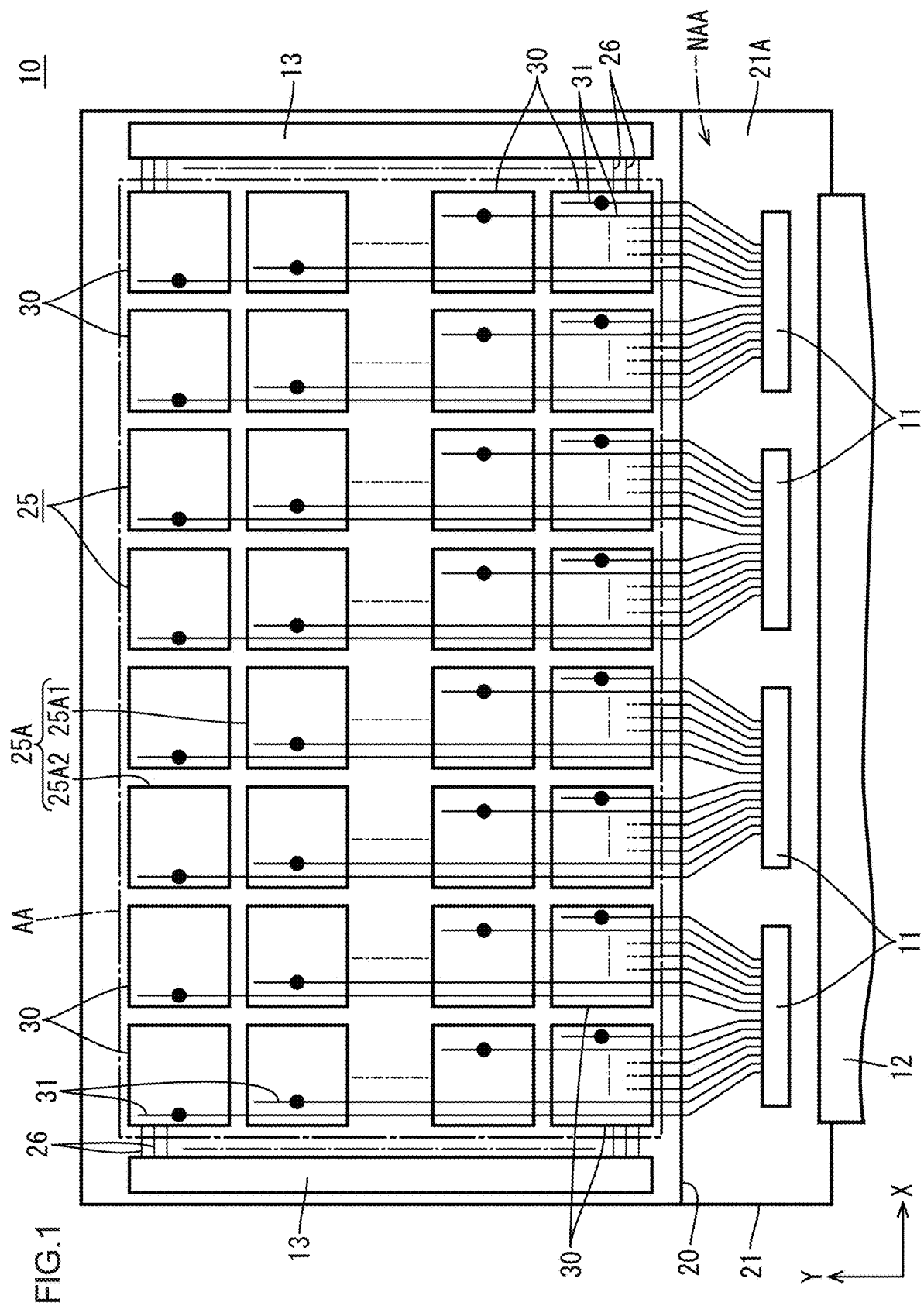
FIG. 1 is a plan view illustrating touch electrodes and touch lines of a liquid crystal panel according to a first embodiment.

A first embodiment will be described with reference to FIGS. 1 to 20. In this embodiment section, a liquid crystal panel 10 (a display device) with an image display function and a touch panel function (a position input function, a position detection function) will be described. X-axes, Y-axes, and Z-axes may be present in the drawings. The axes in each drawing correspond to the respective axes in other drawings. An upper side and a lower side in FIGS. 4, 5, 12, 15, 17, and 20 correspond to a front side and a back side of the liquid crystal panel 10, respectively.

FIG. 1 is a schematic plan view of the liquid crystal panel 10. As illustrated in FIG. 1, the liquid crystal panel 10 has a laterally long rectangular plan view shape as a whole. In the liquid crystal panel 10, a short-side direction, a long-side direction, and a plate thickness direction (a normal direction of a plate surface of each of substrates 20, 21) correspond to the Y-axis direction, the X-axis direction, and the Z-axis direction, respectively. In this embodiment, the Y-axis direction corresponds to a first direction and the X-axis direction corresponds to a second direction. The liquid crystal panel 10 is configured to display images with using light that is supplied by a backlight unit (a lighting device) that is disposed behind the liquid crystal panel 10. The backlight unit is disposed behind (on a back surface side of) the liquid crystal panel 10. The backlight unit includes light sources (such as LEDs) configured to emit light and optical members for converting the light from the light sources into planar light by applying optical effects to the light from the light sources.

As illustrated in FIG. 1, a middle section of a screen of the liquid crystal panel 10 is configured as a display area AA in which images are displayed (an area defined by a chain line in FIG. 1). An outer section in a frame shape surrounding the display area AA in the screen of the liquid crystal panel 10 is configured as a non-display area NAA in which the images are not displayed. The liquid crystal panel 10 includes a pair of substrates 20, 21 that are bonded to each other. One of the substrates on the front side (a front surface side) is a CF substrate 20 (an opposed substrate) and another one on the back side (a back surface side) is an array substrate 21 (an active matrix substrate). The CF substrate 20 and the array substrate 21 include substantially transparent glass substrates and various films formed in layers on inner sides of the glass substrates. Polarizing plates are attached to outer surfaces of the substrates 20 and 21.

As illustrated in FIG. 1, the CF substrate 20 has a short-side dimension that is smaller than a short-side dimension of the array substrate 21. The CF substrate 20 is bonded to the array substrate 21 such that one of the long sides of the CF substrate 20 is aligned with a corresponding one of the long sides of the array substrate 21. Therefore, a long side edge section including another one of the long sides of the array substrate 21 projects from another one of the long sides of the CF substrate 20. The long side edge section of the array substrate 21 including another one of the long sides of the array substrate 21 is a projecting section 21A that does not overlap the CF substrate 20. Drivers 11 (a signal supply section) and a flexible substrate 12 that are components for supplying various signals related to a display function and a touch panel function are mounted on the projecting section 21A. The driver 11 is an LSI chip including a driver circuit therein and mounted on the projecting section 21A of the array substrate 21 through the chip-on-glass (COG) technology. The driver 11 processes the signals transmitted via the flexible substrate 12. The drivers 11 are arranged on a long edge section of the array substrate 21, that is, on one end section of the array substrate 21 with respect to the Y-axis direction. The flexible substrate 12 includes a synthetic resin substrate (e.g., polyimide-based resin substrate) having insulating property and flexibility and multiple traces formed on the substrate. A first end of the flexible substrate 12 is connected to the array substrate 21 and a second end of the flexible substrate 12 is connected to a control circuit board (a signal source). The signals from the control circuit board are transmitted to the liquid crystal panel 10 via the flexible substrate 12. A pair of gate circuits 13 is disposed in the non-display area NAA of the array substrate 21 so as to sandwich the display area AA with respect to the X-axis direction. The gate circuits 13 are for supplying scan signals to gate lines 26, which will be described later, and are monolithically fabricated on the array substrate 21.

The liquid crystal panel 10 according to this embodiment has a display function for displaying images and a touch panel function for detecting positions of input performed by a user based on displayed images (input positions). The liquid crystal panel 10 includes an integrated touch panel pattern (with an in-cell technology) for exerting the touch panel function. The touch panel pattern uses so-called a projection type electrostatic capacitance method. A self-capacitance method is used for detection. As illustrated in FIG. 1, the touch panel pattern includes touch electrodes 30 (position detection electrodes) that are arranged in a matrix within the plate surface of the liquid crystal panel 10. The touch electrodes 30 are disposed in the display area AA of the liquid crystal panel 10. The display area AA of the liquid crystal panel 10 substantially corresponds to a touch area in which input positions are detectable (a position input area). The non-display area NAA substantially corresponds to a non-touch area in which input positions are not detectable (a non-position input area). When the user intends to input a position based on a displayed image that is displayed in the display area AA of the liquid crystal panel 10 and the user brings a position input body to the surface of the liquid crystal panel 10 (a display surface), the position input body and the touch electrode 30 form a capacitor. Examples of the position input body include the user's finger, which is a conductive member, and a touch pen that is used by the user. A capacitance measured at the touch electrode 30 close to the position input body changes as the position input body approaches the touch electrode 30 and is different from a capacitance at the touch electrodes 30 farther from the position input body. Based on the difference in capacitance, a detection circuit detects the input position.

As illustrated in FIG. 1, the touch electrodes 30 are arranged in the X-axis direction (the first direction) and the Y-axis direction (the second direction) within the display area AA at intervals. For example, eighty touch electrodes 30 are arranged in the X-axis direction and fifty touch electrodes 30 arranged in the Y-axis direction. Each of the touch electrodes 30 has a rectangular shape in the plan view with edges in some millimeters. The touch electrodes 30 are significantly larger than pixels PX, which will be described later, in the plan view. Namely, each touch electrode 30 is disposed in an area that straddles tens of or hundreds of the pixels PX in the X-axis direction and the Y-axis direction. The specific dimension of each edge of the touch electrode 30 and the specific number of touch electrodes 30 within the touch area can be altered from the above-described ones where appropriate. A specific configuration of the touch electrode 30 will be further described later.

As illustrated in FIG. 1, touch lines 31 (a second line, a position detection line, a main touch line) on the liquid crystal panel 10 are selectively connected to the touch electrodes 30. The touch lines 31 extend substantially along the Y-axis direction. One ends of the touch lines 31 are connected to the driver 11 in the non-display area NAA and another ends of the touch lines 31 are connected to the specific touch electrodes 30 among the touch electrodes 30 arranged in the Y-axis direction in the display area AA. The touch lines 31 extend from the driver 11 to the respective target touch electrodes 30. Namely, a Y-axis direction length of each touch line 31 is limited to an area from the driver 11 to a corresponding target touch electrode 30. The touch lines 31 are not disposed on the touch electrodes 30 that are disposed on an opposite side from the driver 11 (an upper side in FIG. 1) with respect to the corresponding target touch electrodes 30. Depending on the number of touch lines 31, one single touch line 31 may be connected to one touch electrode 30 but multiple touch lines 31 may be connected to one touch electrode 30. The number of touch lines 31 connected to one touch electrode 30 may be altered depending on the position of each touch electrode 30. In such a configuration, the number of touch lines 31 connected to each of the touch electrodes 30 far away from the driver 11 is preferably greater than the number of touch lines 31 connected to each of the touch electrodes close to the driver 11; however, the number of touch lines 31 may not be necessarily determined as described before. In FIG. 1, connection points of the touch electrodes 30 and the touch lines 31 are indicated by large black points. The touch lines 31 are connected to a detection circuit. The detection circuit may be included in the driver 11 or provided outside the liquid crystal panel 10 via the flexible substrate 12. A specific configuration of the touch lines 31 will be described later.

Figure 2:
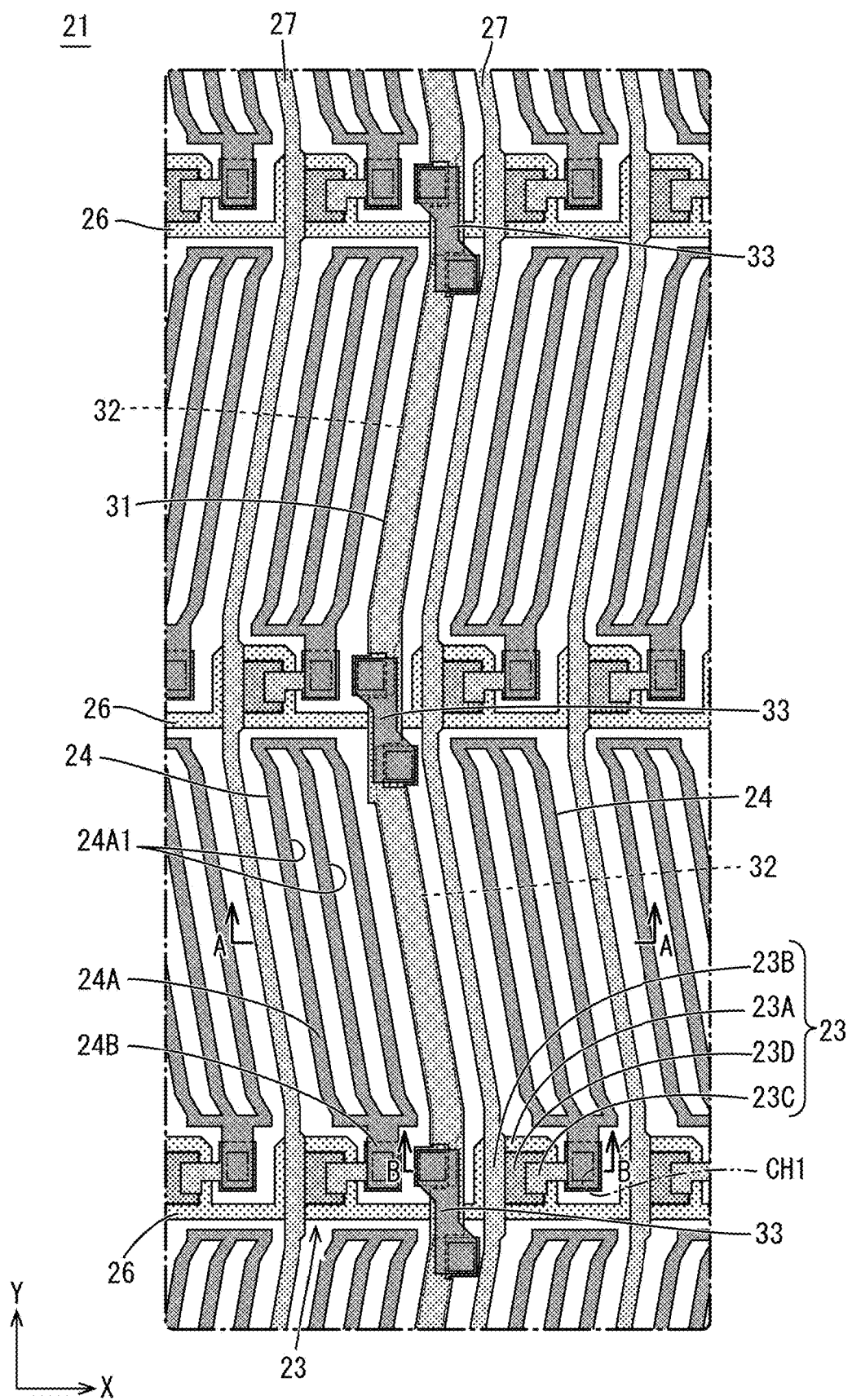
FIG. 2 is a plan view illustrating a pixel arrangement on a portion of an array substrate included in the liquid crystal panel.
Figure 3:
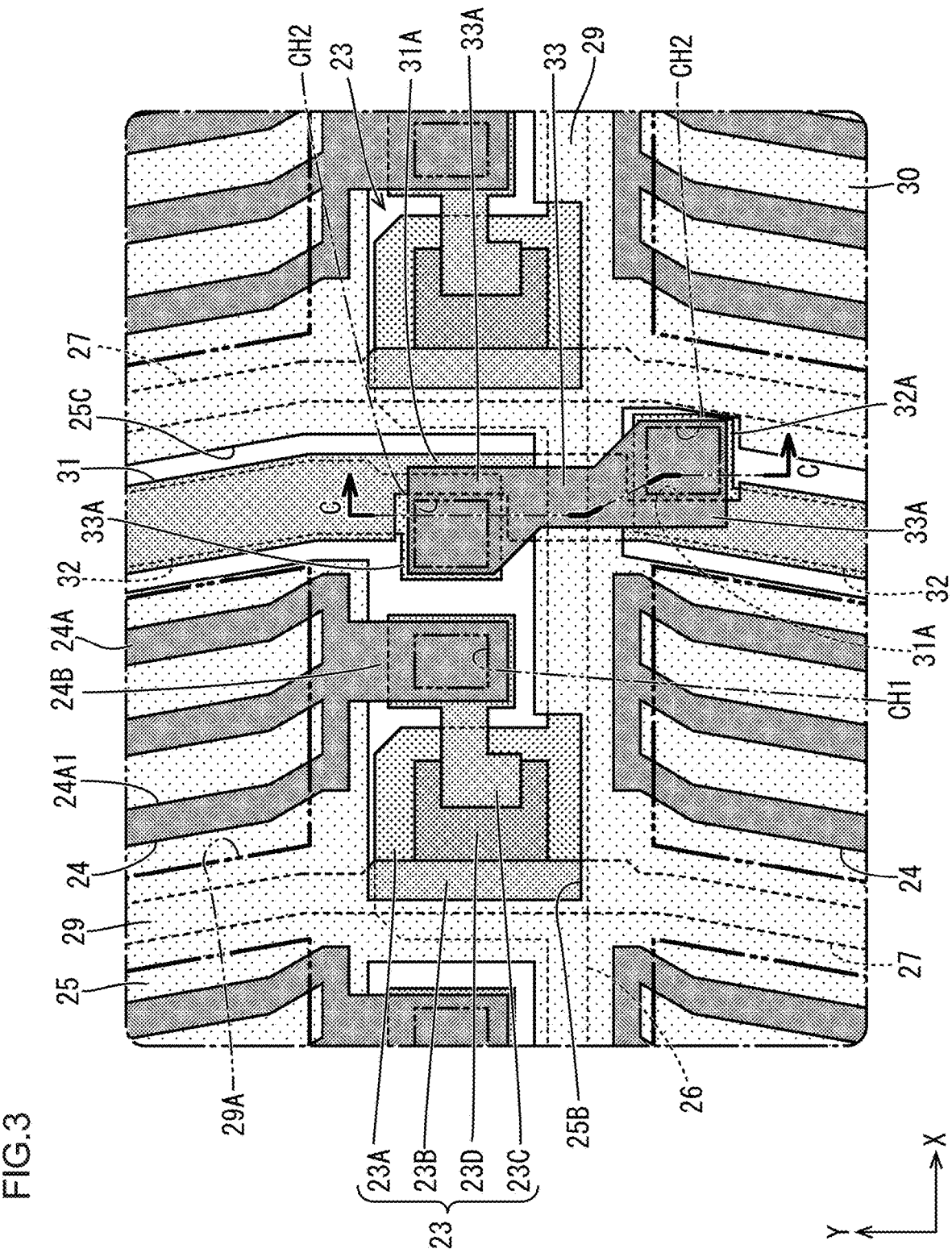
FIG. 3 is a magnified plan view illustrating a portion of the array substrate near a TFT and a first connection electrode.

FIG. 2 is a plan view illustrating the display area AA of the array substrate 21 of the liquid crystal panel 10. FIG. 3 is a magnified plan view illustrating a portion of the display area AA near a TFT 23, which will be described later. In FIGS. 2 and 3, films F1, F3, F4, and F8 included in the array substrate 21 are illustrated with different shading patterns. A first transparent electrode film F6 and other components are not illustrated in FIGS. 2 and 3. A light blocking portion 29 included in the CF substrate 20 is not illustrated in FIG. 2. As illustrated in FIGS. 2 and 3, thin film transistors (TFTs) 23 (switching components) and pixel electrodes 24 are arranged in an area of an inner surface of the array substrate 21 in the display area AA. The TFTs 23 and the pixel electrodes 24 are arranged at intervals in a matrix along the X-axis direction and the Y-axis direction. The TFTs 23 and the pixel electrodes 24 are not disposed in the non-display area NAA. The pixel electrode 24 is included in the pixel PX that is a unit for display. Gate lines 26 (first lines, scanning lines) and source lines 27 (image lines) are routed perpendicular to each other (with crossing) to surround the TFTs 23 and the pixel electrodes 24. The gate lines 26 extend substantially straight in a direction substantially along the X-axis direction with changing a line width thereof. The source lines 27 extend in a direction substantially along the Y-axis direction with being curved in a zig-zag form. The gate lines 26 are connected to gate electrodes 23A (first electrodes) of the TFTs 23 that are arranged in the X-axis direction. The gate lines 26 are arranged at intervals in the Y-axis direction. The source lines 27 are connected to source electrodes 23B (second electrodes) of the TFTs 23 that are arranged in the Y-axis direction. The source lines 27 are arranged at intervals in the X-axis direction. The TFTs 23 are driven based on signals supplied to the gate lines 26 and the source lines 27. Through the driving of the TFTs 23, application of potentials to the pixel electrodes 24 that are connected to drain electrodes 23C (third electrodes) of the TFTs 23 is controlled. With reference to FIGS. 2 and 3, the TFT 23 is arranged on the right side of the target source line 27 that is connected to the TFT 23 and on the lower side of the target pixel electrode 24 that is connected to the TFT 23.

The light blocking portion 29 (an inter-pixel light blocking portion, a black matrix), which is indicated by a thick two-dot chain line in FIG. 3, is included in the CF substrate 20. As illustrated in FIG. 3, the light blocking portion 29 is formed in a grid pattern in a plan view to separate the adjacent pixel electrodes 24. The light blocking portion 29 includes pixel openings 29A at positions overlapping large areas of the pixel electrodes 24. The pixel openings 29A pass light therethrough for display at the pixel electrodes 24 and allow the light to exit outside the liquid crystal panel 10. The light blocking portion 29 overlaps at least the gate lines 26 and the source lines 27 included in the array substrate 21 in a plan view.

Figure 4:
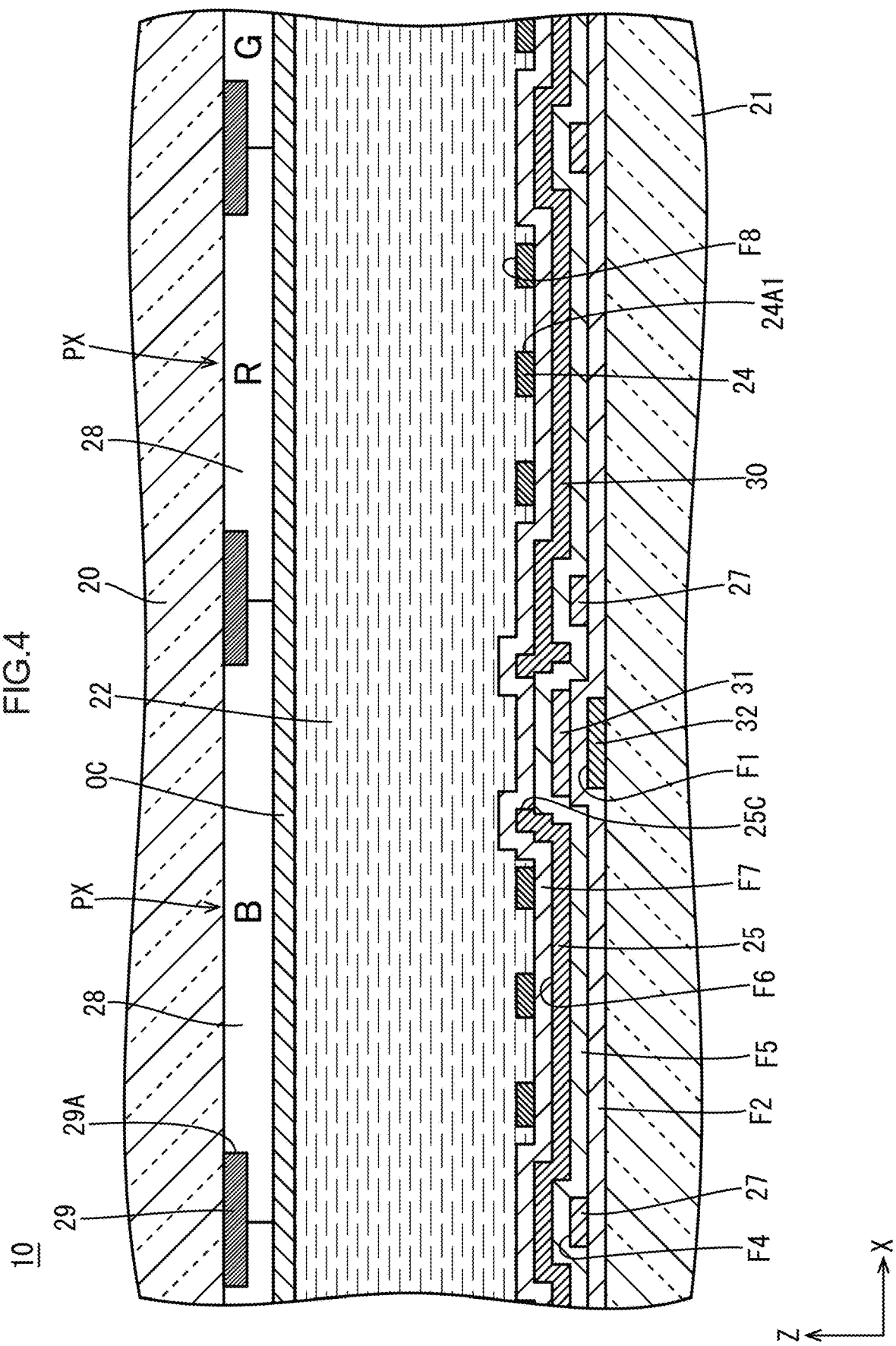
FIG. 4 is a cross-sectional view of the liquid crystal panel along line A-A in FIG. 2.

FIG. 4 is a cross-sectional view (along A-A line in FIG. 2) of a middle section of the pixel PX of the liquid crystal panel 10. As illustrated in FIG. 4, the liquid crystal panel 10 includes a liquid crystal layer 22 (a medium layer) between the substrates 20 and 21. The liquid crystal layer 22 includes liquid crystal molecules having optical characteristics that vary according to application of electric field. Color filters 28 that exhibit three different colors of red (R), green (G), and blue (B) are disposed in the display area AA on the inner surface side of the CF substrate 20 of the liquid crystal panel 10. The color filters 28 that exhibit different colors are repeatedly arranged along the gate lines 26 (in the X-axis direction) and the color filters 28 are arranged in lines along the source lines 27 (substantially the Y-axis direction). Namely, the color filters 28 are arranged in a stripe as a whole. The color filters 28 are arranged to overlap the pixel electrodes 24 of the array substrate 21, respectively, in a plan view. The color filters 28 that are adjacent to each other in the X-axis direction and exhibit different colors each other are arranged such that a boundary therebetween (a color boundary) overlaps the source line 27 and the light blocking portion 29. In the liquid crystal panel 10, the R, the G, and the B color filters 28 that are arranged along the X-axis direction and three pixel electrodes 24 opposed to the respective color filters 28 compose three colors of pixels PX. In the liquid crystal panel 10, the R, the G, and the B pixels PX that are adjacent to one another in the X-axis direction form a display pixel and the display pixels are configured to perform color display in predefined tones. The arrangement pitch of the pixels PX in the Y-axis direction is about three times as that of the pixels PX in the X-axis direction. The light blocking portion 29 is disposed to define each of the adjacent color filters 28. An overcoat film OC is disposed in a solid manner on a substantially entire area of the CF substrate 20 for planarization. The overcoat film OC is included in a layer upper than (closer to the liquid crystal layer 22) the color filter 28. Alignment films for orienting the liquid crystal molecules in the liquid crystal layer 22 are formed on, respectively, innermost surfaces (a most upper layer) of the substrates 20 and 21 in contact with the liquid crystal layer 22.

Next, a common electrode 25 will be described with reference to FIG. 4. As illustrated in FIG. 4, the common electrode 25 is formed to overlap all the pixel electrodes 24 in a layer lower than the pixel electrodes 24 in the display area AA on an inner surface side of the array substrate 21. The common electrode 25 spreads over substantially an entire area of the display area AA. The common electrode 25 is supplied with a common potential signal (a reference potential signal) of a common potential (a reference potential) except for a period (a sensing period) while a touch signal (a position detection signal) being supplied and detecting an input position input by a position inputter. When a potential difference occurs between the pixel electrode 24 and the common electrode 25 that overlap each other as the pixel electrode 24 is charged, a fringe electric field (an oblique electric field) including a component in a direction normal to a plate surface of the array substrate 21 is created between an opening edge of a slit 24A1 of the pixel electrode 24 and the common electrode 25 in addition to a component in a direction along the plate surface of the array substrate 21. With the fringe electric field, orientations of the liquid crystal molecules included in the liquid crystal layer 22 can be controlled. Namely, the liquid crystal panel 10 according to this embodiment operates in the fringe field switching (FFS) mode.

As illustrated in FIG. 1, the touch electrodes 30 are portions of the common electrode 25. The common electrode 25 includes a slit 25A for separating the adjacent touch electrodes 30 from each other. The slit 25A has a substantially grid plan view shape as a whole. The slit 25A includes first slits 25A1 that extend and cross an entire length of the common electrode 25 in the X-axis direction and second slits 25A2 that extend and cross an entire length of the common electrode 25 in the Y-axis direction. The common electrode 25 is divided into sections in a grid in a plan view by the slit 25A and the sections are configured as the touch electrodes 30 that are electrically independent from one another. The touch electrodes 30 that are arranged along the Y-axis direction are separated by the first slits 25A1 and the touch electrodes 30 that are arranged along the X-axis direction are separated by the second slits 25A2. The touch lines 31 that are connected to the touch electrodes 30 are supplied with common potential signals related to the display function and touch signals related to the touch function (position detection signals) from the driver 11 at different timing. A period while the touch lines 31 are supplied with the common potential signals from the driver 11 is a display period and a period while the touch lines 31 are supplied with the touch signals from the driver 11 is a sensing period (a position detection period). The common potential signals are transmitted to all the touch lines 31 at the same timing (for the display period) and thus all the touch electrodes 30 have the reference potential based on the common potential signals and function as the common electrode 25.

Figure 5:
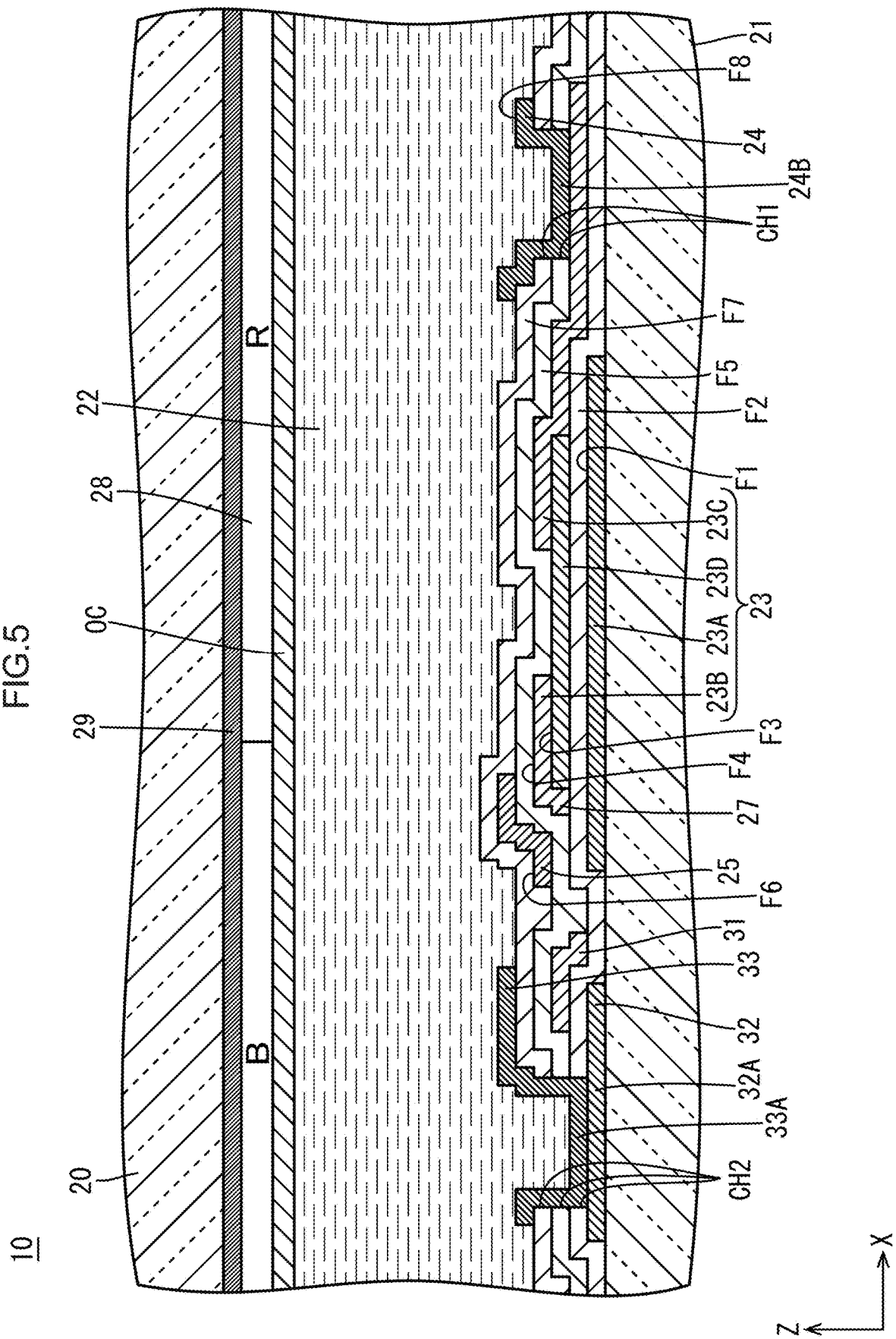
FIG. 5 is a cross-sectional view of the liquid crystal panel along line B-B in FIG. 2.

Films disposed on top of each other on the inner surface side of the array substrate 21 will be described with reference to FIG. 5. FIG. 5 is a cross-sectional view (along line B-B in FIG. 2) illustrating a section of the liquid crystal panel 10 near the TFT 23. As illustrated in FIG. 5, a first metal film F1 (a first conductive film), a gate insulating film F2 (a first insulating film), a semiconductor film F3, a second metal film F4 (a second conductive film), a first interlayer insulating film F5 (a second insulating film), a first transparent electrode film F6 (a third conductive film), a second interlayer insulating film F7 (a third insulating film), a second transparent electrode film F8 (a fourth conductive film) are stacked on each other on an inner surface side of the array substrate 21 in this sequence from a lower layer (from the glass substrate). The first metal film F1 and the second metal film F4 may be a single-layer film made of one kind of metal or a multilayer film made of a material containing different kinds of metals, or an alloy. Examples of the metals include copper, titanium, aluminum, molybdenum, and tungsten. The first metal film F1 and the second metal film F4 have conductivity and light blocking properties. The gate lines 26 and the gate electrodes 23A of the TFTs 23 are portions of the first metal film F1. The source lines 27, the source electrodes 23B and the drain electrodes 23C of the TFTs 23, and the touch lines 31 are portions of the second metal film F4. The semiconductor film F3 is a thin film made of an oxide semiconductor material or amorphous silicon. Channels 23D in the TFTs 23 are portions of the semiconductor film F3. The first transparent electrode film F6 and the second transparent electrode film F8 are made of a transparent electrode material (e.g., indium tin oxide (ITO) and indium zinc oxide (IZO)). The touch electrodes 30 (the common electrode 25) are portions of the first transparent electrode film F6. The pixel electrodes 24 are portions of the second transparent electrode film F8.

The gate insulating film F2, the first interlayer insulating film F5, and the second interlayer insulating film F7 are made of an inorganic material such as silicon nitride ($SiN_x$) and silicon oxide ($SiO_2$). The gate insulating film F2 insulates the first metal film F1 in the lower layer from the semiconductor film F3 and the second metal film F4 in the upper layer. For example, the gate lines 26, which are portions of the first metal film F1, and the source lines 27, which are portions of the second metal film F4, are insulated from each other by the gate insulating film F2 at intersections of the gate lines 26 and the source lines 27. The gate electrodes 23A, which are portions of the first metal film F1, and the channels 23D, which are portions of the semiconductor film F3, are insulated from each other by the gate insulating film F2 at overlapping portions of the gate electrodes 23A and the channels 23D. The first interlayer insulating film F5 insulates the semiconductor film F3 and the second metal film F4 in the lower layer from the first transparent electrode film F6 in the upper layer. For example, the source lines 27 and the touch lines 31, which are portions of the second metal film F4, and the common electrode 25 (the touch electrodes 30), which is a portion of the first transparent electrode film F6, are insulated from each other by the first interlayer insulating film F5 at overlapping portions of the common electrode 25 and each of the source lines 27 and the touch lines 31. The second interlayer insulating film F7 insulates the first transparent electrode film F6 in the lower layer from the second transparent electrode film F8 in the upper layer. For example, the common electrode 25 (the touch electrodes 30), which is a portion of the first transparent electrode film F6, and the pixel electrodes 24, which are portions of the second transparent electrode film F8, are insulated from each other by the second interlayer insulating film F7 at overlapping portions of the common electrode 25 and the pixel electrodes 24. The first interlayer insulating film F5 and the second interlayer insulating film F7 include first contact holes CH1 at positions at which the drain electrodes 23C, which are portions of the second metal film F4, overlap portions of the pixel electrodes 24 (pixel connection portions 24B), which are portions of the second transparent electrode film F8. Therefore, the drain electrodes 23C are connected to the pixel electrodes 24 via the first contact holes CH1.

Figure 6:
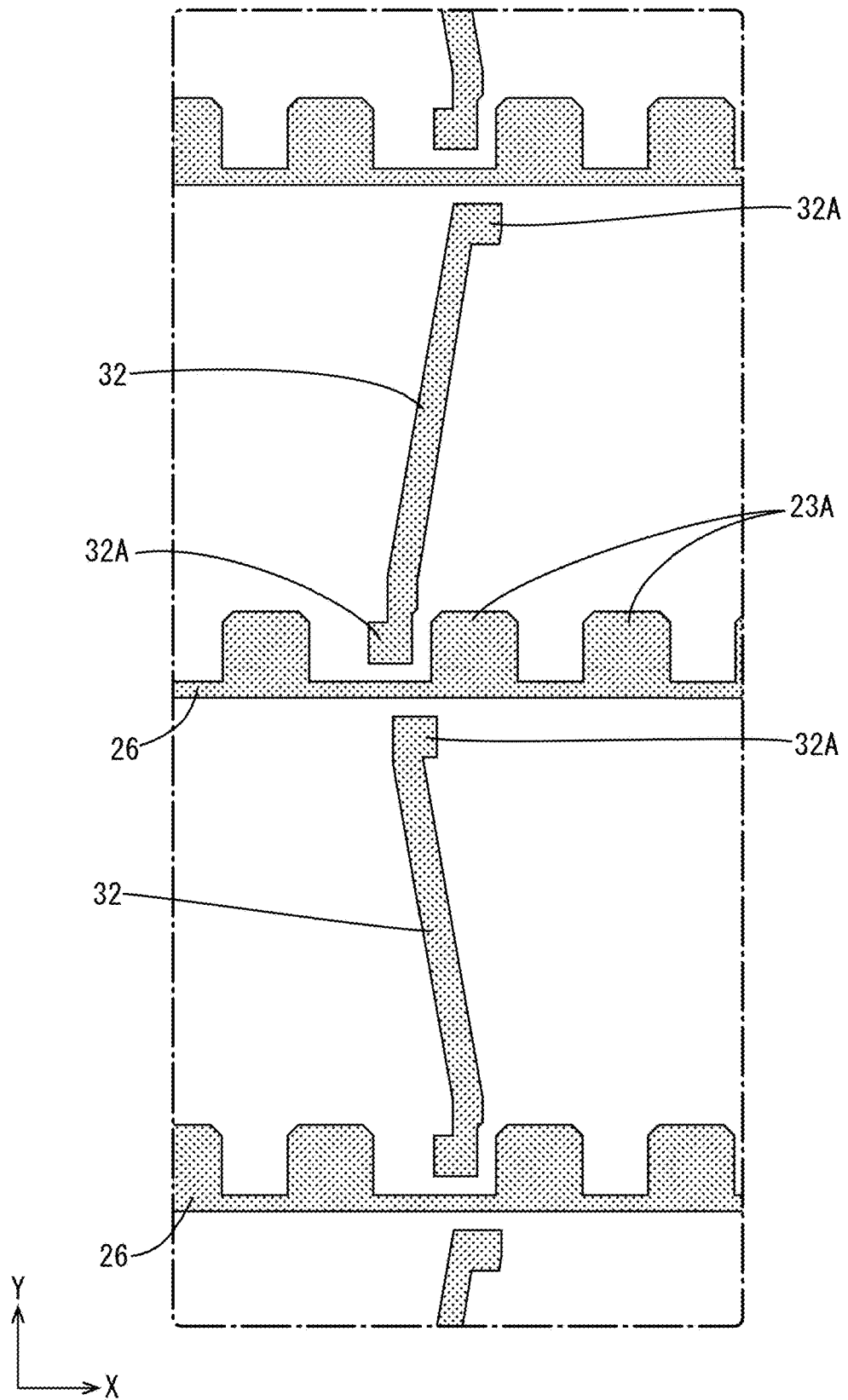
FIG. 6 is a plan view illustrating a pattern of a first metal film on the portion of the array substrate same as the portion in FIG. 2.
Figure 7:
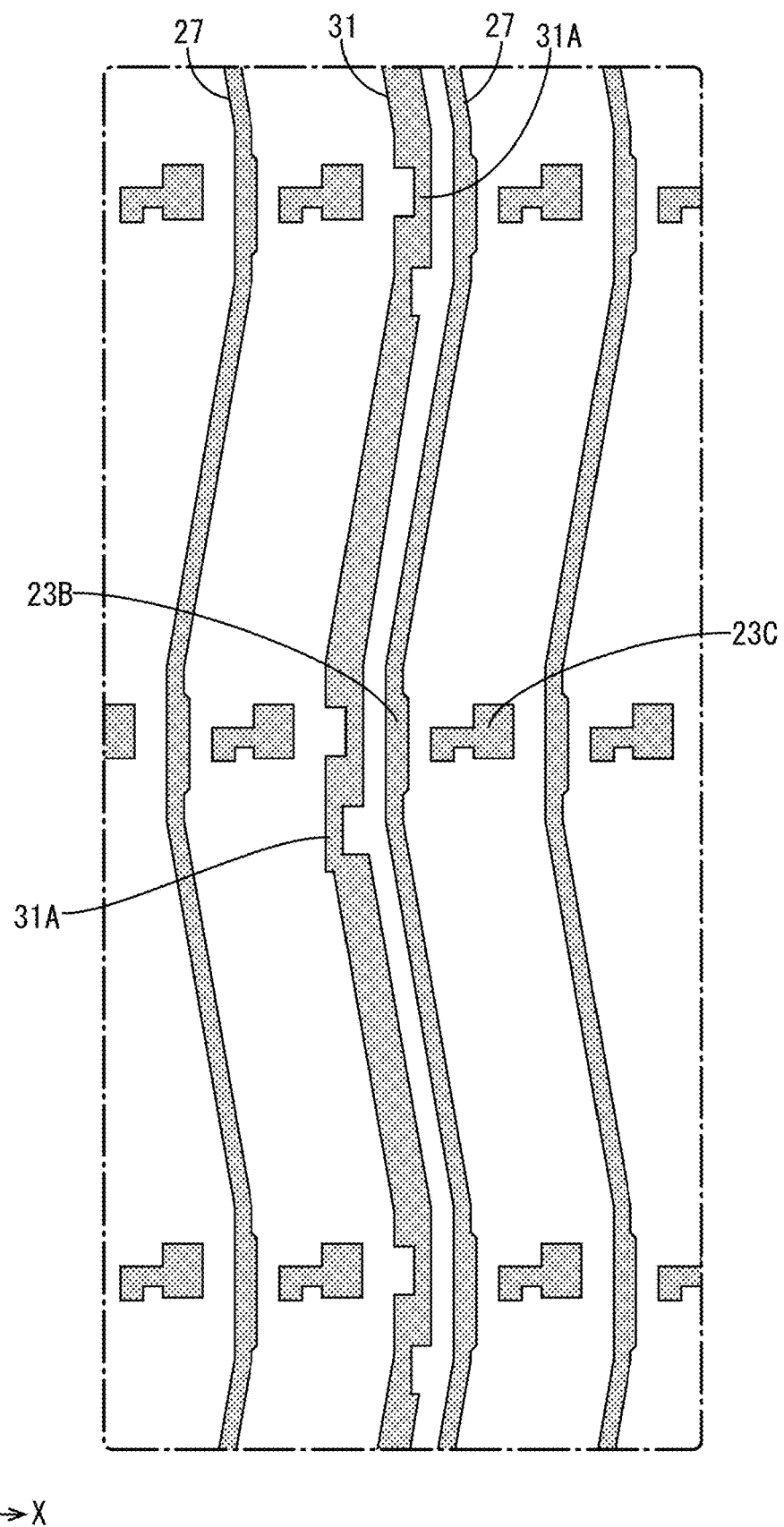
FIG. 7 is a plan view illustrating a pattern of a second metal film on the portion of the array substrate same as the portion in FIG. 2.

Next, a configuration of the TFTs 23 will be described with reference to FIGS. 5 to 7. FIG. 6 is a plan view of the same portion as that in FIG. 2 and illustrating a pattern of the first metal film F1 (such as the gate lines 26). FIG. 7 is a plan view of the same portion as that in FIG. 2 and illustrating a pattern of the second metal film F4 (such as the source lines 27). As illustrated in FIGS. 5 and 6, the TFTs 23 include the gate electrodes 23A that branch off from the gate lines 26. The gate electrodes 23A are sections of the gate lines 26 crossing the source lines 27. The gate electrodes 23A are wide sections of the gate lines 26. The gate electrodes 23A are provided for driving the TFTs 23 based on the scan signals supplied to the gate lines 26. As illustrated in FIGS. 5 and 7, the TFTs 23 are disposed on a right side with respect to the target source line 27 to be connected. The TFTs 23 include the source electrodes 23B. The source electrodes 23B are sections of the target source line 27 to be connected (crossing the gate lines 26). The source electrodes 23B are wide sections of the source lines 27. The source electrodes 23B are at one ends of the TFTs 23 with respect to the X-axis direction (at left ends in FIGS. 5 and 7). Almost entire area of each source electrode 23B overlaps a portion of each gate electrode 23A and thus the source electrodes 23B are connected to the channels 23D. The TFTs 23 include the drain electrodes 23C. The drain electrodes 23C are disposed at distances from the source electrodes 23B. Namely, the drain electrodes 23C are at another ends of the TFTs 23 with respect to the X-axis direction (at right ends in FIGS. 5 and 7). The drain electrodes 23C overlap portions of the gate electrodes 23A and the portions of the drain electrodes 23C overlapping the gate electrodes 23A are connected to the channels 23D. Ends of the drain electrodes 23C opposite from the portions connected to the channels 23D are connected to the pixel electrodes 24.

As illustrated in FIG. 5, the TFTs 23 include the channels 23D (semiconductor sections). The channels 23D overlap the gate electrodes 23A via the gate insulating film F2. The channels 23D overlap portions of the gate electrodes 23A and extend in the X-axis direction. First ends and second ends of the channels 23D are connected to the source electrodes 23B and the drain electrodes 23C, respectively. When the TFTs 23 turn on based on the scan signals supplied to the gate electrodes 23A, image signals (data signals) supplied to the source lines 27 are transmitted from the source electrodes 23B to the drain electrodes 23C via the channels 23D, which are portions of the semiconductor film F3. As a result, the pixel electrodes 24 are charged at potentials based on the image signals.

Figure 8:
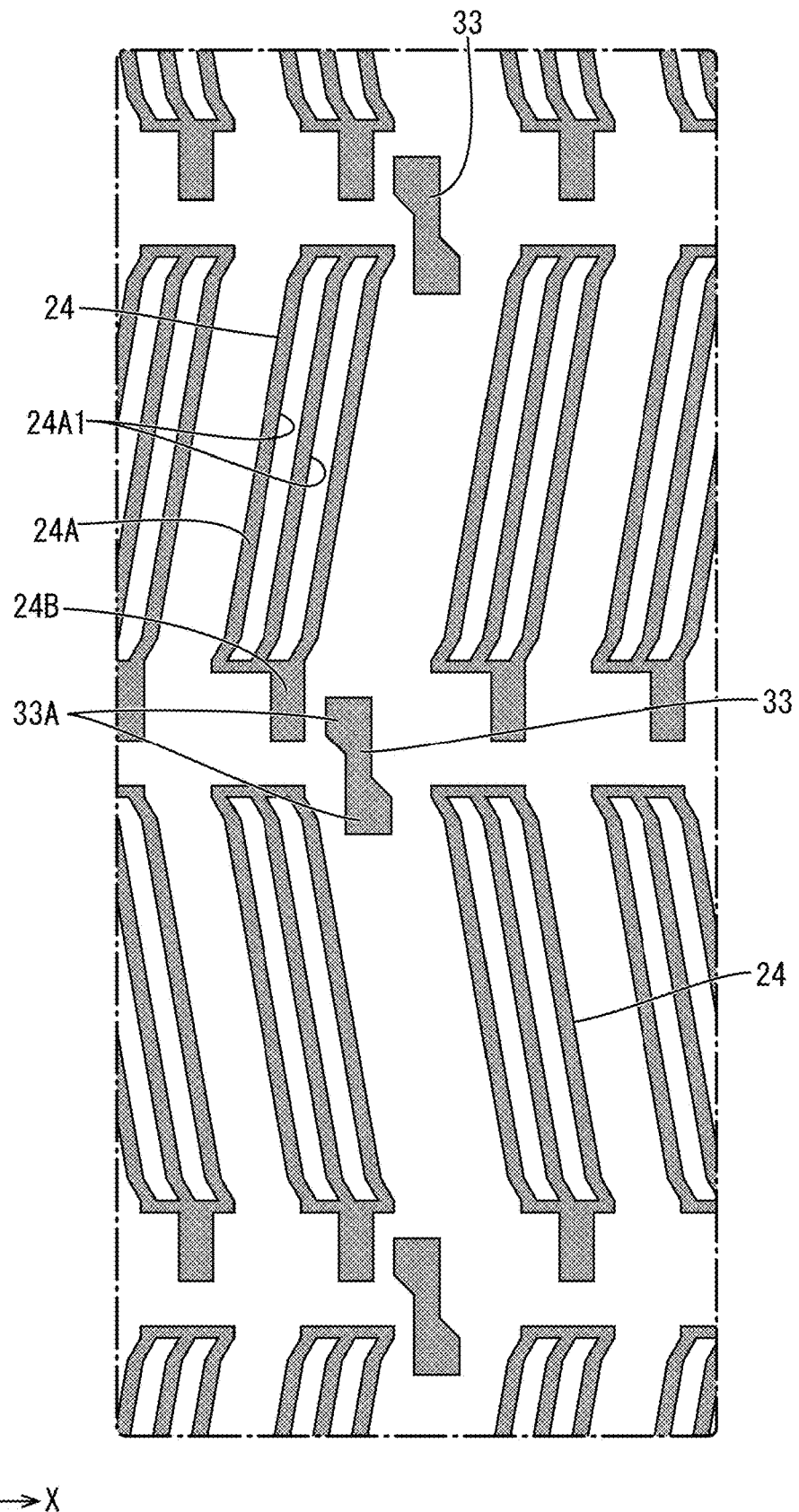
FIG. 8 is a plan view illustrating a pattern of a second transparent electrode film on the portion of the array substrate same as the portion in FIG. 2.

A configuration of the pixel electrodes 24 will be described with reference to FIGS. 2, 5, and 8. FIG. 8 is a plan view of the portion same as that in FIG. 2 and illustrating a pattern of the second transparent electrode film F8 (the pixel electrodes 24). As illustrated in FIGS. 2 and 8, the pixel electrodes 24 include pixel electrode bodies 24A each of which has a vertically elongated parallelogram shape in a plan view. The pixel electrode bodies 24A have long sides that are slightly inclined along the source lines 27. The long edges of the pixel electrode bodies 24A are slightly inclined with respect to the Y-axis direction. Specifically, the long edges of the pixel electrode bodies 24A extend diagonally with respect to the Y-axis direction. Each of the pixel electrode bodies 24A includes the slits 24A1 (two slits 24A1 in FIGS. 2 and 8) that extend along the long edges thereof (substantially the Y-axis direction). The specific number, the specific shape, and the specific forming area of the slits 24A1 may be altered from the configuration in the drawings where appropriate. The pixel electrodes 24 include pixel connection portions 24B that project from the pixel electrode bodies 24A in the Y-axis direction. The pixel connection portions 24B project downward from the pixel electrode bodies 24A in FIGS. 2 and 8 and overlap portions of the drain electrodes 23C. As illustrated in FIGS. 5, the pixel connection portions 24B are connected to the drain electrodes 23C via the first contact holes CH1.

Figure 9:
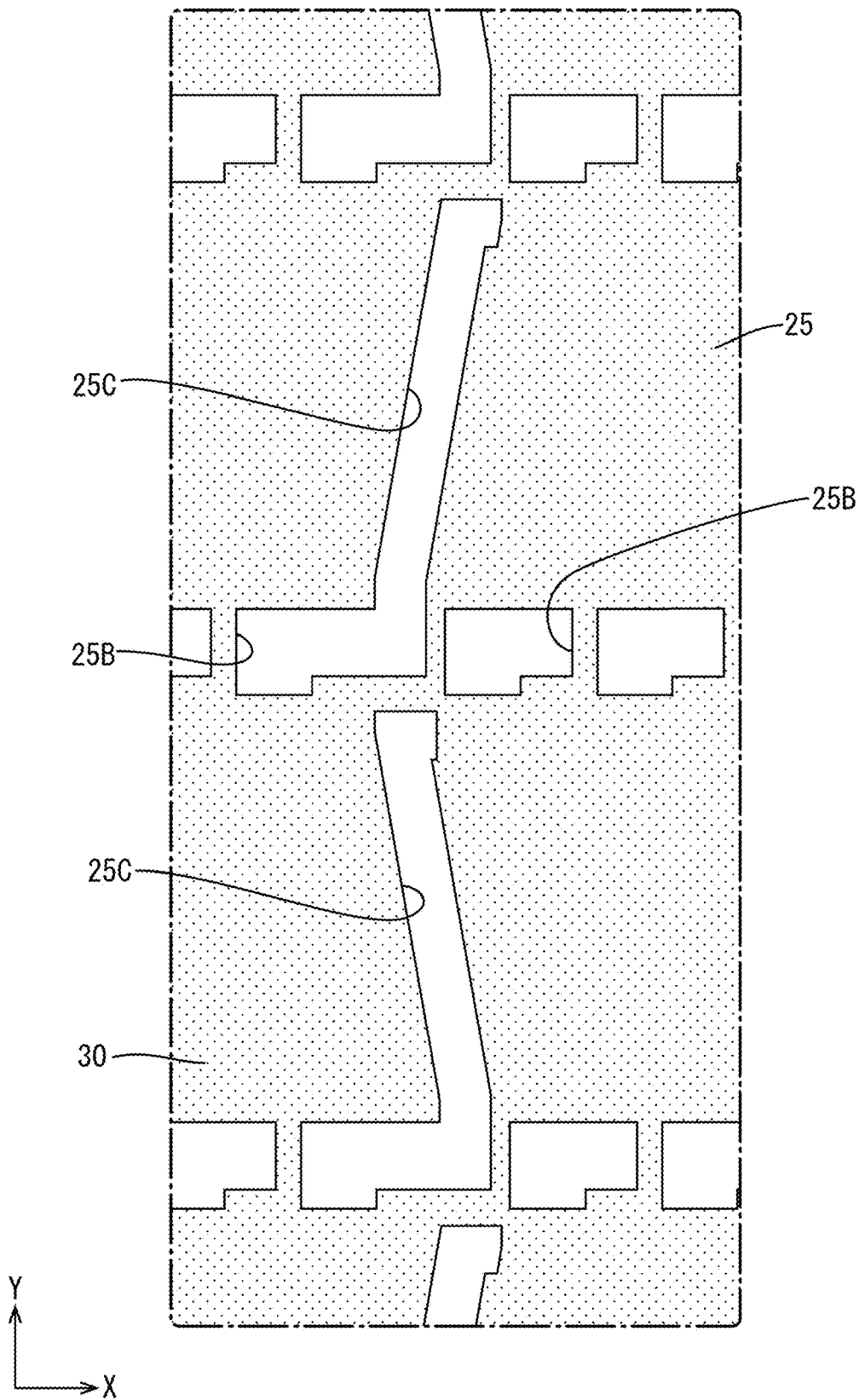
FIG. 9 is a plan view illustrating a pattern of a first transparent electrode film on the portion of the array substrate same as the portion in FIG. 2.

A configuration of the common electrode 25 will be described with reference to FIG. 9. FIG. 9 is a plan view of the portion same as that in FIG. 2 and illustrates a pattern of the first transparent electrode film F6 (the common electrode 25). As illustrated in FIG. 9, the common electrode 25 is disposed in a solid manner on a substantially entire area of the display area AA. The common electrode 25 includes openings 25B, 25C in addition to the slits 25A. The common electrode 25 includes the first openings 25B in portions overlapping the TFTs 23 (particularly, the first contact holes CH). The first openings 25B have a laterally-long rectangular shape. The common electrode 25 includes second openings 25C in portions overlapping most portions of touch lines 31 (portions except for the portions of the touch lines 31 crossing the gate lines 26). The second openings 25C are vertically-long slits that extend along the touch lines 31. A length of the second openings 25C is slightly smaller than a distance between the two gate lines 26 that sandwich the pixel electrode 24 in the Y-axis direction (an arrangement interval of the pixels PX in the Y-axis direction). With the second openings 25C, parasitic capacitances that may appear between the touch lines 31 and the touch electrodes 30 that are not connected to the touch lines 31 can be reduced. This improves detection sensitivity of detecting an input position inputted by a finger. Since the slits 25A are not included in the portion illustrated in FIG. 9, the slits 25A are not illustrated in FIG. 9.

Next, a configuration of the touch lines 31 will be described with reference to FIGS. 2, 4, and 7. As illustrated in FIGS. 2, 4, and 7, the touch lines 31 are portions of the second metal film F4 portions of which are the source lines 27. Namely, the portions of the second metal film F4 that are configured as the touch lines 31 differ from the portions of the second metal film F4 that are configured as the source lines 27, the source electrodes 23B, and the drain electrodes 23C. The touch line 31 is arranged adjacent to the source line 27 at an interval in the X-axis direction. The interval between the touch line 31 and the source line 27 is smaller than a short side dimension of the pixel electrode 24 and is about a line width of a most portion of the touch line 31. This prevents short circuit between the source line 27 and the touch line 31 that are the portions of the second metal film F4. The arrangement of the touch lines 31 in the X-axis direction will be described in detail. For example, a first touch line 31 is disposed adjacent to a first source line 27 on an opposite side (the left side in FIGS. 4 and 7) from a first TFT 23 that is connected to the first source line 27 (on the right side in FIGS. 4 and 7). The first touch line 31 is disposed away from the first source line 27 at an interval. The first touch line 31 is disposed between the first source line 27, which is adjacent to the first touch line 31 at the interval, and a second TFT 23 and a second pixel electrode 24, which are disposed on an opposite side from the first TFT 23 connected to the first source line 27 with respect to the first touch line 31. The first touch line 31 is sandwiched between the first source line 27 and each of the second TFT 23 and the second pixel electrode 24, which are disposed on an opposite side from the first TFT 23 connected to the first source line 27, in the X-axis direction. The second TFT 23 and the second pixel electrode 24 that sandwich the first touch line 31 with the first source line 27 in the X-axis direction are connected to a second source line 27 that is disposed adjacent to the first touch line 31 at an interval and different from the first source line 27. The first source line 27, which is disposed adjacent to the first touch line 31 at the interval, is sandwiched between the first pixel electrode 24, which is connected to the first touch line 31 via the first TFT 23, and the first touch line 31 with respect to the X-axis direction.

The touch lines 31 extend in a direction substantially along the Y-axis direction with being curved in a zig-zag form similarly to the source lines 27. The touchlines 31 extend along the source lines 27 with keeping a constant distance from the adjacent source lines 27, respectively. The touch lines 31 have a constant width in most sections thereof but have sections having a small width. The width of the most sections of the touch lines 31 is greater than the width of the source lines 27.

The touch lines 31 are not disposed adjacent to all the source lines 27 but are disposed adjacent to specific source lines 27. Specifically, the touch line 31 is provided for every three source lines 27. Therefore, the number of touch lines 31 is about one third of the number of source lines 27. The interval between two adjacent touch lines 31 in the X-axis direction is about a dimension of three pixels PX. The number and the interval of the touch lines 31 may be altered as appropriate.

Figure 10:
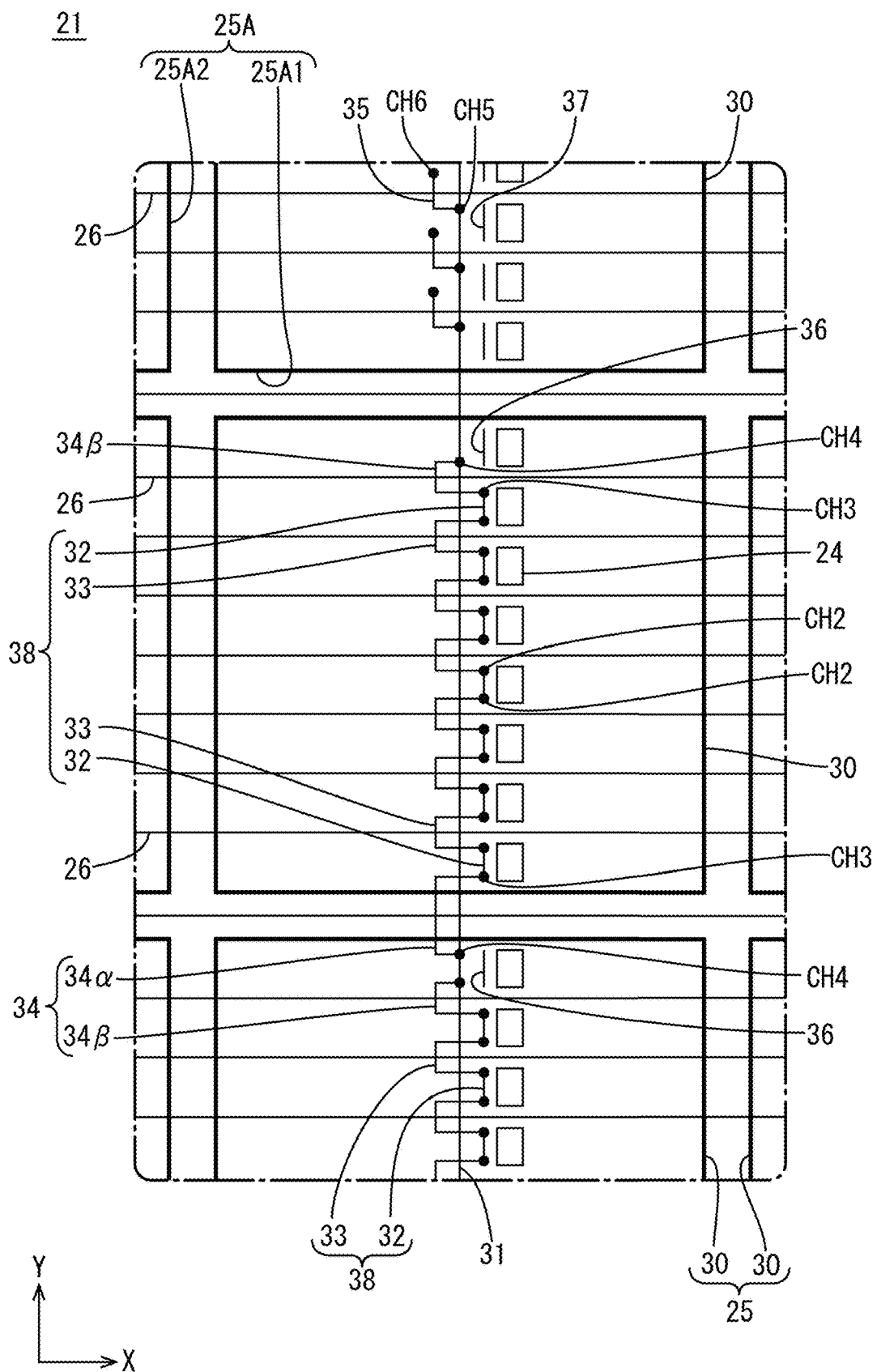
FIG. 10 is a plan view schematically illustrating connection configurations of touch electrodes, touch lines, and sub lines included in the array substrate.

As illustrated in FIG. 10, the array substrate 21 according to this embodiment includes sub lines 32 (third lines) that are electrically connected to the touch line 31. FIG. 10 is a plan view schematically illustrating a connection configuration of the touch electrodes 30, the touch lines 31, and the sub lines 32 on the array substrate 21. In FIG. 10, connection points (contact holes CH2 to CH6) of the touch electrodes 30, the touch lines 31, and the sub lines 32 are illustrated with black large points. One touch line 31 and the sub lines 32 connected to the one touch line 31 are illustrated in FIG. 10. In FIG. 10, the touch lines 31 and the sub lines 32 are illustrated with simple lines without describing specific planar shapes thereof and the pixel electrodes 24 are illustrated with simple rectangular shapes without describing specific outlines thereof. The numbers of gate lines 26, the pixel electrodes 24, and the sub lines 32 are smaller than the numbers in actual products in FIG. 10 for easy understanding of the configuration.

The sub lines 32 will be described in detail with reference to FIGS. 4, 6, and 10. As illustrated in FIGS. 4, 6, and 10, the sub lines 32 are portions of the first metal film F1 that includes portions configured as the gate lines 26. Namely, the portions of the first metal film F1 configured as the sub lines 32 are different from the portions of the first metal film F1 configured as the gate lines 26 and the gate electrodes 23A. The sub lines 32 substantially extend in a direction along the Y-axis direction (an extending direction in which the touch lines 31 extend). Most sections of the sub lines 32 are disposed to overlap the touch lines 31, respectively, in a plan view. Therefore, the gate insulating film F2 is disposed between the sub lines 32, which are portions of the first metal film F1, and the touch lines 31, which are portions of the second metal film F4. This keeps insulation between the touch lines 31 and the sub lines 32 (refer to FIG. 4). With such a configuration, compared to a configuration in which the lines 31, 32 do not overlap, a larger area including no lines can be obtained and the aperture ratio of the pixels PX is preferably increased. As illustrated in FIG. 6, the sub lines 32 are disposed to sandwich the gate lines 26 in the Y-axis direction. The sub lines 32 are away from the adjacent gate lines 26 at an interval in the Y-axis direction. The interval is about the dimension of the line width of the gate line 26. According to such a configuration, a short circuit is less likely to occur between the gate lines 26 and the sub lines 32 that are portions of the first metal film F1. The sub lines 32 and the gate lines 26 are arranged alternately in the Y-axis direction.

As illustrated in FIG. 10, the array substrate 21 includes first connection electrodes 33 (first connection portions). The first connection electrode 33 connects two sub lines 32 that are disposed to sandwich the gate line 26. The array substrate 21 further includes second connection electrodes 34 (second connection portions). The second connection electrode 34 connects the touchline 31 and the sub line 32 that is connected to the first connection electrode 33. The array substrate 21 further includes third connection electrodes 35 (third connection portions). The third connection electrode 35 connects the touch electrode 30 and the touch line 31. In FIG. 10, the first connection electrodes 33, the second connection electrodes 34, and the third connection electrodes 35 are illustrated but specific planar shapes thereof are not illustrated. One touch line 31, the sub lines 32 connected to the one touch line 31, and the first connection electrodes 33, the second connection electrodes 34, and the third connection electrodes 35 that are related to the one touch line 31 and the sub lines 32 are illustrated in FIG. 10.

Figure 11:
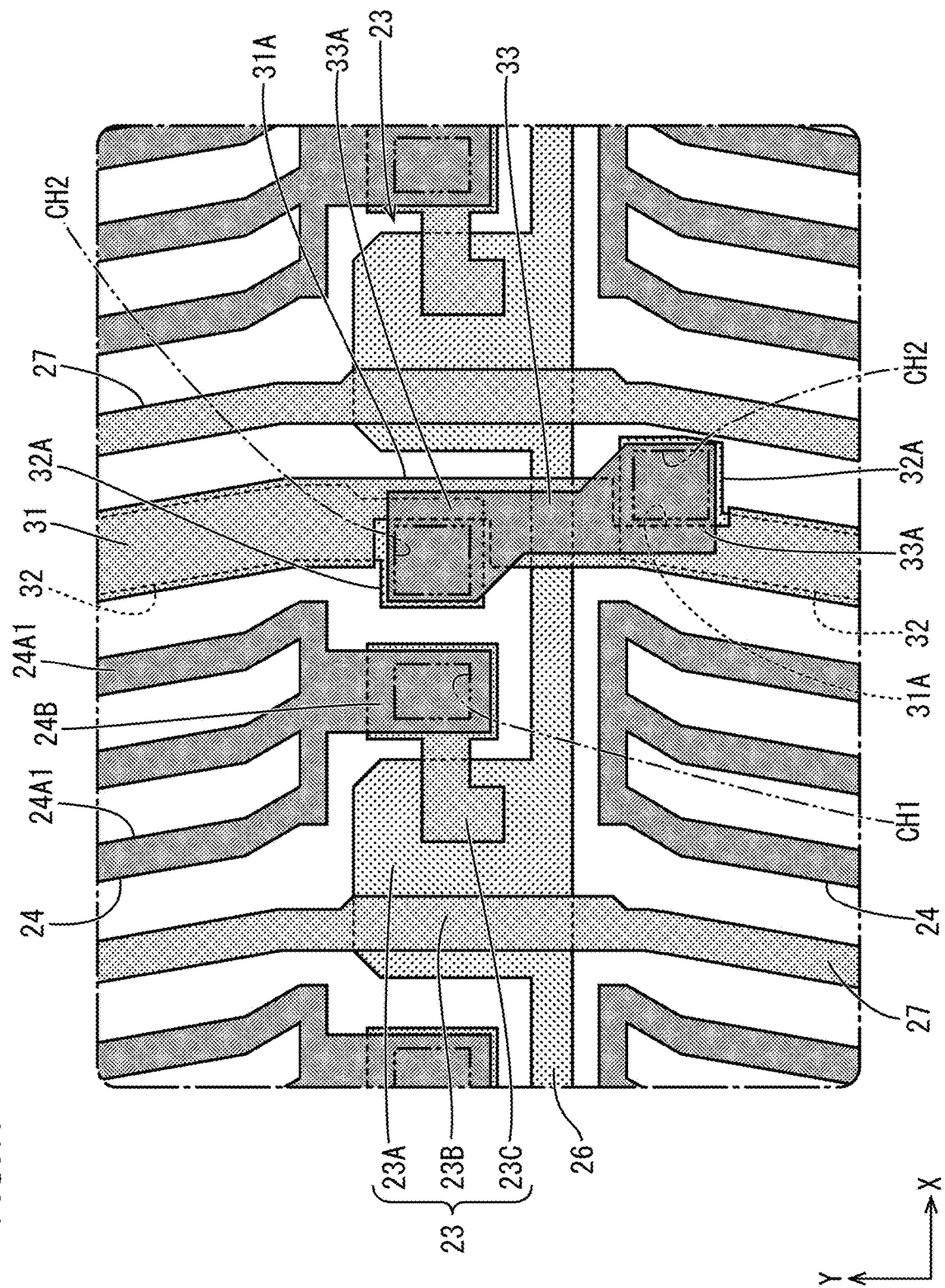
FIG. 11 is a plan view illustrating patterns of the first metal film, the second metal film, and a second transparent electrode film on the portion of the array substrate same as the portion in FIG. 3.
Figure 12:
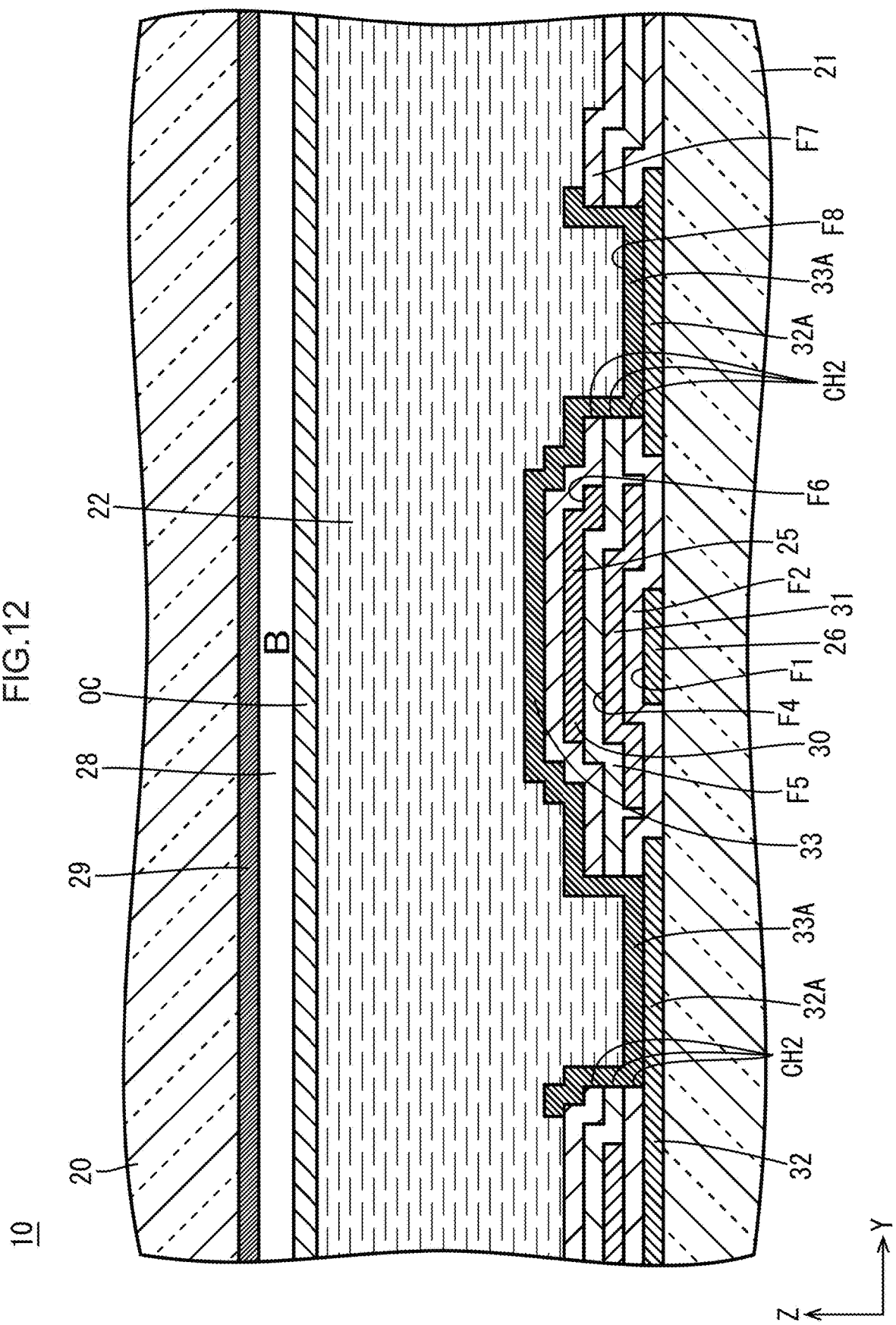
FIG. 12 is a cross-sectional view of the liquid crystal panel along line C-C in FIG. 3.

The first connection electrodes 33 will be described in detail with reference to FIGS. 8, 10, 11, and 12. FIG. 11 is a plan view illustrating the portion same as that in FIG. 3 and illustrating a pattern of the first metal film F1 (the gate lines 26 and the sub lines 32) and a pattern of the second transparent electrode film F8 (the pixel electrodes 24 and the first connection electrodes 33). In FIG. 11, the first metal film F1, the second metal film F4, and the second transparent electrode film F8 are illustrated with different shading patterns. FIG. 12 is a cross-sectional view along line C-C in FIG. 3. As illustrated in FIGS. 8, 10, and 11, the first connection electrodes 33 are portions of the second transparent electrode film F8, which includes portions configured as the pixel electrodes 24 and is included in the upper layer than the first interlayer insulating film F5. Namely, the portions of the second transparent electrode film F8 configured as the first connection electrodes 33 are different from the portions of the second transparent electrode film F8 configured as the pixel electrodes 24. The first connection electrodes 33 extend along the Y-axis direction. The first connection electrodes 33 are disposed to cross some of the gate lines 26 that are disposed in the display area AA. As illustrated in FIG. 12, the first interlayer insulating film F5 and the second interlayer insulating film F7 are disposed between the first connection electrodes 33 and the gate lines 26 that cross each other. This keeps insulation between the first connection electrodes 33 and the gate lines 26 that cross each other.

As illustrated in FIG. 11, the first connection electrode 33 includes wide sections at two ends with respect to the Y-axis direction. Two wide sections of the first connection electrode 33 are configured as two contact portions 33A that are connected to target two sub lines 32, respectively. The two contact portions 33A do not overlap the gate line 26 but overlap end portions of the target two sub lines 32, respectively. The sub lines 32 (first sub lines), which are connected to the first connection electrode 33, overlap the touch line 31 in most sections thereof (a middle section) except for the end portions in the Y-axis direction. However, the end portions of the sub lines 32 do not overlap the touch line 31. The end portions of the sub lines 32 are wide sections and the wide sections are configured as contact portions 32A that are connected to the first connection electrodes 33, respectively. The touch lines 31 include sections that are adjacent to the contact portions 32A of the sub lines 32 and the sections are narrow sections 31A having a small width. With such a configuration, the touch lines 31 do not overlap the contact portions 32A of the sub lines 32. As illustrated in FIG. 12, the gate insulating film F2, the first interlayer insulating film F5, and the second interlayer insulating film F7 include second contact holes CH2 at the positions overlapping the contact portions 33A of the first connection electrodes 33 and the contact portions 32A of the sub lines 32. The contact portions 32A and the contact portions 33A are connected to each other via the second contact holes CH2.

Figure 13:
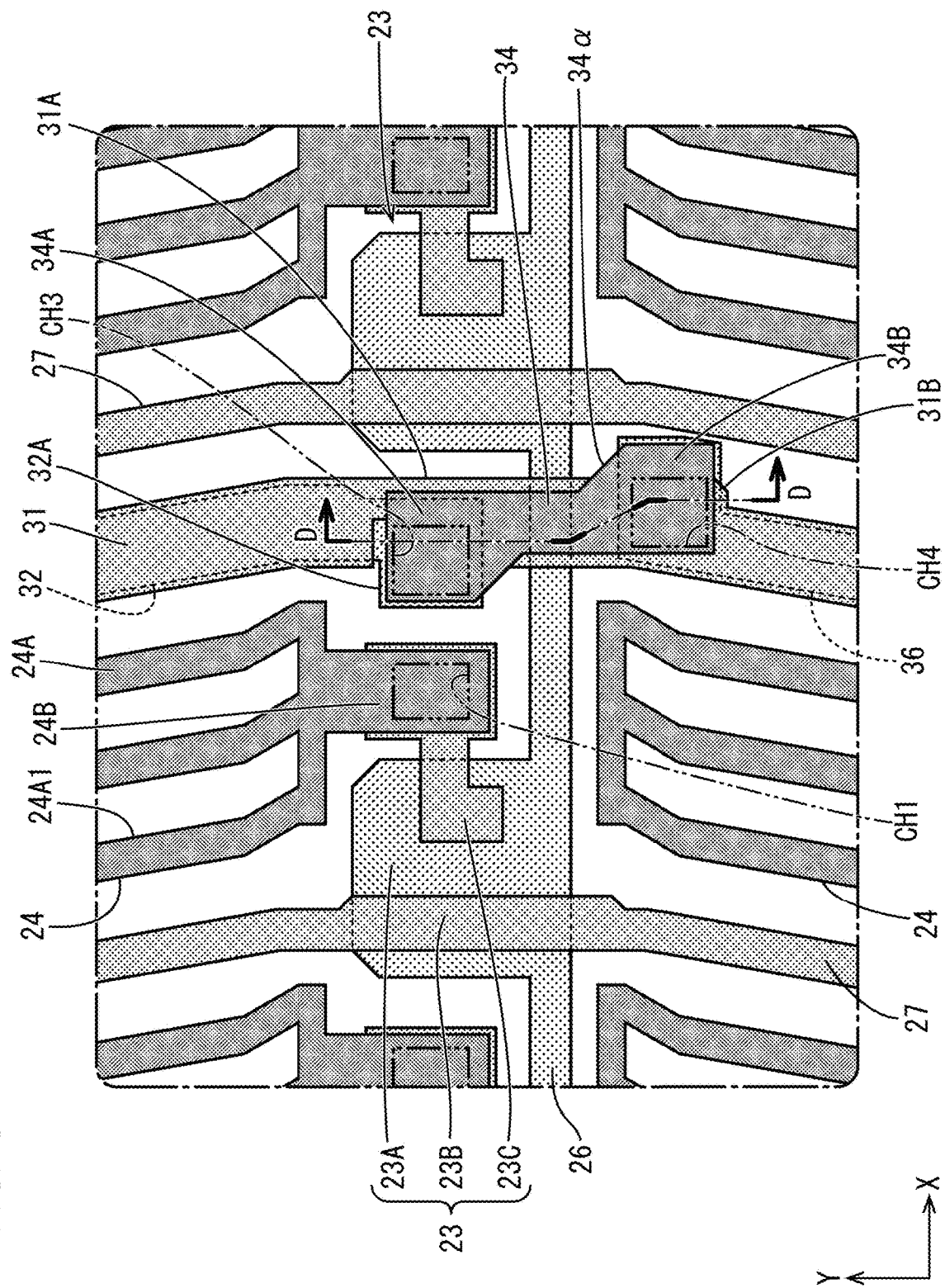
FIG. 13 is a plan view illustrating patterns of the first metal film, the second metal film, and the second transparent electrode film on a portion of the array substrate near one of second connection electrodes.
Figure 14:
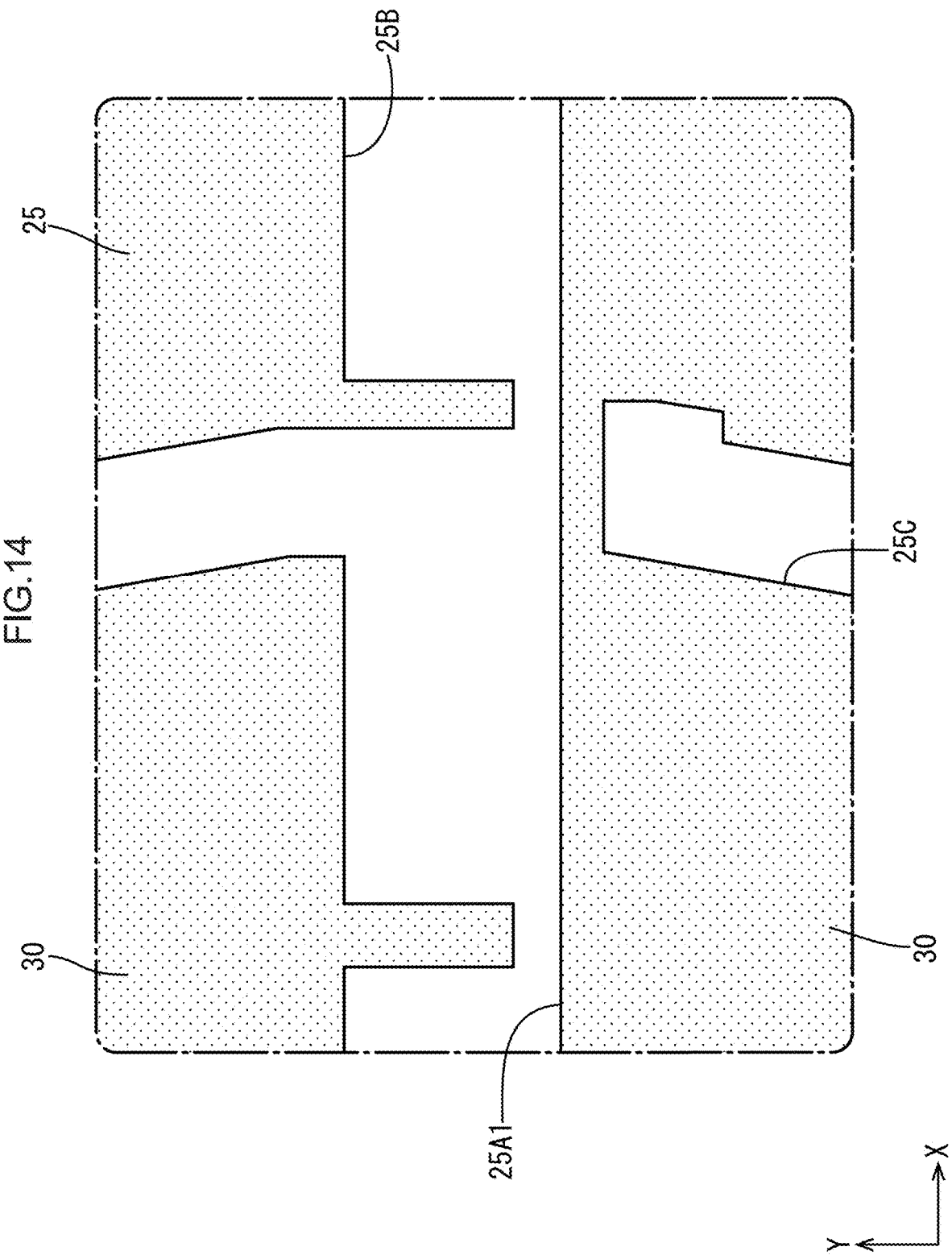
FIG. 14 is a plan view illustrating a pattern of the first transparent electrode film on a portion of the array substrate near one of the second connection electrodes.
Figure 15:
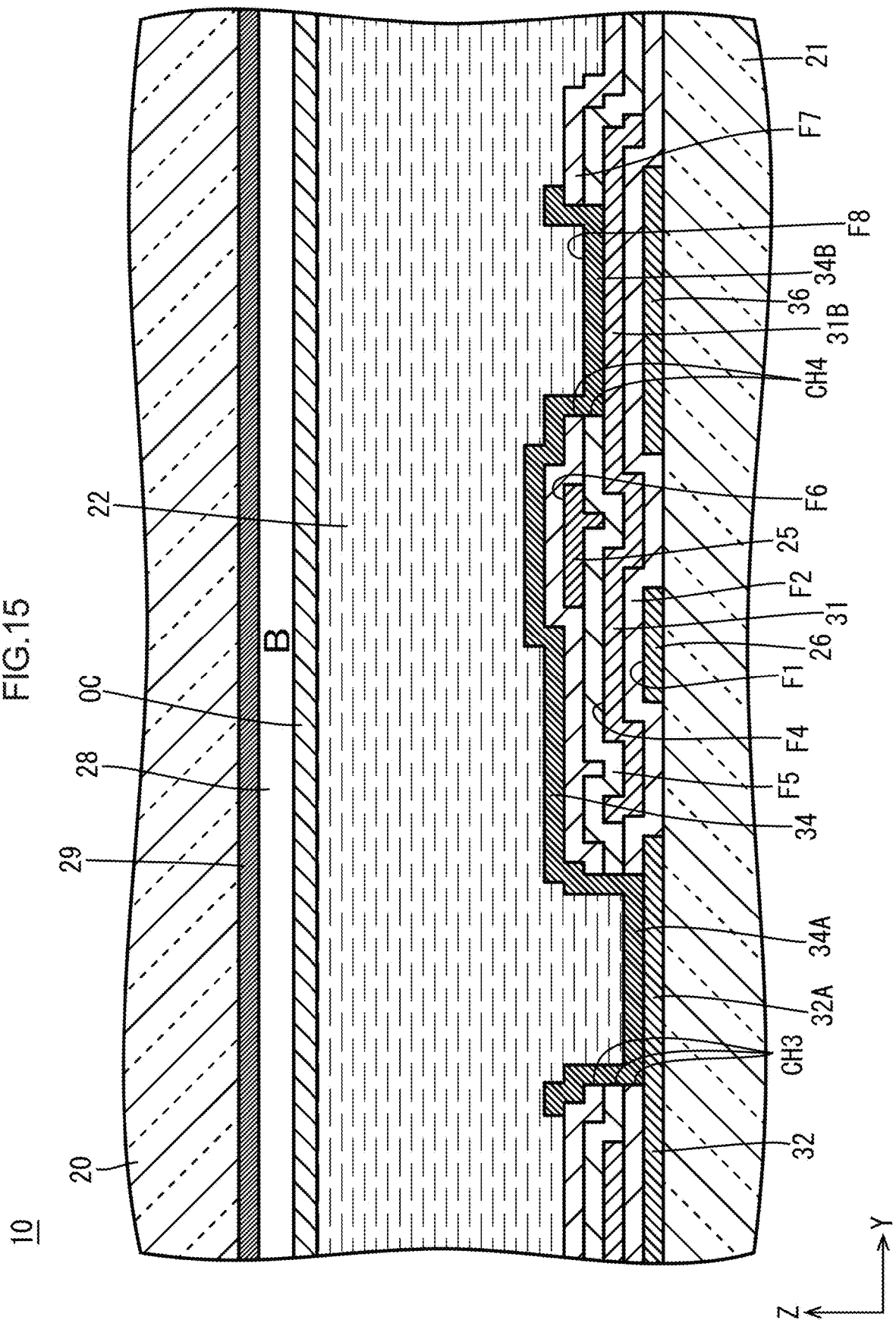
FIG. 15 is a cross-sectional view of the liquid crystal panel along line D-D in FIG. 13.
Figure 16:
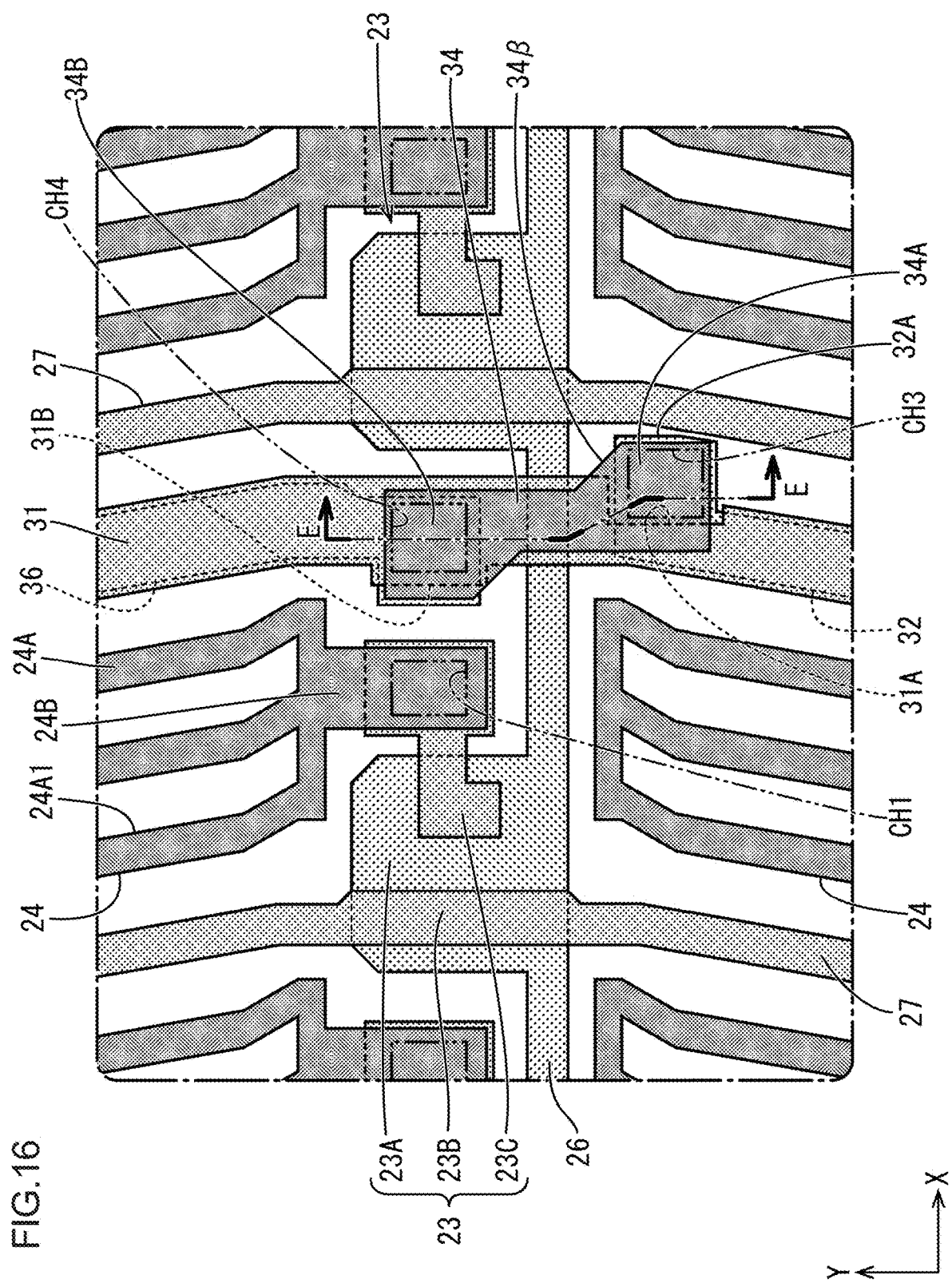
FIG. 16 is a plan view illustrating patterns of the first metal film, the second metal film, and the second transparent electrode film on a portion of the array substrate near another one of the second connection electrodes.
Figure 17:
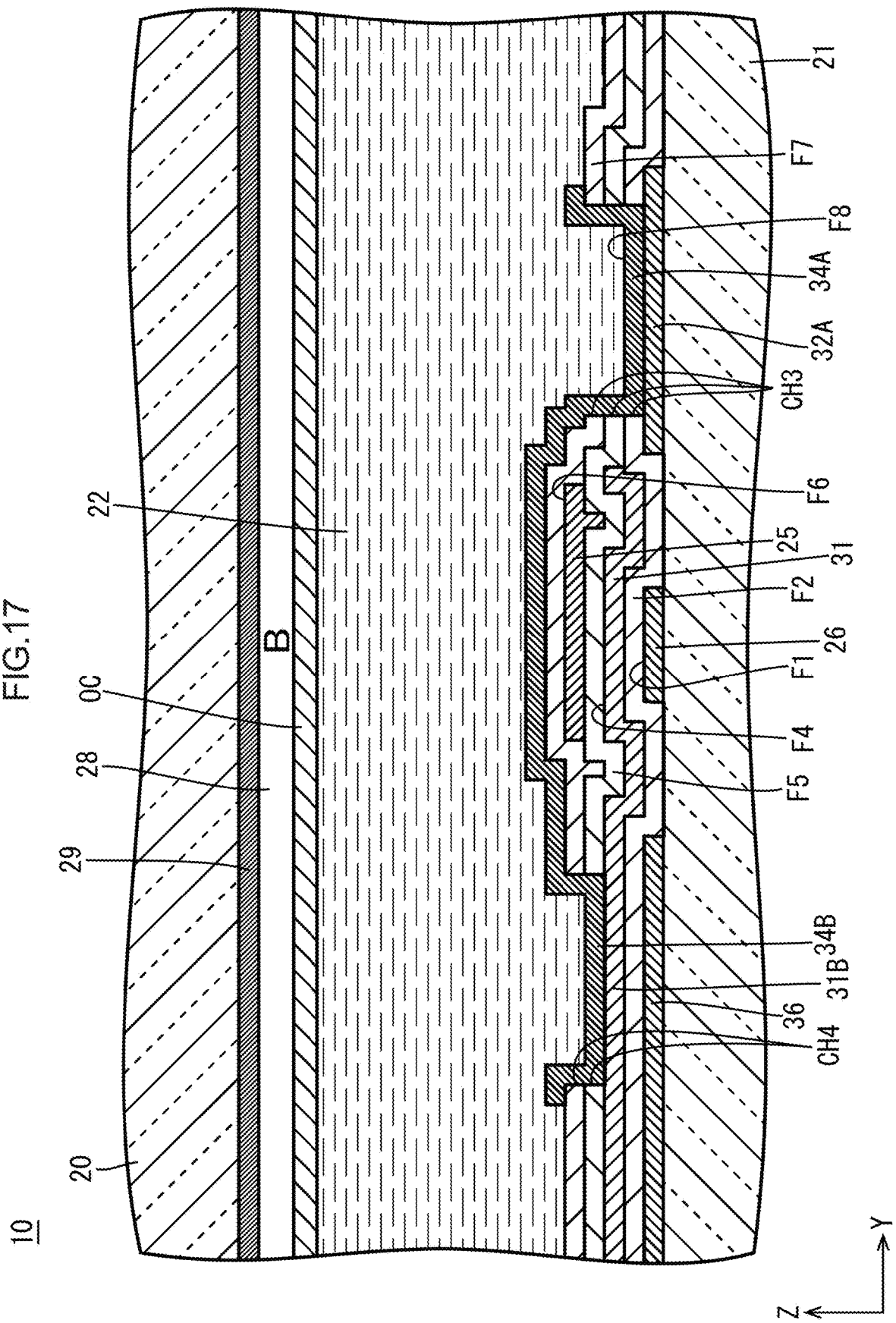
FIG. 17 is a cross-sectional view of the liquid crystal panel along line E-E in FIG. 16.

The second connection electrodes 34 will be described in detail with reference to FIGS. 10, 13, 14, 15, 16, and 17. FIGS. 13 and 16 are plan views illustrating the portion same as that in FIG. 3 and illustrating a pattern of the first metal film F1 (the gate lines 26 and the sub lines 32), a pattern of the second metal film F4 (the source lines 27 and the touch lines 31), and a pattern of the second transparent electrode film F8 (the pixel electrodes 24 and the second connection electrodes 34). In FIGS. 13 and 16, the first metal film F1, the second metal film F4, and the second transparent electrode film F8 are illustrated with different shading patterns. FIG. 14 is a plan view illustrating the portion same as that in FIG. 3 and illustrating a pattern of the first transparent electrode film F6 (the common electrode 25). FIG. 15 is a cross-sectional view along line D-D in FIG. 13. FIG. 17 is a cross-sectional view along line E-E in FIG. 16. As illustrated in FIGS. 10, 13, and 16, the second connection electrodes 34 are portions of the second transparent electrode film F8, which includes portions configured as the pixel electrodes 24 and the first connection electrodes 33 and is disposed in the upper layer than the first interlayer insulating film F5. Namely, the portions of the second transparent electrode film F8 configured as the second connection electrodes 34 are different from the portions of the second transparent electrode film F8 configured as the pixel electrodes 24 and the first connection electrodes 33. The second connection electrodes 34 extend along the Y-axis direction. The second connection electrodes 34 are disposed to cross some of the gate lines 26 that are disposed in the display area AA. The gate lines 26 that the second connection electrodes 34 cross are different from the gate lines 26 that the first connection electrodes 33 cross. As illustrated in FIGS. 15 and 17, the gate insulating film F2, the first interlayer insulating film F5, and the second interlayer insulating film F7 are disposed between the second connection electrodes 34 and the gate lines 26 that cross each other. This keeps insulation between the second connection electrodes 34 and the gate lines 26 that cross each other.

As illustrated in FIGS. 13 and 16, the second connection electrode 34 includes wide sections at two ends with respect to the Y-axis direction. One of the two wide sections of the second connection electrode 34 is configured as a first contact portion 34A that is connected to the sub line 32 and another one of the two wide sections is configured as a second contact portion 34B that is connected to the touch line 31. The first contact portion 34A does not overlap the gate line 26 but overlap an end portion of the target sub line 32 to be connected. The second contact portion 34B does not overlap the gate line 26 but overlap a portion of the target touch line 31 to be connected. The sub line 32 (a second sub line) connected to the second connection electrode 34 has a configuration same as that of the sub line 32 connected to the first connection electrode 33. The sub line 32 is connected to the second connection electrode 34 as follows. The contact portion 32A that is at one end of the sub line 32 with respect to the Y-axis direction is connected to the first contact portion 34A of the second connection electrode 34. On the other hand, the contact portion 32A that is at another end of the sub line 32 with respect to the Y-axis direction is connected to the contact portion 33A of the first connection electrode 33 (refer to FIGS. 10 to 12). As illustrated in FIGS. 15 and 17, the gate insulating film F2, the first interlayer insulating film F5, and the second interlayer insulating film F7 include third contact holes CH3 at the positions overlapping the contact portions 34A of the second connection electrodes 34 and the contact portions 32A of the sub lines 32. The contact portions 32A and the contact portions 34A are connected to each other via the third contact holes CH3.

As illustrated in FIGS. 13 and 16, the touch lines 31 include sections that overlap the second contact portions 34B of the second connection electrodes 34. The sections of the touch lines 31 overlapping the second contact portions 34B are wide sections having a large width. The wide sections of the touch lines 31 overlapping the second contact portions 34B are configured as first contact portions 31B that are connected to the second connection electrodes 34. As illustrated in FIGS. 15 and 17, the first interlayer insulating film F5 and the second interlayer insulating film F7 include fourth contact holes CH4 at the positions overlapping the second contact portions 34B of the second connection electrodes 34 and the first contact portions 31B of the touch lines 31. The contact portions 31B and the contact portions 34B are connected to each other via the fourth contact holes CH4.

As illustrated in FIG. 10, the second connection electrodes 34 include two types of second connection electrodes 34 in which the positions of the first contact portions 34A and the second contact portions 34B are reversed. The two types of second connection electrodes 34 include first type of second connection electrodes 34α and second type of second connection electrodes 34β. As illustrated in FIGS. 10, 13, and 15, the first type of second connection electrodes 34α include the first contact portions 34A on an upper side in FIGS. 10 and 13 and the second contact portions 34B on a lower side in FIGS. 10 and 13. As illustrated in FIGS. 10, 16, and 17, the second type of second connection electrodes 34β include the first contact portions 34A on a lower side in FIGS. 10 and 16 and the second contact portions 34B on an upper side in FIGS. 10 and 16.

Figure 18:
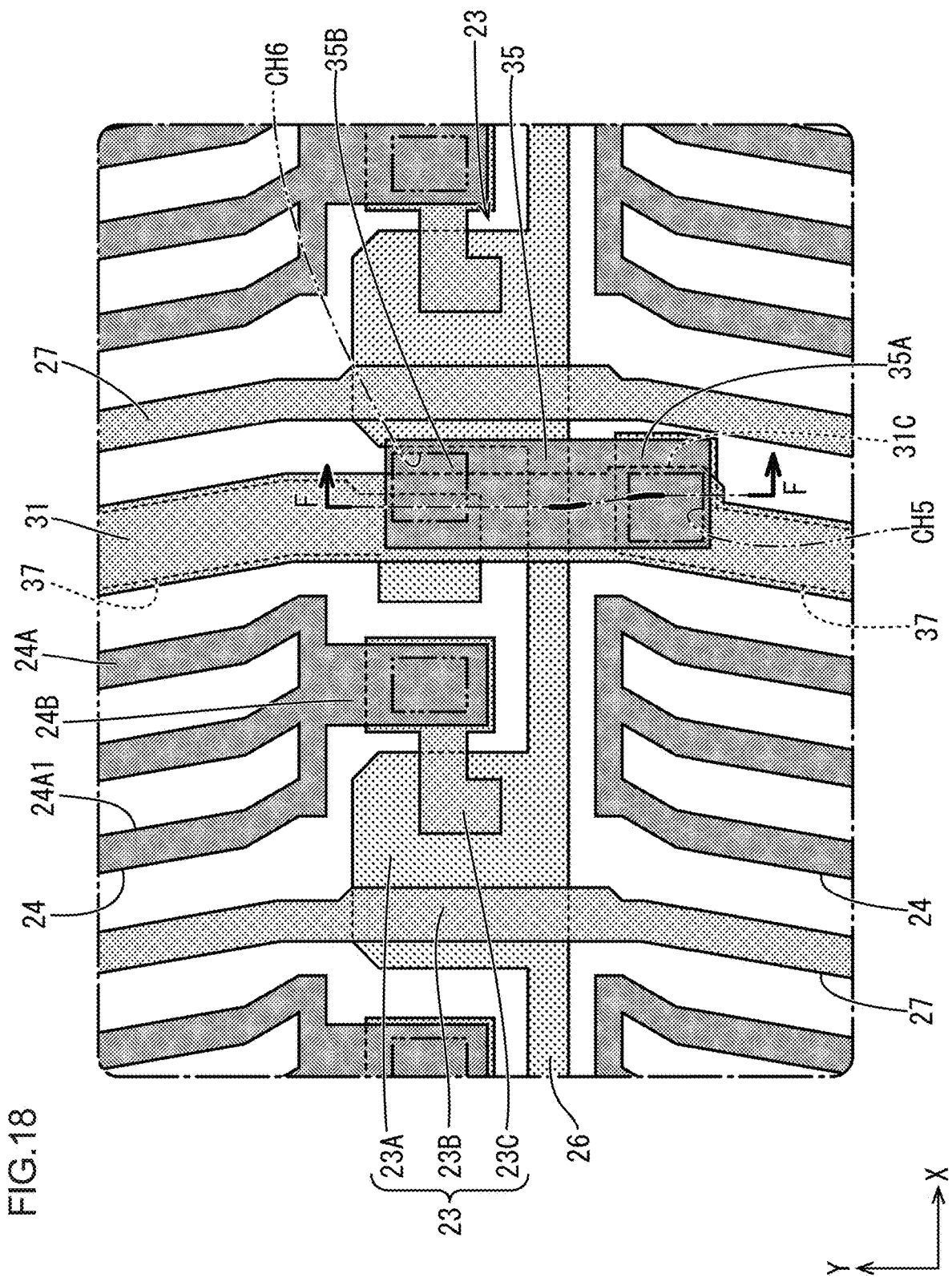
FIG. 18 is a plan view illustrating patterns of the first metal film, the second metal film, and the second transparent electrode film on a portion of the array substrate near a third connection electrode.
Figure 19:
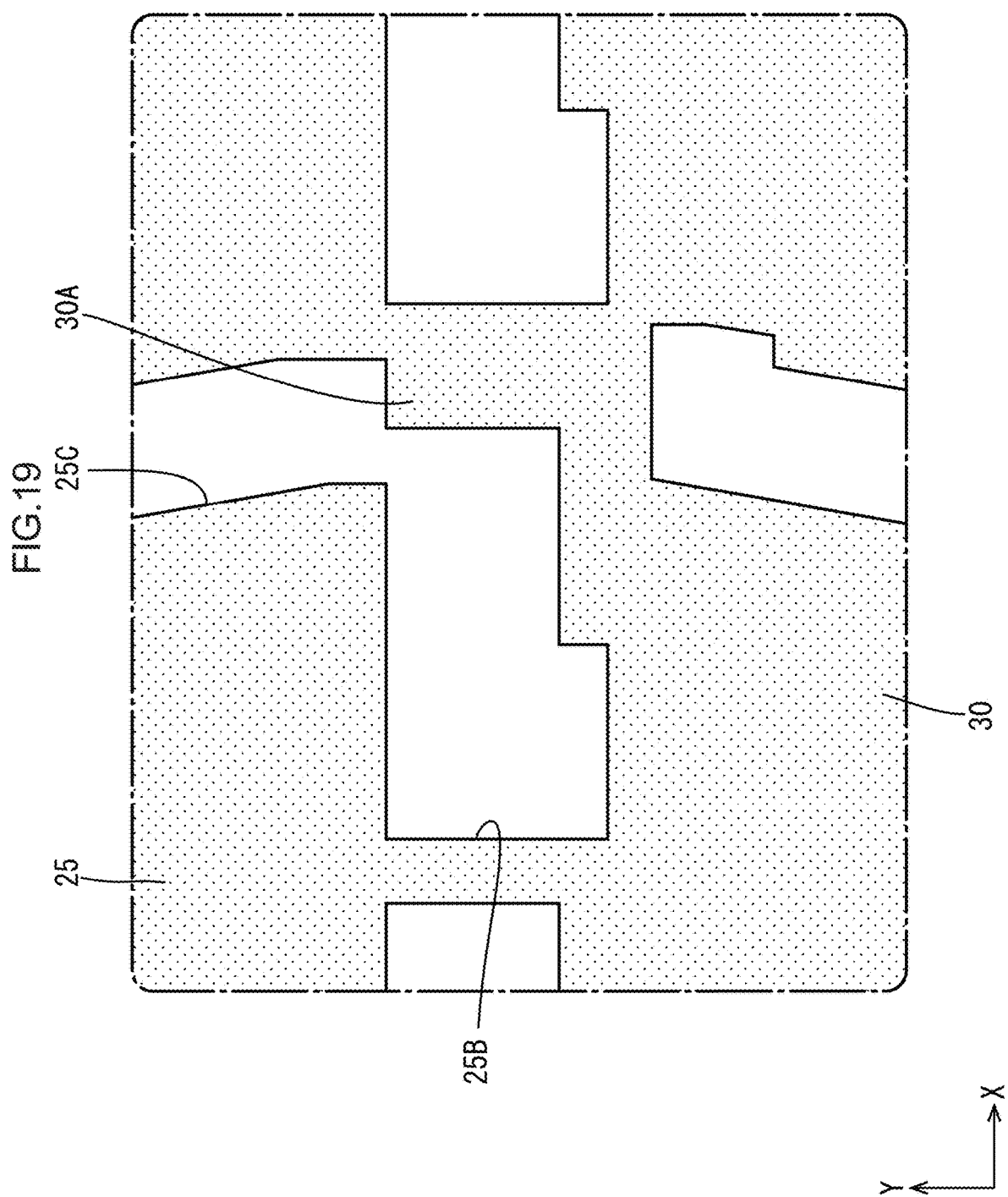
FIG. 19 is a plan view illustrating a pattern of the first transparent electrode film on a portion of the array substrate near the third connection electrode.
Figure 20:
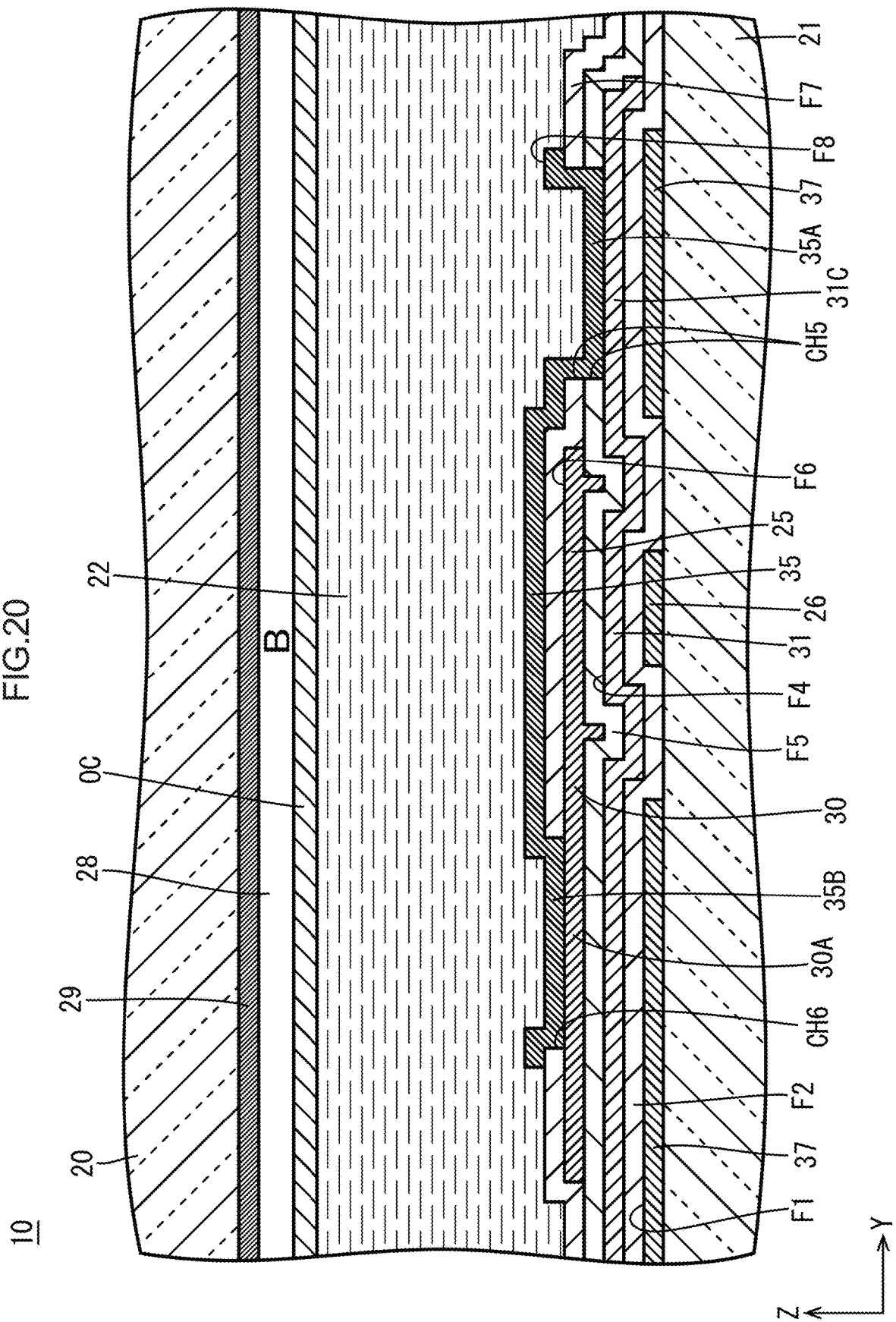
FIG. 20 is a cross-sectional view of the liquid crystal panel along line F-F in FIG. 18.

The third connection electrodes 35 will be described in detail with reference to FIGS. 10, 18, 19, and 20. FIG. 18 is a plan view illustrating the portion same as that in FIG. 3 and illustrating a pattern of the first metal film F1 (the gate lines 26 and the sub lines 32), a pattern of the second metal film F4 (the source lines 26 and the touch lines 31), and a pattern of the second transparent electrode film F8 (the pixel electrodes 24 and the third connection electrodes 35). In FIG. 18, the first metal film F1, the second metal film F4, and the second transparent electrode film F8 are illustrated with different shading patterns. FIG. 19 is a plan view illustrating the portion same as that in FIG. 3 and illustrating a pattern of the first transparent electrode film F6 (the common electrode 25). FIG. 20 is a cross-sectional view along line F-F in FIG. 18. As illustrated in FIGS. 10 and 18, the third connection electrodes 35 are portions of the second transparent electrode film F8, which includes portions configured as the pixel electrodes 24, the first connection electrodes 33, and the second connection electrodes 34 and is included in the upper layer than the first interlayer insulating film F5. Namely, the portions of the second transparent electrode film F8 configured as the third connection electrodes 35 are different from the portions of the second transparent electrode film F8 configured as the pixel electrodes 24, the first connection electrodes 33, and the second connection electrodes 34. The third connection electrodes 35 extend along the Y-axis direction. The third connection electrodes 35 are disposed to cross some of the gate lines 26 that are disposed in the display area AA. The gate lines 26 that the third connection electrodes 35 cross are different from the gate lines 26 that the first connection electrodes 33 cross and the gate lines 26 that the second connection electrodes 34 cross. As illustrated in FIG. 20, the gate insulating film F2, the first interlayer insulating film F5, and the second interlayer insulating film F7 are disposed between the third connection electrodes 35 and the gate lines 26 that cross each other. This keeps insulation between the third connection electrodes 35 and the gate lines 26 that cross each other. As illustrated in FIGS. 19 and 20, the third connection electrodes 35 are disposed such that at least portions of the third connection electrodes 35 overlap the touch electrodes 30. The second interlayer insulating film F7 is disposed between the third connection electrodes 35 and the touch electrodes 30.

As illustrated in FIG. 18, the third connection electrodes 35 have a substantially constant width over entire lengths in the Y-axis direction. One of the two ends of the third connection electrode 35 is configured as a first contact portion 35A that is connected to the touch line 31 and another one of the two ends is configured as a second contact portion 35B that is connected to the touch electrode 30. The first contact portion 35A does not overlap the gate line 26 but overlaps a portion of the target touch line 31 to be connected. The second contact portion 35B does not overlap the gate line 26 but overlaps a portion of the target touch electrode 30 to be connected.

As illustrated in FIG. 18, the touch lines 31 include portions that overlap the first contact portions 35A of the third connection electrodes 35, respectively. The sections of the touch lines 31 overlapping the first contact portions 35A are wide sections having a large width. The wide sections of the touch lines 31 overlapping the first contact portions 35A are configured as second contact portions 31C that are connected to the third connection electrodes 35. As illustrated in FIG. 20, the first interlayer insulating film F5 and the second interlayer insulating film F7 include fifth contact holes CH5 at the positions overlapping the first contact portions 35A of the third connection electrodes 35 and the second contact portions 31C of the touch lines 31. The contact portions 31C and the contact portions 35A are connected to each other via the fifth contact holes CH5.

As illustrated in FIGS. 19 and 20, the touch electrodes 30 include sections that overlap the second contact portions 35B of the third connection electrodes 35. The sections of the touch electrodes 30 overlapping the second contact portions 35B of the third connection electrodes 35 are configured as the first contact portions 30A that are connected to the second contact portions 31C. The first contact portions 30A of the touch electrodes 30 are provided by reducing the areas of the specified second openings 25C in the common electrode 25. As illustrated in FIG. 20, the second interlayer insulating film F7 includes sixth contact holes CH6 at the positions overlapping the second contact portions 35B of the third connection electrodes 35 and the first contact portions 30A of the touch electrodes 30. The contact portions 30A and the contact portions 35B are connected to each other via the sixth contact holes CH6.

As illustrated in FIGS. 10, 13, 15, 16, and 17, the array substrate 21 includes first dummy lines 36 (dummy lines) that are not connected to the second connection electrodes 34. The first dummy lines 36 have a configuration similar to that of the sub lines 32. The first dummy lines 36 are portions of the first metal film F1 portions of which are configured as the gate lines 26. Namely, the portions of the first metal film F1 configured as the first dummy lines 36 are different from the portions of the first metal film F1 configured as the gate lines 26, the gate electrodes 23A, and the sub lines 32. The first dummy lines 36 extend substantially along the Y-axis direction. Most sections of the first dummy lines 36 overlap the touch lines 31, respectively, in a plan view. The gate insulating film F2 is disposed between the first dummy lines 36, which are portions of the first metal film F1, and the touch lines 31, which are portions of the second metal film F4. This keeps insulation between the touch lines 31 and the first dummy lines 36 (refer to FIGS. 15 and 17). The first dummy line 36 and the sub line 32, which is connected to the second connection electrode 34, sandwich the gate line 26, which crosses the second connection electrode 34 with respect to the Y-axis direction. The first dummy lines 36 have a flat shape similar to that of the sub lines 32 and include end sections in the Y-axis direction and the end sections having a large width are defined as wide sections. One of two wide sections of the first dummy line 36 overlaps the second contact portion 34B of the second connection electrode 34 (34α) that is disposed on an upper side in FIG. 10 (refer to FIGS. 13 and 15). The other one of the two wide sections of the first dummy line 36 overlaps the second contact portion 34B of second connection electrode 34 (34β) that is disposed on a lower side in FIG. 10 (refer to FIGS. 16 and 17). However, the two wide sections of the first dummy line 36 are not connected to the second connection electrodes 34.

As illustrated in FIGS. 10, 18, and 20, the array substrate 21 includes second dummy lines 37 that are not connected to the third connection electrodes 35. The second dummy lines 37 have a configuration similar to that of the sub lines 32 and the first dummy lines 36. The second dummy lines 37 are portions of the first metal film F1 portions of which are configured as the gate lines 26. Namely, the portions of the first metal film F1 configured as the second dummy lines 37 are different from the portions of the first metal film F1 configured as the gate lines 26, the gate electrodes 23A, the sub lines 32, and the first dummy lines 36. The second dummy lines 37 extend substantially along the Y-axis direction. Most sections of the second dummy lines 37 overlap the touch lines 31, respectively, in a plan view. The gate insulating film F2 is disposed between the second dummy lines 37, which are portions of the first metal film F1, and the touch lines 31, which are portions of the second metal film F4. This keeps insulation between the touch lines 31 and the second dummy lines 37 (refer to FIG. 20). The second dummy lines 37 are disposed such that the gate line 26 crossing the third connection electrode 35 is sandwiched between two second dummy lines 37 with respect to the Y-axis direction. The second dummy lines 37 have a flat shape similar to that of the sub lines 32 and the first dummy lines 36 and include end sections in the Y-axis direction and the end sections having a large width are defined as wide sections. Two wide sections of the second dummy line 37 overlap the first contact portion 35A and the second contact portion 35B of the third connection electrode 35, respectively (refer to FIG. 20). However, the two wide sections of the second dummy line 37 are not connected to the third connection electrodes 35.

Next, arrangement of the first connection electrodes 33, the second connection electrodes 34, and the third connection electrodes 35 relative to the touch electrodes 30 that are arranged in the Y-axis direction will be described with reference to FIG. 10. In the following, the arrangement of the electrodes relative to one touch line 31 illustrated in FIG. 10 will be described; however, the arrangement of the electrodes is same for other touch lines 31 that are not illustrated in FIG. 10. The second connection electrodes 34 are disposed near edges of the touch electrodes 30. Specifically, the second connection electrode 34α is disposed to straddle the first slit 25A1 that defines each of the two electrodes 30 that are adjacent to each other in the Y-axis direction and are not connected to the touch line 31 illustrated in FIG. 10. The second connection electrode 34α is disposed to cross the first gate line 26 that is disposed in the first slit 25A1. The first gate line 26 that crosses the second connection electrode 34α does not overlap the touch electrodes 30. The second connection electrode 34β that is disposed below the second connection electrode 34α in FIG. 10 is defined as a lower second connection electrode 34β. The lower second connection electrode 34β is disposed to cross the second gate line 26 that is adjacent to and away from the first gate line 26 and disposed on a lower side than the first gate line 26 in FIG. 10. The first gate line 26 is disposed in the first slit 25A1 that defines each of the two adjacent electrodes 30 in the Y-axis direction. The second gate line 26 that crosses the lower second connection electrode 34β overlaps the touch electrode 30. The second connection electrode 34β that is disposed on an upper side than the second connection electrode 34α in FIG. 10 is defined as an upper second connection electrode 34β. The second connection electrode 34α and the upper second connection electrode 34β are away from each other by a distance of about a dimension slightly smaller than one side of the touch electrode 30. With such arrangement of the second connection electrodes 34, the first dummy line 36 is disposed between the first gate line 26, which is disposed in the first slit 25A1, and the second gate line 26, which crosses the lower second connection electrode 34β, with respect to the Y-axis direction. The first slit 25A1 defines each of the two electrodes 30 adjacent to each other in the Y-axis direction.

The first connection electrodes 33 are disposed to, respectively, cross the gate lines 26 overlapping the touch electrodes 30 that are not connected to the touch line 31 that is illustrated in FIG. 10 (except for the gate lines 26 crossing the second connection electrodes 34β). The number of first connection electrodes 33 provided for one touch electrode 30 is obtained by subtracting one from the number of gate lines 26 that overlap the one touch electrode 30. The sub lines 32 are disposed such that every two sublines 32 sandwich each of the gate lines 26 crossing the respective first connection electrodes 33 in the Y-axis direction. Namely, the sub lines 32 and the gate lines 26 crossing the respective first connection electrodes 33 are disposed alternately in the Y-axis direction. The number of the sub lines 32 disposed on the touch electrodes 30 that are not connected to the touch line 31 that is illustrated in FIG. 10 is greater by one than the number of first connection electrodes 33. The sub lines 32 and the gate lines 26 are disposed alternately in the Y-axis direction in an area between the second connection electrode 34α and the upper second connection electrode 34β that is disposed on the upper side than the second connection electrode 34α. The sub lines 32 that are disposed between the second connection electrode 34α and the upper second connection electrode 34β that is disposed on the upper side than the second connection electrode 34α are configured as a sub line group. Among the sub lines 32 included in the sub line group, each of two sub lines 32 that are disposed at two ends of the sub line group with respect to the Y-axis direction is connected to the first connection electrode 33 and the second connection electrode 34. Among the sub lines 32 included in the sub line group, the sub lines 32 disposed in a middle of the sub line group are connected to only the first connection electrodes 33. The sub lines 32 included in one sub line group and the first connection electrodes 33 that are connected to the sub lines 32 are configured as a first connection line 38. The first connection line 38 has a length that is substantially equal to a dimension slightly smaller than an edge of the touch electrode 30. The two ends of the first connection line 38 are connected to the touch line 31 via the second connection electrodes 34. Resistances of the touch line 31 connected to the first connection line 38 is reduced and redundancy of the touch line 31 connected to the first connection line 38 is improved. The number of first connection lines 38 connected to the touch line 31 is equal to the number of touch electrodes 30 that the touch line 31 crosses in a range from the driver 11 to the target touch electrode 30 to be connected. Therefore, the number of first connection lines 38 connected to the touch line 31 increases as the length of the touch line 31 extending from the driver 11 to the target touch electrode 30 is greater. With such a configuration, the resistances of the touch lines 31 having great lengths are effectively reduced and the redundancy of the touch lines 31 having great lengths is improved. As previously described, with the resistances of the touch line 31 being reduced, the width of the touch lines 31 can be reduced. With the smaller width of the touch lines 31, an area having no lines or an area where the pixels PX are disposed in the surface area of the array substrate 21 is increased. This increases an aperture ratio of the liquid crystal panel 10.

The third connection electrodes 35 cross all the gate lines 26, respectively, that overlap the touch electrode 30 connected to the touch line 31 that is illustrated in FIG. 10. The number of third connection electrodes 35 on the touch electrode 30 that is connected to the touch line 31 in FIG. 10 is equal to the number of gate lines 26 overlapping the touch electrode 30. The second dummy lines 37 are disposed to sandwich the gate lines 26 that cross the third connection electrodes 35 with respect to the Y-axis direction. Namely, the second dummy lines 37 and the gate lines 26 that cross the third connection electrodes 35 are alternately arranged in the Y-axis direction. The number of second dummy lines 37 on the touch electrode 30 that is connected to the touch line 31 in FIG. 10 is greater by one than the number of third connection electrodes 35.

As illustrated in FIG. 10, the first connection electrode 33 is connected to the two sub lines 32 that sandwich the gate line 26 crossing the first connection electrode 33. Therefore, the first connection electrode 33 has two contact points (second contact holes CH2) near the gate line 26 that crosses the first connection electrode 33. The second connection electrode 34 is connected to the touch line 31 and the sub line 32 that is connected to the first connection electrode 33. Therefore, the second connection electrode 34 has two connection points (a third contact hole CH3, a fourth contact hole CH4) near the gate line 26 that crosses the second connection electrode 34. The gate line 26 crossing the third connection electrode 35 is disposed between a connection point of the third connection electrode 35 and the touch electrode 30 and a connection point of the third connection electrode 35 and the touch line 31. Therefore, the third connection electrode 35 has two connection points (a fifth contact hole CH5, a sixth contact hole CH6) near the gate line 26 that crosses the third connection electrode 35. Thus, two contact holes CH2-CH6, which are connection points, are provided near every gate line 26. With such a configuration, the number of connection points near each of the gate lines 26 can be reduced compared to the configuration including three contact holes, which are connection points, near each of the gate lines. With the number of connection points being reduced, disorder of the liquid crystal molecules due to the contact holes CH2-CH6, which are connection points, is less likely to occur. Accordingly, problems such as display errors are less likely to be caused. Furthermore, an area of the light blocking portion 29 does not need to be increased to avoid the errors caused by the connection points. Without necessity of increasing the area of the light blocking portion 29, an area in which the pixels PX are disposed is increased. This increases an aperture ratio of the liquid crystal display panel 10.

As previously described, the array substrate 21 (an active matrix substrate) according to this embodiment includes the gate lines 26 (first lines), the gate insulating film F2 (a first insulating film), the touch line 31 (a second line), the sub lines 32 (third lines), the first interlayer insulating film F5 (a second insulating film), the first connection electrodes 33 (a first connection portion), and the second connection electrodes 34 (a second connection portion). The gate lines 26 (the first lines) are portions of the first metal film F1 (a first conductive film) and extend along a first direction and are arranged at intervals with respect to a second direction that crosses the first direction. The gate insulating film F2 is included in an upper layer than the first metal film F1. The touch line 31 (the second line) is a portion of the second metal film F4 (a second conductive film) that is included in an upper layer than the gate insulating film F2. The touch line 31 extends along the second direction that crosses the first direction and crosses the gate lines 26 (the first lines) with having the gate insulating film F2 between the touch line 31 and the gate lines 26. The sub lines 32 (the third lines) are portions of the first metal film F1. The portions of the first metal film F1 configured as the sub lines 32 differ from the portions of the first metal film F1 configured as the gate lines 26 (the first lines). The sub lines 32 extend along the second direction and at least portions of the sub lines 32 overlap the touch line 31 (the second line) with having the gate insulating film F2 between the sub lines 32 and the touch line 31. The sub lines 32 sandwich the gate line 26 with respect to the second direction. The first interlayer insulating film F5 is included in an upper layer than the second metal film F4. The first connection electrode 33 (the first connection portion) is included in an upper layer than the first interlayer insulating film F5. The first connection electrode 33 crosses the first gate line 26 (the first line) via the gate insulating film F2 and the first interlayer insulating film F5. The first connection electrode 33 is connected to two sub lines 32 (two third lines) that sandwich the first gate line 26 (the first line) that the first connection electrode 33 crosses. The second connection electrode 34 (the second connection portion) is included in an upper layer than the first interlayer insulating film F5. The second connection electrode 34 crosses the second gate line 26 (the first line), which differs from the first gate line 26 (the first line) crossing the first connection electrode 33, via the gate insulating film F2 and the first interlayer insulating film F5. The second connection electrode 34 is connected to the touch line 31 (the second line) and the sub line 32 (the third line) that is connected to the first connection electrode 33.

The touch line 31 (the second line) is electrically connected to the two sub lines 32 (two third lines) via the first connection electrode 33 and the second connection electrode 34. This reduces resistances of the touch line 31 (the second line). At least portions of the sub lines 32 (the third lines), which are portions of the first metal film F1 different from portions of the first metal film F1 configured as the gate lines 26 (the first lines), overlap the touch line 31 (the second line) via the gate insulating film F2. This increases an area having no lines. Since the sub lines 32 (the third lines) are disposed not to overlap the gate lines 26 (the first lines), short circuits are less likely to occur.

The first connection electrode 33 is connected to the two sub lines (the two third lines) that sandwich the gate line 26

(the first line). Therefore, the first connection electrode 33 has two contact points near the gate line 26 (the first line) that crosses the first connection electrode 33. The second connection electrode 34 is connected to the touch line 31 (the second line) and the sub line 32 (the third line) that is connected to the first connection electrode 33. Therefore, the second connection electrode 34 has two connection points near the gate line 26 (the first line) that crosses the second connection electrode 34. Two connection points are provided near each of the gate lines 26. The number of connection points near each of the gate lines 26 can be reduced compared to the configuration including three contact holes, which are connection points, near each of the gate lines. With the number of connection points being reduced, errors related to the connection points are less likely to be caused. No efforts are necessary to avoid the errors caused due to the connection points.

The array substrate 21 further includes touch electrodes 30 (position detection electrodes) that are included in an upper layer than the first interlayer insulating film F5 and the touch lines 31 (position detection lines) that are connected to the touch electrodes 30. With such a configuration, resistances of the touch lines 31 (the second lines) are reduced. Accordingly, signals supplied to the touch electrodes 30 via the touch lines 31 are less likely to have a rounded waveform. This increases position detection sensitivity.

Some of the gate lines 26 (the first lines) overlap the touch electrode 30 that is connected to the touch line 31 and cross the touch line 31 via the gate insulating film F2. The array substrate 21 further includes the third connection electrode 35 (a third connection portion) that is included in an upper layer than the first interlayer insulating film F5 and overlaps the touch electrode 30. The third connection electrode 35 crosses the gate line 26 (the first line), which crosses the touch line, via the gate insulating film F2 and the first interlayer insulating film F5. The third connection electrode 35 is connected to the touch line 31 and the touch electrode 30. With such a configuration, signals transferred to the touch line 31 is supplied to the touch electrode 30 via the third connection electrode 35. Similar to the first connection electrode 33 and the second connection electrode 34, the third connection electrode 35 crosses the gate line 26 (the first line) via the gate insulating film F2 and the first interlayer insulating film F5. The arrangement of the connection points of the third connection electrode 35 with respect to the touchline 31 and the touch electrode 30 is similar to the arrangement of the connection points of the first connection electrode 33 with respect to the two sublines 32 (the two third lines) and the arrangement of the connection points of the second connection electrode 34 with respect to the touch line 31 (the second line) and the sub line 32 (the third line). With such a configuration, the connection points of the third connection electrode 35 are less likely to be noticed.

The array substrate 21 further includes the TFTs 23 (switching components) that are included in a lower layer than the first interlayer insulating film F5, the pixel electrodes 24 that are included in an upper layer than the first interlayer insulating film F5 and connected to the TFTs 23, and the second interlayer insulating film F7 (a third insulating film) that is included in an upper layer than the first interlayer insulating film F5. The touch electrodes 30 are portions of the first transparent electrode film F6. The pixel electrodes 24 are portions of the second transparent electrode film F8. The pixel electrodes 24 are disposed to overlap the touch electrode 30 via the second interlayer insulating film F7. The first connection electrode 33 and the second connection electrode 34 are portions of the second transparent electrode film F8. The portions of the second transparent electrode film F8 configured as the first connection electrode 33 and the second connection electrode 34 are different from the portions of the second transparent electrode film F8 configured as the pixel electrodes 24. The second transparent electrode film F8 is a transparent electrode film included in an upper layer than the second interlayer insulating film F7. To connect the pixel electrodes 24 or the touch electrodes 30 that are included in an upper layer than the second interlayer insulating film F7 to a connection target object (the TFT 23 or the touch line 31), an opening may be formed in the second interlayer insulating film F7 that is between the electrode and the connection target object. To connect the first connection electrode 33 and the second connection electrode 34 to a connection target object, openings may be formed in the insulating film that is between each electrode and the connection target object. The first connection electrode 33 and the second connection electrode 34 are portions of the second transparent electrode film F8, which is included in an upper layer than the second interlayer insulating film F7 out of the first transparent electrode film F6 and the second transparent electrode film F8. The portions of the second transparent electrode film F8 that are configured as the first connection electrode 33 and the second connection electrode 34 are different from the portions of the second transparent electrode film F8 that are configured as the pixel electrodes 24. Therefore, at least the second interlayer insulating film F7 can collectively include openings for connecting the first connection electrode 33 and the second connection electrode 34 to a connection target object and openings for connecting the electrode, which is included in an upper layer than the second interlayer insulating film F7 out of the pixel electrode 24 and the touch electrode 30, to a connection target object. With such a configuration, the array substrate 21 can be produced easily. The pixel electrodes 24 are disposed in a limited area compared to the touch electrodes 30. Since the portions of the second transparent electrode film F8 configured as the first connection electrode 33 and the second connection electrode 34 are different from the portions of the second transparent electrode film F8 configured as the pixel electrodes 24, the first connection electrode 33 and the second connection electrode 34 can be provided without reducing the area in which the pixel electrodes 24 are disposed.

The array substrate 21 further includes the TFTs 23, the pixel electrodes 24 connected to the TFTs 23, the gate lines 26 (scanning lines) extending along the first direction and connected to the TFTs 23, and the source lines 27 (signal lines) extending along the second direction and connected to the TFTs 23. The portions of the second metal film F4 configured as the source lines 27 are different from the portions of the second metal film F4 configured as the touch lines 31 (the second lines). The source lines 27 are arranged at an interval from the touch line 31 with respect to the first direction. The TFTs 23 are driven based on the signals supplied via the gate lines 26 and the pixel electrodes 24 are charged at a potential based on the signals supplied to the source lines 27. Since the portions of the second metal film F4 configured as the source lines 27 are different from the portions of the second metal film F4 configured as the touch lines 31 (the second lines), the number of layers included in the array substrate 21 is reduced. On the other hand, since the source lines 27 and the touch lines 31 are arranged at intervals in the first direction, the area having no lines may be reduced. In this respect, with the touch lines 31 (the second lines) being connected to the sub lines 32 (the third lines) via the first connection electrodes 33 and the second connection electrodes 34, resistances of lines are reduced. With such a configuration, low resistances of lines can be effectively maintained with a reduced width of the touch lines 31. Therefore, the area having no lines can be sufficiently kept.

The array substrate 21 further includes the first dummy lines 36 (dummy lines) that are portions of the first metal film F1 and extend along the second direction. The portions of the first metal film F1 configured as the first dummy lines 36 are different from the portions of the first metal film F1 configured as the gate lines 26 (the first lines). At least portions of the first dummy lines 36 overlap the touch line 31 (the second line) via the gate insulating film F2. The first dummy line 36 and the sub line 32 (the third line), which is connected to the second connection electrode 34, sandwich the gate line 26 (the first line), which crosses the second connection electrode 34, with respect to the second direction. The first dummy line 36 is not connected to the second connection electrode 34. With such a configuration, the first dummy line 36 that is not connected to the second connection electrode 34 is not related to lowering of the resistances of the touch line 31 (the second line). However, since the first dummy line 36 has a configuration similar to that of the sub lines 32 (the third line), a pattern of protrusions and recesses on each of the films that are included in an upper layer than the first dummy lines 36 is similar to that of protrusions and recesses on each of the films that are included in an upper layer than the sub lines 32 (the third lines). This keeps effective coverage of the films F2 to F8 that are included in an upper layer than the first metal film F1. When performing a light orientation process on the alignment film, difference in the light orientation process is less likely to be caused in sections near the sub lines 32 and sections near the first dummy lines 36.

The second connection electrode 34 is connected to the touch line 31 (the second line) at a position such that the gate line 26 (the first line) is sandwiched between the position and the subline 32 (the third line) that is connected to the second connection electrode with respect to the second direction. With such a configuration, the connection points of the second connection electrode 34 with respect to the touch line 31 (the second line) and the sub line 32 (the third line) are located to sandwich the gate line 26 (the first line). Such arrangement of the connection points is similar to the arrangement of the connection points of the first connection electrode 33 with respect to the two sublines 32 (the two third lines) that sandwich the first line 26 (the first line). With such a configuration, the connection points of the second connection electrode 34 are less likely to be noticed.

The liquid crystal panel 10 (the display device) according to this embodiment includes the array substrate 21 and the CF substrate 20 (the opposed substrate) that is disposed to be opposed to the array substrate 21. According to such a liquid crystal panel 10, errors due to the connection points are less likely to be caused and no efforts are necessary to avoid the errors caused due to the connection points. This improves display quality and the aperture ratio is increased.

Second Embodiment

A second embodiment will be described with reference to FIG. 21. The second embodiment further includes second connection lines 39 (the second line, the connection line). Configuration, functions, and effects similar to those of the first embodiment may not be described.

Figure 21:
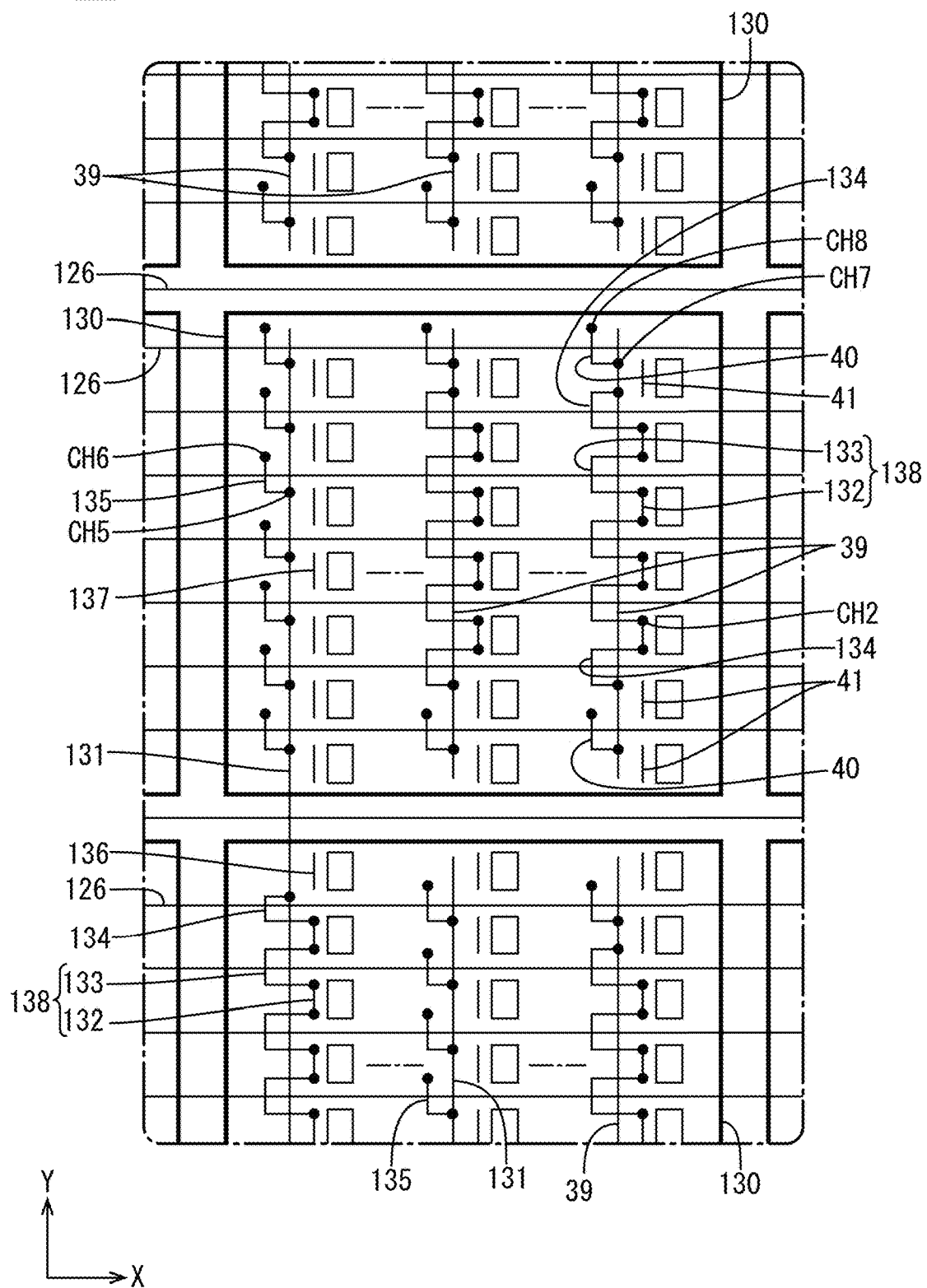
FIG. 21 is a plan view schematically illustrating connection configurations of touch electrodes, touch lines, and sub lines included in an array substrate according to a second embodiment.

As illustrated in FIG. 21, an array substrate 121 includes the second connection lines 39 (the second line, the connection line) that are disposed to overlap touch electrodes 130 and connected to the overlapping touch electrodes 130, respectively. FIG. 21 is a plan view schematically illustrating the touch electrodes 120, touch lines 131, sub lines 132, and the second connection lines 39 in the array substrate 121. In FIG. 21, among the three touch electrodes 130 arranged in the Y-axis direction, the touch electrode 130 in a middle with respect to the Y-axis direction is defined as a first touch electrode 130. The first touch electrode 130 is connected to the touch line 131 at a left end. In FIG. 21, among the three touch electrodes 130 arranged in the Y-axis direction, the touch electrode 130 on a lower side is defined as a second touch electrode 130. The second touch electrode 130 is connected to the touch line 131 in a middle. In FIG. 21, among the three touch electrodes 130 arranged in the Y-axis direction, the touch electrode 130 on an upper side is defined as a third touch electrode 130. The third touch electrode 130 is connected to the touch line 131 not illustrated in FIG. 21. The numbers of gate lines 126, pixel electrodes 124, touch lines 131, sub lines 132, and second connection lines 39 in FIG. 21 are smaller than the numbers in actual products for easy understanding of the configuration. In FIG. 21, the touch lines 131, the sub lines 132, and the second connection lines 39 are illustrated with simplifying planar shapes thereof and the pixel electrodes 124 are illustrated with simplifying outlines thereof.

The second connection lines 39 are portions of the second metal film F4 portions of which are configured as the source lines 27 and the touch lines 131 (refer to FIG. 12). Namely, the portions of the second metal film F4 configured as the second connection lines 39 are different from the portions of the second metal film F4 configured as the source lines 27 and the touch lines 131. The second connection lines 39 are disposed to overlap the touch electrodes 130 that are on an opposite side (the upper side in FIG. 21) from the driver (the lower side in FIG. 21) with respect to the touch electrode 130 that is connected to the touch line 131. The arrangement of the second connection lines 39 on the touch electrode 130 with respect to the X-axis direction is similar to the arrangement of the touch line 131 connected to the touch electrode 130. The second connection lines 39 are disposed on an imaginary extending line extending from the touch line 131, which is connected to the touch electrode 130, in an opposite direction from the driver with respect to the Y-axis direction. Similar to the touch lines 131, the second connection lines 39 extend in a direction substantially along the Y-axis direction with being curved in a zig-zag form. Similar to the touch lines 131, the second connection line 39 is disposed between the pixel electrodes 124 and the source line 27 with respect to the X-axis direction (refer to FIG. 2). Unlike the touch lines 131, the forming area of the second connection line 39 in the Y-axis direction is same as the forming area of the overlapping touch electrode 130 in the Y-axis direction. The second connection lines 39 are connected to the overlapping touch electrodes 130, respectively, at two ends of the second connection lines 39 in the Y-axis direction.

The array substrate 121 includes fourth connection electrodes 40 (a fourth connection portion) that are connected to the touch electrode 130 and the second connection line 39. The fourth connection electrodes 40 are portions of the second transparent electrode film F8 portions of which are configured as the pixel electrodes 124, first connection electrodes 133, second connection electrodes 134, and third connection electrodes 135 (refer to FIG. 12). Namely, the portions of the second transparent electrode film F8 configured as the fourth connection electrodes 40 are different from the portions of the second transparent electrode film F8 configured as the pixel electrodes 124, first connection electrodes 133, second connection electrodes 134, and third connection electrodes 135. The fourth connection electrodes 40 extend along the Y-axis direction and cross the gate lines 126, which are portions of the first metal film F1, similar to the connection electrodes 133 to 135 (refer to FIG. 12). The gate lines 126 crossing the fourth connection electrodes 40 cross the second connection lines 39, which are portions of the second metal film F4, and overlap the touch electrodes 130 that are connected to the second connection lines 39. Two fourth connection electrodes 40 are disposed to cross two gate lines 126, respectively, that cross two end sections of the second connection line 39 with respect to the Y-axis direction. The distance between the two fourth connection electrodes 40 is substantially a dimension slightly smaller than one side of the touch electrode 130.

The fourth connection electrodes 40 are to be connected to the touch electrode 130 and the second connection line 39 that has a configuration similar to that of the touch lines 131. Therefore, a configuration of the fourth connection electrodes 40 is substantially similar to the configuration of the third connection electrodes 135. At least portions of the fourth connection electrodes 40 overlap the touch electrodes 130. One end of the two ends of each fourth connection electrode 40 is configured as a first contact portion that is connected to the second connection line 39. Another end of the two ends is configured as a second contact portion that is connected to the touch electrode 130. The second connection lines 39 include portions overlapping the first contact portions of the fourth connection electrodes 40. The overlapping portions of the second connection lines 39 overlapping the first contact portions of the fourth connection electrodes 40 are configured as first contact portions that are connected to the fourth connection electrodes 40. The first interlayer insulating film F5 and the second interlayer insulating film F7 include seventh contact holes CH7 at the positions overlapping the first contact portions of the fourth connection electrodes 40 and the first contact portions of the second connection lines 39 (refer to FIG. 20). The second connection lines 39 and the fourth connection electrodes 40 are connected to each other via the seventh contact holes CH7. The touch electrodes 130 include portions overlapping the second contact portions of the fourth connection electrodes 40. The overlapping portions of the touch electrodes 130 overlapping the second contact portions of the fourth connection electrodes 40 are configured as second contact portions connected to the second contact portions of the fourth connection electrodes 40. The second interlayer insulating film F7 includes eighth contact holes CH8 at the positions overlapping the second contact portions of the fourth connection electrodes 40 and the second contact portions of the touch electrodes 130 (refer to FIG. 20). The fourth connection electrodes 40 and the touch electrodes 130 are connected to each other via the eighth contact holes CH8.

The array substrate 121 further includes third dummy lines 41 that are not connected to the fourth connection electrodes 40. The third dummy lines 41 have a configuration similar to those of the sub lines 132, first dummy lines 136, and second dummy lines 137. The third dummy lines 41 are portions of the first metal film F1 portions of which are configured as the gate lines 126 and other lines. Namely, the portions of the first metal film F1 configured as the third dummy lines 41 are different from the portions of the first metal film F1 configured as the gate lines 126, the sub lines 132, the first dummy lines 136, and the second dummy lines 137. The third dummy lines 41 extend substantially along the Y-axis direction. Most sections of the third dummy lines 41 overlap the second connection lines 39 in a plan view. The gate insulating film F2 is disposed between the third dummy lines 41, which are portions of the first metal film F1, and the second connection lines 39, which are portions of the second metal film F4 (refer to FIG. 20). The third dummy line 41 is disposed adjacent to and on a lower side in FIG. 21 with respect to the gate line 126 that crosses the fourth connection electrode 40. Two ends of the third dummy line 41 with respect to the Y-axis direction overlap the first contact portion and the second contact portion of the fourth connection electrode 40, respectively. However, the two ends of the third dummy line 41 are not connected to the fourth connection electrode 40.

The array substrate 121 further includes the sub lines 132, the first connection electrodes 133, and the second connection electrodes 134 that are electrically connected to the second connection line 39 in addition to the fourth connection electrodes 40. Most sections of the sub lines 132 are disposed to overlap the second connection lines 39 in a plan view. Therefore, the gate insulating film F2 is disposed between the sub lines 132, which are portions of the first metal film F1, and the second connection lines 39, which are portions of the second metal film F4 (refer to FIG. 12). Two second connection electrodes 134 are disposed closer to a middle section of the second connection line 39 with respect to the Y-axis direction than the two fourth connection electrodes 40 are. The two second connection electrodes 134 are disposed to cross the two gate lines 126 that are adjacent to and on the middle-section side with respect to the two gate lines 126 that cross the two fourth connection electrodes 40. The two gate lines 126 crossing the second connection electrodes 134 are disposed at intervals from the two gate lines 126 crossing the fourth connection electrodes 40, respectively, in the Y-axis direction. The first connection electrodes 133 are disposed closer to the middle section of the second connection line 39 with respect to the Y-axis direction than the two second connection electrodes 134 are. The first connection electrodes 133 are disposed to cross all the gate lines 126, respectively, which are closer to the middle section with respect to the Y-axis direction than the two gate lines 126 crossing the two second connection electrodes 134 are. The sub lines 132 are disposed to sandwich the gate lines 126 crossing the first connection electrodes 133, respectively, with respect to the Y-axis direction. The sub lines 132 that are disposed between the two second connection electrode 134 are configured as a sub line group. The sub lines 132 included in the sub line group and the first connection electrodes 133 that are connected to the sub lines 132, are configured as a first connection line 138. The two ends of the first connection line 138 are connected to the second connection line 39 via the second connection electrodes 134. Resistances of the second connection line 39 connected to the first connection line 138 is reduced and redundancy is improved. Two third dummy lines 41 are disposed adjacent to the two fourth connection electrodes 40, respectively, and are on the middle section side with respect to the two fourth connection electrodes 40 in the Y-axis direction. The gate line 126 is sandwiched between the first dummy line 136 and the third dummy line 41 that is lower one of the two third dummy lines 41 and disposed on a lower side with respect to the Y-axis direction.

As described above, according to this embodiment, the array substrate 121 includes the second connection line 39 (the connection line, the second line) that is disposed to overlap the touch electrode 130 and extends along the second direction. At least two ends of the second connection line 39 are connected to the touch electrode 130 that the second connection line 39 overlaps. With such a configuration, the resistances of the second connection line 39 (the second line) are reduced and nonuniformity is less likely to be caused in the resistance distribution of the touch electrode 130 that is connected to the second connection line 39. This increases position detection sensitivity.

The gate lines 26 (the first lines) include the gate lines 26 that overlap the touch electrode 130 connected to the second connection line 39 and cross the second connection line 39 via the gate insulating film F2. The array substrate 121 includes the fourth connection electrodes 40 (the fourth connection portion) that is included in an upper layer than the first interlayer insulating film F5 and overlaps the touch electrode 130. The fourth connection electrodes 40 cross the gate lines 126 (the first lines), respectively, that cross the second connection line 39 via the gate insulating film F2 and the first interlayer insulating film F5. The fourth connection electrodes 40 are connected to the second connection line 39 and the touch electrode 130. With such a configuration, similar to the first connection electrodes 133 and the second connection electrodes 134, the fourth connection electrodes 40 are disposed to cross the gate lines 126 (the first lines), respectively, that cross the second connection line 39 via the gate insulating film F2 and the first interlayer insulating film F5. The arrangement of the connection points of the fourth connection electrode 40 with respect to the second connection line 39 and the touch electrode 130 is similar to the arrangement of the connection points of the first connection electrode 133 (a fifth connection electrode) with respect to the two sublines 132 (the third lines, fourth lines) and the arrangement of the connection points of the second connection electrode 134 (a sixth connection electrode) with respect to the touch line 131 (the second line) and the sub line 132 (the third line, the fourth line). With such a configuration, the connection points of the fourth connection electrode 40 are less likely to be noticed.

The gate lines 126 (the first lines) are disposed at intervals in the second direction and cross the second connection line 39 via the gate insulating film F2. At least portions of the sub lines 132 (the third lines, the fourth lines) overlap the second connection line 39 via the gate insulating film F2. Two of the fourth connection electrodes 40 cross the two gate lines 126 (the first lines) that cross the two end sections of the second connection line 39 in the second direction, respectively. The first connection electrodes 133 are disposed closer to the middle section of the second connection line 39 in the second direction than the two second connection electrodes 134 are. With such a configuration, the end sections of the second connection line 39 are connected to the touch electrode 130 via the two fourth connection electrodes 40 and the middle section of the second connection line 39 is connected to the sub lines 132 (the third lines, the fourth lines) via the two second connection electrodes 134 and the first connection electrodes 133. With such a configuration, resistances of the second connection line 39 can be reduced. Furthermore, even if disconnection is caused in the second connection line 39, redundancy can be improved with the sub lines, 132, the first connection electrodes 133, and the second connection electrodes 134.

Third Embodiment

A third embodiment will be described with reference to FIGS. 22 to 27. The third embodiment includes a liquid crystal panel 210 whose outline differs from that of the first embodiment. Configuration, functions, and effects similar to those of the second embodiment may not be described.

Figure 22:
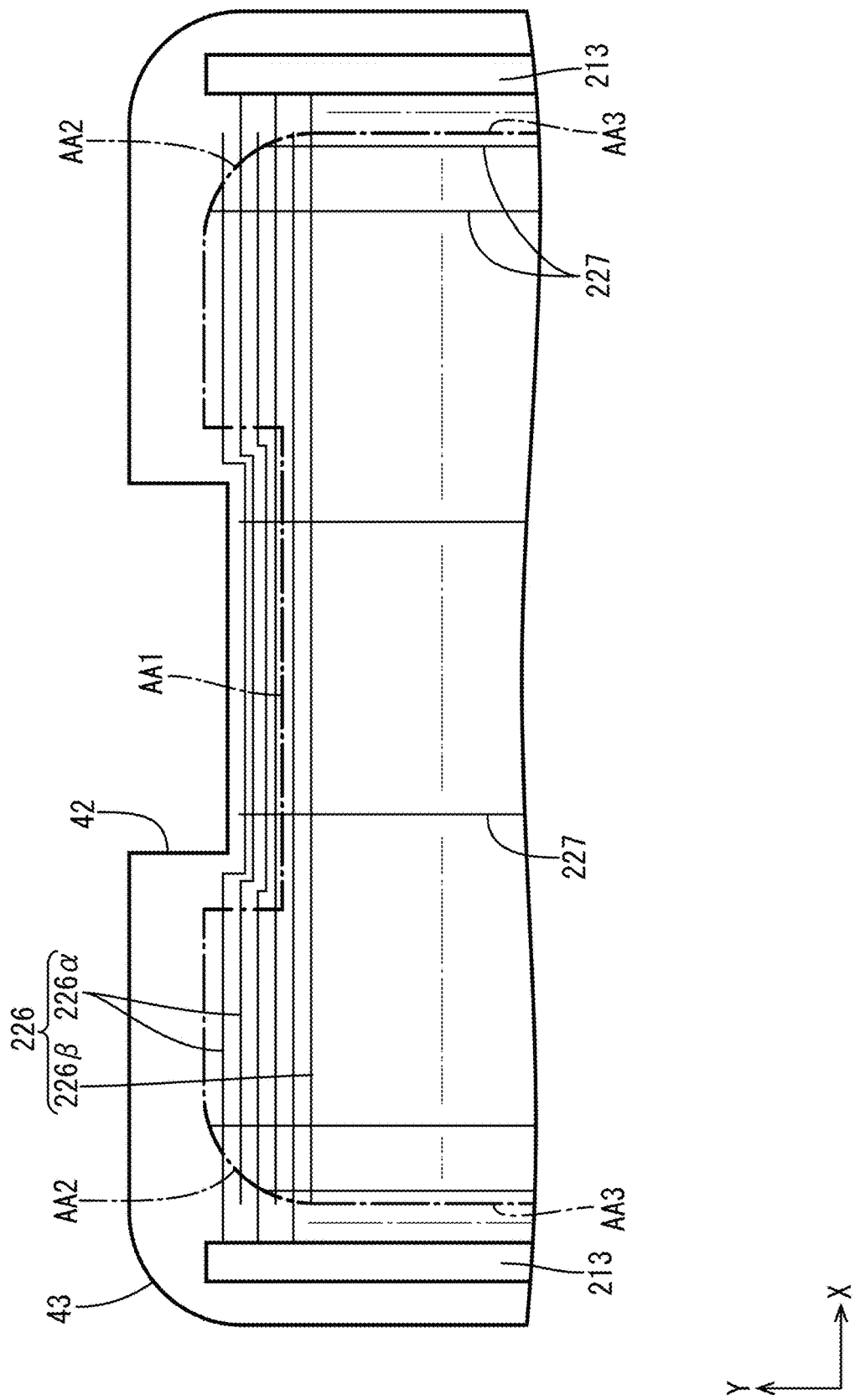
FIG. 22 is a plan view illustrating a configuration of an end portion of a liquid crystal panel according to a third embodiment with respect to a Y-axis direction.

FIG. 22 is a plan view illustrating a configuration of an edge section of the liquid crystal panel 210 with respect to the Y-axis direction. In FIG. 22, some gate lines 226 and some source lines 227 are illustrated and other configurations such as TFTs 223, pixel electrodes 224, and touch lines 231 are not illustrated. An outline of the display area AA is illustrated with a thick chain line in FIG. 22. As illustrated in FIG. 22, the outline of the liquid crystal panel 210 according to this embodiment includes a recessed portion 42 and curved portions 43 on an end that is opposite from the driver 11 (refer to FIG. 1) with respect to the Y-axis direction. Namely, the outline of the liquid crystal panel 210 has a non-rectangular shape (a shape other than a rectangular shape). The recessed portion 42 is at a middle section of the end of the liquid crystal panel 210 with respect to the X-axis direction and has a recessed shape in a plan view. The recessed portion 42 is open upward in FIG. 22 (in a direction opposite from the driver 11). A device such as a camera or a speaker can be disposed in a space in the recessed portion 42. The end of the liquid crystal panel 10 with respect to the Y-axis direction includes two curved portions 43 at two corners with respect to the X-axis direction, respectively. The liquid crystal panel 210 may include the curved portions 43 at an end including the driver 11 with respect to the Y-axis direction. The outline of the liquid crystal panel 210 includes round corners. The display area AA (an arrangement area) of the liquid crystal panel 210 has a plan-view shape that follows the outline of the liquid crystal panel 210. Namely, the outline of the display area AA has a shape that follows the outline of the liquid crystal panel 210 including the recessed portion 42 and the curved portions 43 and is a non-rectangular shape (a shape other than a rectangular shape). The outline of the display area AA includes a recessed portion AA1 and curved portions AA2. The outline of the non-display area NAA (a non-arrangement area) has a shape that follows the outline of the liquid crystal panel 210 including the recessed portion 42 and the curved portions 43. TFTs 223 that are connected to pixel electrodes 224 are disposed in the display area AA but not disposed in the non-display area NAA as previously described in the first embodiment section. Therefore, the display area AA is the arrangement area in which the TFTs 223 connected to the pixel electrodes 224 are arranged and the non-display area NAA is the non-arrangement area in which no TFTs 223 connected to the pixel electrodes 224 are arranged.

As illustrated in FIG. 22, the gate lines 226 include non-display area sections that are disposed in the non-display area NAA, in which the TFTs 223 connected to the pixel electrodes 224. The gate lines 226 include two types of gate lines whose non-display area sections have different lengths. The gate lines 226 include first gate lines 226α (first scanning lines) and second gate lines 226β (second scanning lines). The first gate lines 226α and the second gate lines 226β extend in the display area AA and the non-display area NAA. The second gate lines 226β include the non-display area sections having a length that is smaller than a length of the non-display area sections of the first gate lines 226α. The gate lines 226 that are arranged in the Y-axis direction include the first gate lines 226α that are disposed close to an upper end (close to the recessed portion 42 and the curved portions 43) in FIG. 22 with respect to the Y-axis direction. The first gate lines 226α include two end sections with respect to the X-axis direction that are disposed in the non-display area NAA and middle sections that are disposed in the non-display area NAA. In most of the first gate lines 226α including the middle sections disposed in the non-display area NAA, the middle sections are bent along the recessed portion 42. Some of the first gate lines 226α including the middle sections disposed in the non-display area NAA, that is, the first gate line 226α that is disposed close to a middle with respect to the Y-axis direction, are not bent along the recessed portion 42. The first gate lines 226α cross the curved portion AA2 of the display area AA. In most of or all of the first gate lines 226α crossing the curved portion AA2 of the display area AA, the middle sections are disposed in the non-display area NAA. The first gate lines 226α crossing the curved portion AA2 of the display area AA may include the first gate line 226α whose middle section is not disposed in the non-display area NAA.

As illustrated in FIG. 22, among the gate lines 226 that are arranged in the Y-axis direction, all the gate lines 226 except for the first gate lines 226α are the second gate lines 226β. Two end sections of each second gate line 226β with respect to the X-axis direction are disposed in the non-display area NAA and sections of the second gate lines 226β other than the end sections (including the middle sections) are disposed in the display area AA. The second gate lines 226β cross straight portions AA3 of the outline of the display area AA extending along the Y-axis direction and do not cross the curved portions AA2. The first gate lines 226α including the middle sections in the non-display area NAA include the non-display area sections disposed in the non-display area NAA that is longer than the non-display area sections of the second gate lines 226β by the length of the middle sections disposed in the non-display area NAA. In the first gate lines 226α crossing the curved portions AA2 of the display area AA, the non-display area sections that extend from a gate circuit 213 to the display area AA are longer than those of the second gate lines 226β. Namely, the distance between the gate circuit 213 to the curved portion AA2 along the X-axis direction is longer than the distance between the gate circuit 213 to the straight portion AA3. The non-display area sections of the second the second gate lines 226β are shorter than the non-display area sections of all the first gate lines 226α.

As illustrated in FIG. 22, the source lines 227 include the source lines 227 that cross the recessed portion AA1 of the display area AA. The source lines 227 crossing the recessed portion AA1 are disposed in a middle section of the display area AA with respect to the X-axis direction and are arranged in the X-axis direction in a section in which the recessed portion AA1 extends in the X-axis direction. The source lines 227 crossing the recessed portion AA1 include end sections that are on an opposite side from the driver 11 (refer to FIG. 1) and are disposed in the non-display area NAA and cross the first gate lines 226α in the non-display area NAA. The source lines 227 include the source lines 227 that are disposed at the curved portion AA2 of the display area AA. The source lines 227 that are disposed at the curved portion AA2 are disposed in two end sections of the display area AA with respect to the X-axis direction. Upper end sections of the source lines 227 that are disposed at the curved portion AA2 with respect to the X-axis direction are not disposed in the non-display area NAA. The upper end sections of the source lines 227 are disposed on an opposite side from the driver 11 in the Y-axis direction. Namely, the source lines 227 that are disposed at the curved portion AA2 vary in the lengths measured in the Y-axis direction according to the positions of the source lines 227 with respect to the X-axis direction. For example, the source line 227 that is disposed at the end with respect to the X-axis direction has a smallest length measured in the Y-axis direction. The source lines 227 that are disposed at the curved portion AA2 cross the first gate lines 226α in the display area AA. The number of first gate lines 226α that the source lines 227 disposed at the curved portion AA2 cross varies according to the positions of the source lines 227 with respect to the X-axis direction. For example, the number of first gate lines 226α that the source line 227 disposed at the end with respect to the X-axis direction crosses is smallest. The relation of touch lines 231 and the gate lines 226 is similar to the relation of the source lines 227 and the gate lines 226.

Figure 23:
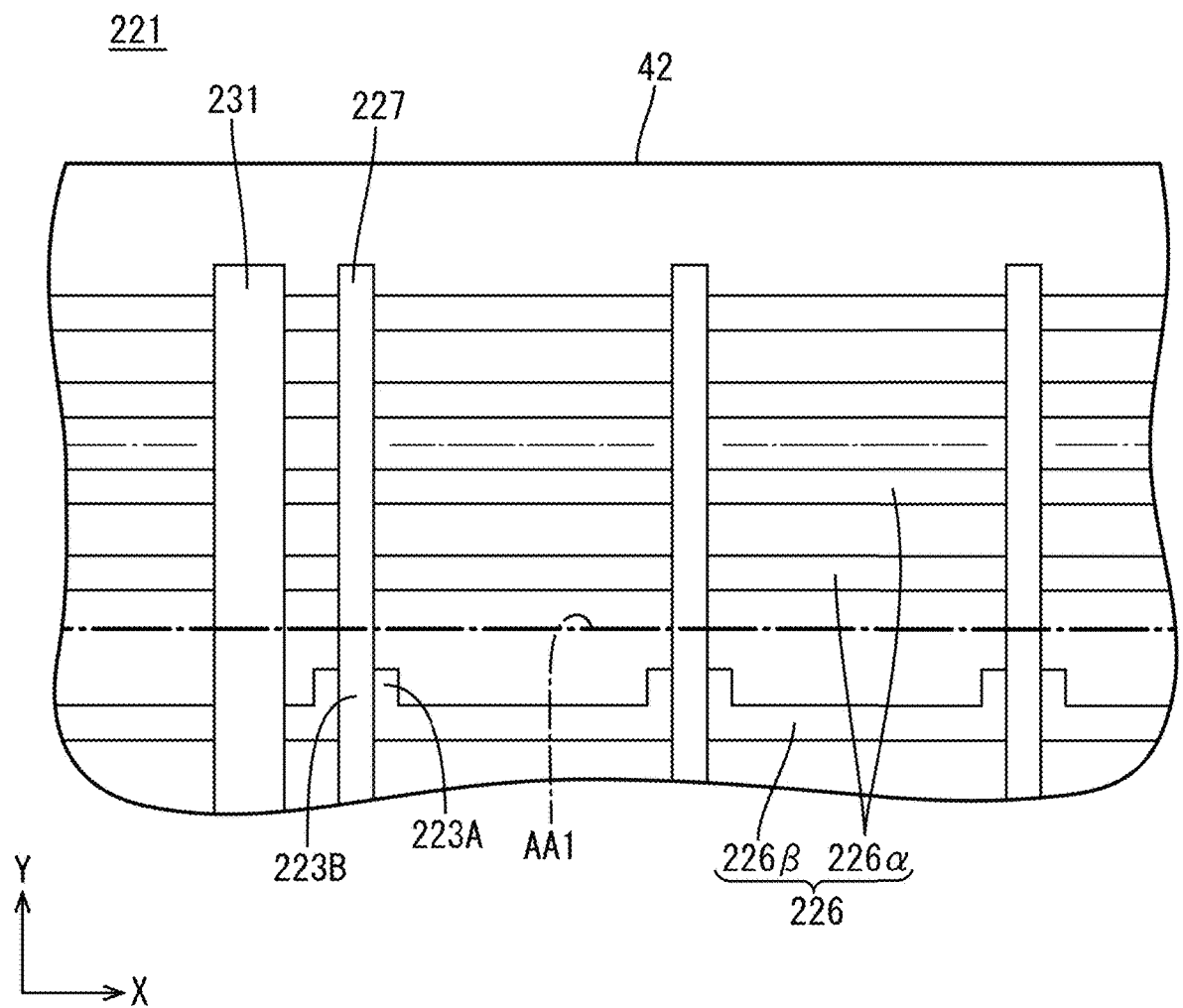
FIG. 23 is a magnified plan view of a recessed portion of the array substrate.
Figure 24:
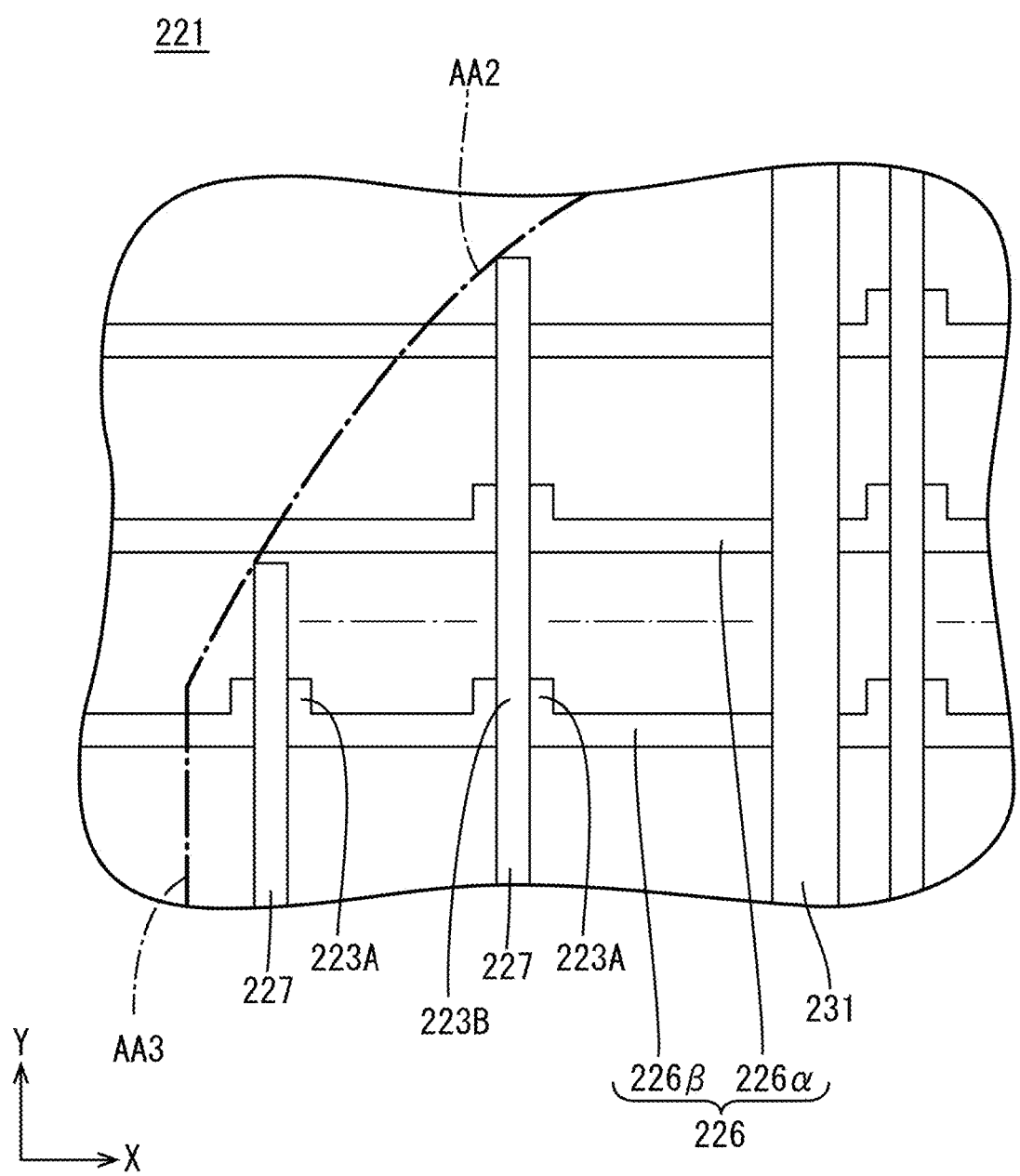
FIG. 24 is a magnified plan view of a curved portion of the array substrate.

FIG. 23 is a magnified plan view illustrating a portion of the array substrate 221 including the recessed portion 42. FIG. 24 is a magnified plan view illustrating a portion of the array substrate 221 including the curved portion 43. In FIGS. 23 and 24, portions of the gate lines 226, the source lines 227, and the touch line 231 are illustrated and other configurations (such as drain electrodes 223C, the channels 23D, and the pixel electrodes 224) are not illustrated for easy understanding of the configuration. In FIGS. 23 and 24, the outline of the display area AA is illustrated with a thick chain line. As illustrated in FIG. 23, the middle sections of the first gate lines 226α (with respect to the X-axis direction) that extend in the non-display area NAA do not include sections configured as the gate electrodes 233A. Therefore, the middle sections of the first gate lines 226α that extend in the non-display area NAA have a constant width. On the other hand, the middle sections of the second gate lines 226β with respect to the X-axis direction extend in the display area AA and therefore, include sections configured as the gate electrodes 223A. Therefore, in the middle sections of the second gate lines 226β, the width varies such that the width of the sections of the second gate lines 226β to be configured as the gate electrodes 223A is greater than other sections. With the above configuration, the source lines 227 crossing the recessed portion AA1 of the display area AA have overlapping portions overlapping the first gate lines 226α. An area of the overlapping portion of the source line 227 and the first gate line 226α is smaller than an area of the overlapping portion of the source line 227 overlapping the second gate line 226β.

As illustrated in FIG. 24, the end sections of the first gate lines 226α include the non-display area sections extending in the non-display area NAA and the non-display area sections of the end sections of the first gate lines 226α are longer than the end section of the second gate line 226β. Therefore, the number of source lines 227 that the first gate line 226α crosses is smaller than the number of source lines 227 that the second gate line 226β crosses. Furthermore, among the first gate lines 226α, the number of source lines 227 that the first gate line 226α disposed on an upper side (far away from the driver 11) in FIG. 24 crosses is smaller than the number of source lines 227 that the first gate line 226α disposed on a lower side (close to the driver 11) in FIG. 24 crosses.

As illustrated in FIGS. 23 and 24, a total of the overlapping areas of overlapping portions of the second gate line 226β and the source lines 227 is greater than a total of the overlapping areas of the overlapping portions of the first gate line 226α and the source lines 227. Accordingly, parasitic capacitance that is created between the second gate line 226β and the source lines 227 is greater than parasitic capacitance that is created between the first gate line 226α and the source lines 227.

Figure 25:
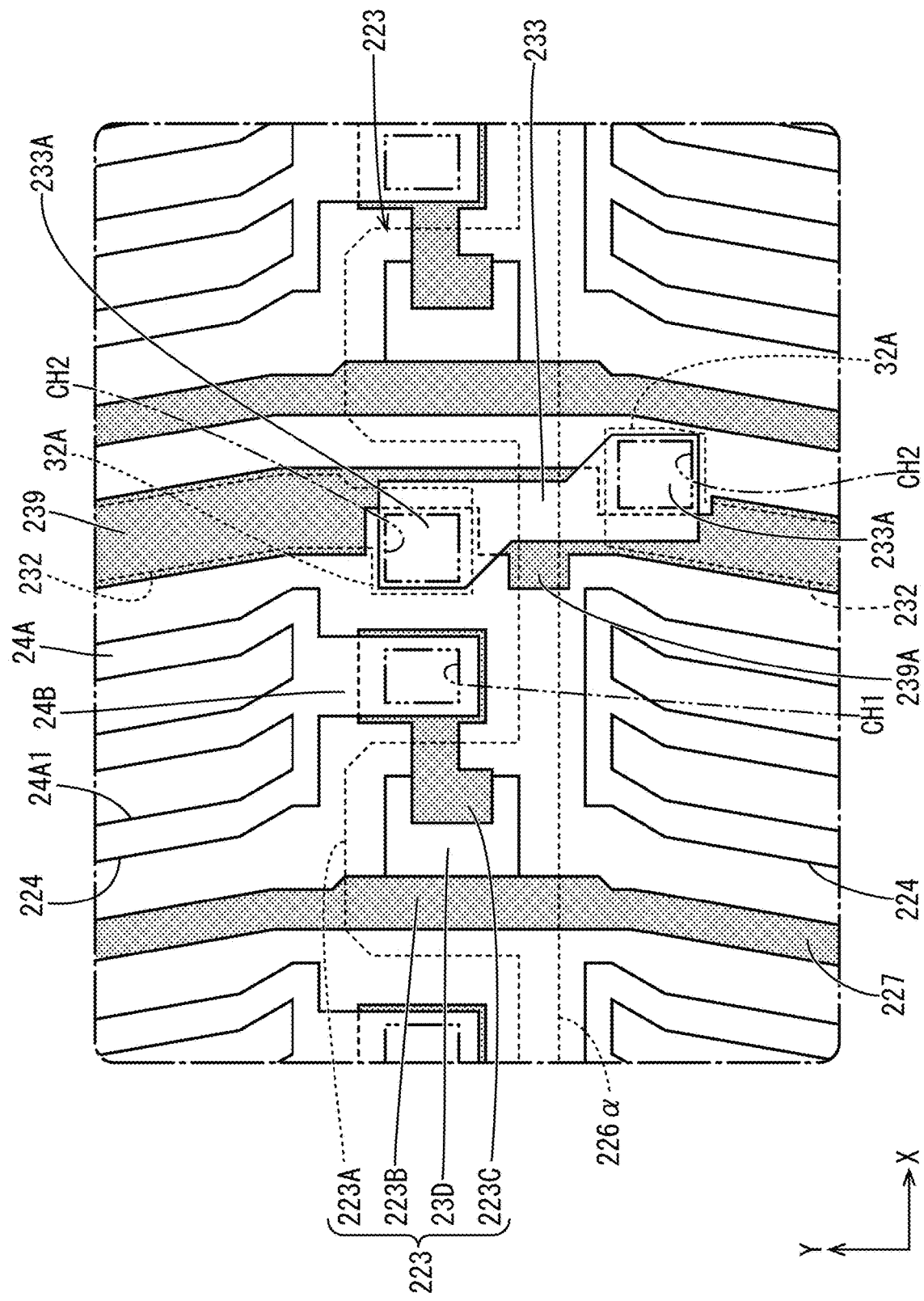
FIG. 25 is a plan view illustrating a pattern of a second metal film on a portion of the array substrate near a first gate line, a TFT, and a first connection electrode.
Figure 26:
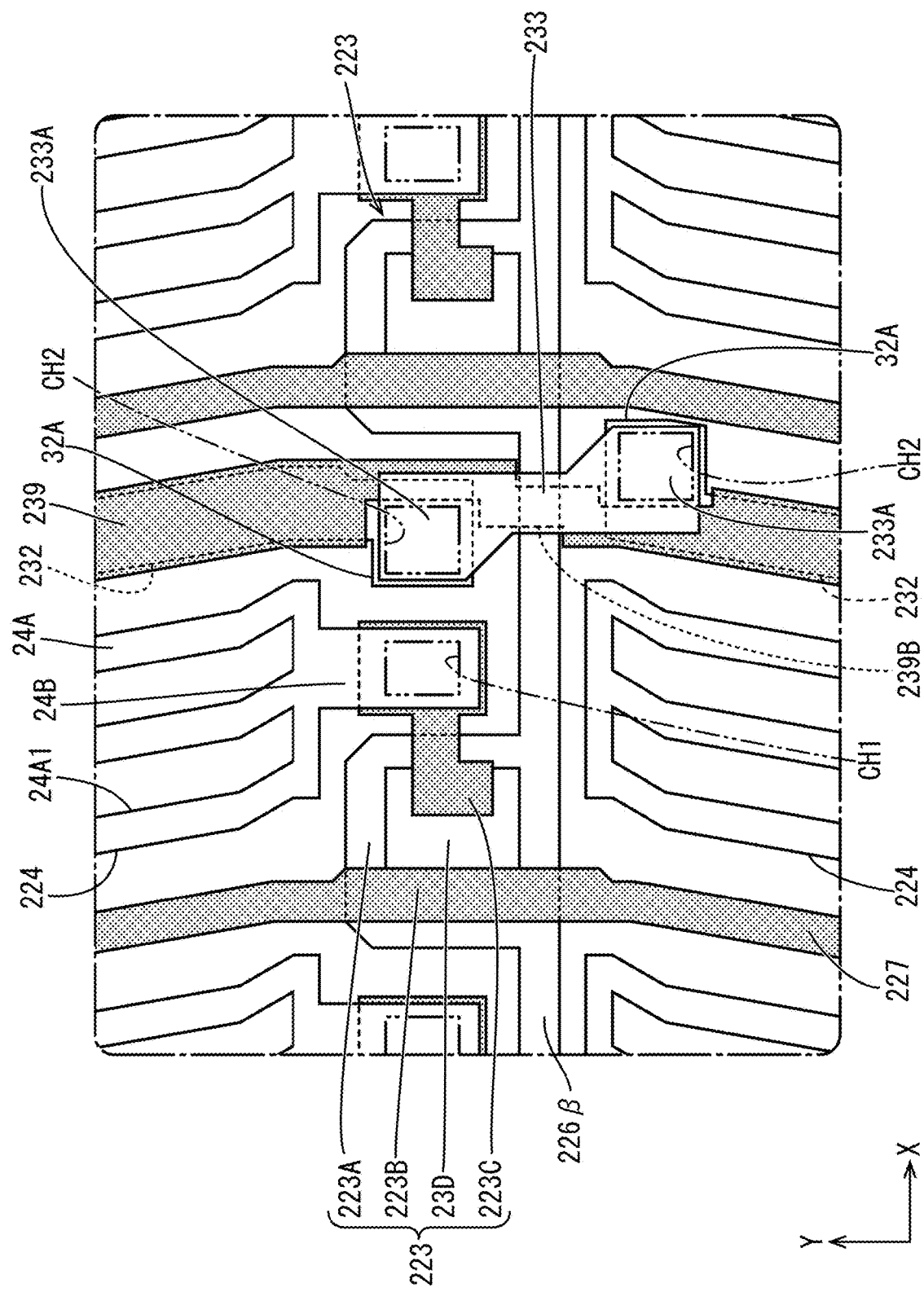
FIG. 26 is a plan view illustrating a pattern of a second metal film on a portion of the array substrate near a second gate line, the TFT, and the first connection electrode.
Figure 27:
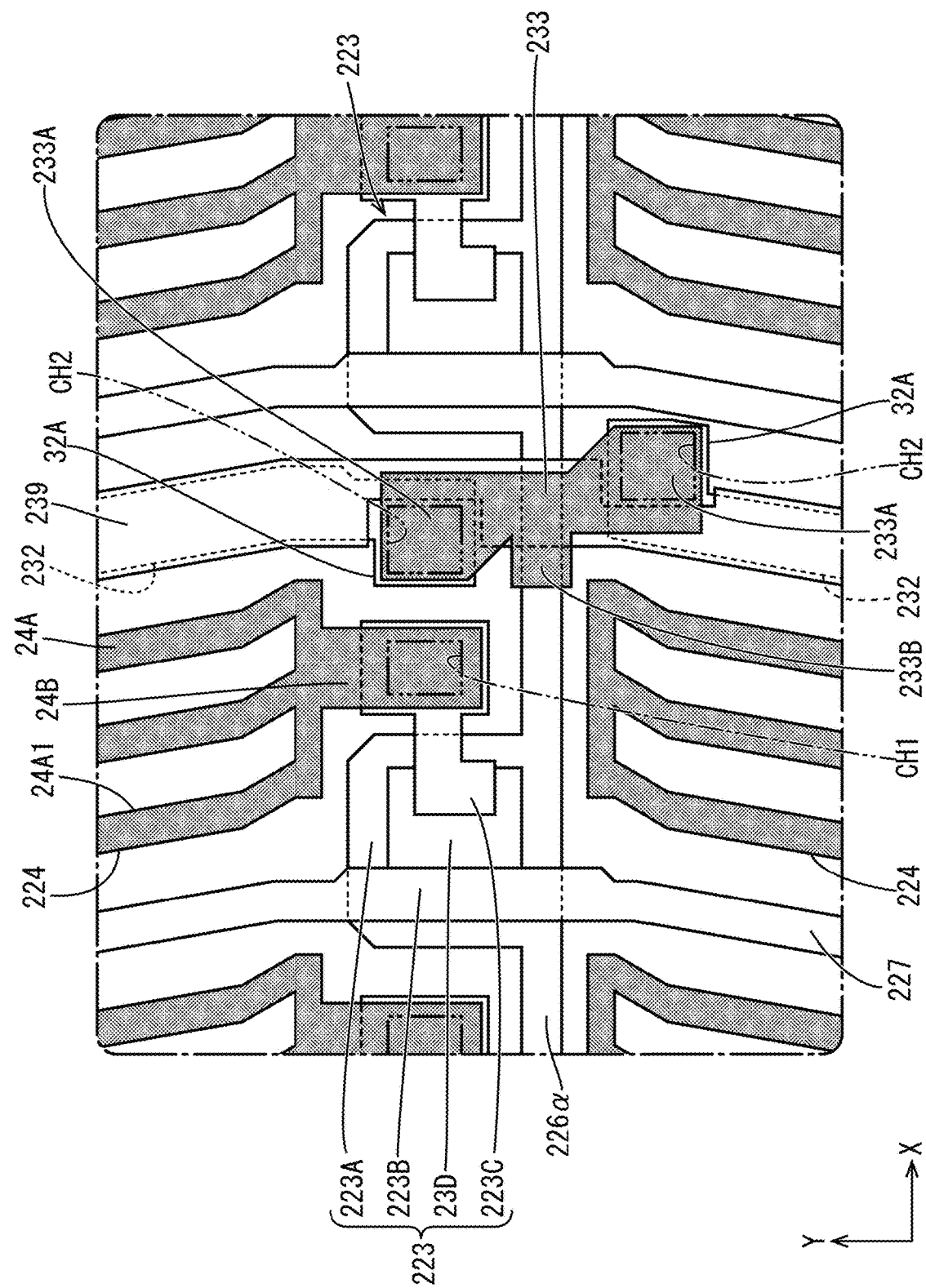
FIG. 27 is a plan view illustrating a pattern of a second transparent electrode film on a portion of the array substrate near the first gate line, the TFT, and the first connection electrode.

This embodiment includes a configuration illustrated in FIGS. 25 to 27 to reduce the difference in the parasitic capacitances created at the first gate line 226α and the second gate line 226β. FIG. 25 is a plan view illustrating a portion of the array substrate 221 including a second connection line 239 that crosses the first gate line 226α. FIG. 25 illustrates a pattern of the second metal film F4 with a shading. FIG. 26 is a plan view illustrating a portion of the array substrate 221 including the second connection line 239 that crosses the second gate line 226β. FIG. 26 illustrates a pattern of the second metal film F4 with a shading. FIG. 27 is a plan view illustrating a portion of the array substrate 221 including a first connection electrode 233 that crosses the first gate line 226α. FIG. 27 illustrates a pattern of the second transparent electrode film F8 with a shading.

As illustrated in FIG. 25, the second connection line 239 crossing the first gate line 226α includes a wide section 239A that crosses the first gate line 226α. Specifically, the section of the second connection line 239 crossing the first gate line 226α is wider than the section of the second connection line 239 overlapping the sub line 232 and is widest in the second connection line 239. The second connection line 239 includes the wide section 239A that crosses the first gate line 226α. As illustrated in FIG. 26, the second connection line 239 crossing the second gate line 226β includes a narrow section 239B that crosses the second gate line 226β. Specifically, the section of the second connection line 239 crossing the second gate line 226β is narrower than the section of the second connection line 239 overlapping the sub line 232 and is narrowest in the second connection line 239. The second connection line 239 includes the narrow section 239B that crosses the second gate line 226β. With such a configuration, an overlapping area of an overlapping portion of the first gate line 226α and the second connection line 239 is greater than an overlapping area of an overlapping portion of the second gate line 226β and the second connection line 239. Accordingly, parasitic capacitance that is created between the first gate line 226α and the second connection line 239 that cross each other is greater than parasitic capacitance that is created between the second gate line 226β and the second connection line 239 that cross each other. The above-described configuration can reduce the difference between a total of the parasitic capacitance that is created between the first gate line 226α and the source lines 227 and the parasitic capacitance that is created between the second connection line 239 and the first gate line 226α and a total of the parasitic capacitance that is created between the second gate line 226β and the source lines 227 and the parasitic capacitance that is created between the second connection line 239 and the second gate line 226β.

As illustrated in FIG. 27, the first connection electrode 233 includes a wide section 233B that crosses the first gate line 226α. Specifically, the first connection electrode 233 includes the wide section 233B that crosses the first gate line 226α and is wider than the contact portion 233A and is widest in the first connection electrode 233. On the other hand, the first connection electrode 233 includes a narrow section that crosses the second gate line 226β and is narrower than the contact portion 233A (refer to FIG. 11). Since the wide section 233B of the first connection electrode 233 crosses the first gate line 226α, an overlapping area of an overlapping portion of the first gate line 226α and the first connection electrode 233 is greater than an overlapping area of an overlapping portion of the second gate line 226β and the first connection electrode 233. Accordingly, parasitic capacitance that is created between the first connection electrode 233 and the first gate line 226α crossing each other is greater than parasitic capacitance that is created between the first connection electrode 233 and the second gate line 226β crossing each other. The two sub lines 232 that are connected to the first connection electrode 233 including the wide section 233B are to be connected to the second connection line 239. The above-described configuration can reduce the difference between a total of the parasitic capacitance that is created between the first gate line 226α and the source lines 227 and the parasitic capacitance that is created between the second connection line 239 and the first gate line 226α and a total of the parasitic capacitance that is created between the second gate line 226β and the source lines 227 and the parasitic capacitance that is created between the second connection line 239 and the second gate line 226β.

As described before, this embodiment includes the TFTs 223, the gate lines 226, the source lines 227, and the pixel electrodes 224. The TFTs 223 include the gate electrodes 223A (the first electrodes), the source electrodes 223B (the second electrodes), and the drain electrodes 223C (the third electrodes). The gate lines 226 extend along the first direction and are connected to the gate electrodes 223A. The source lines 227 extend along the second direction and are connected to the source electrodes 223B. The pixel electrodes 224 are connected to the drain electrodes 223C. The first lines include the gate lines 226. The source lines 227 are portions of the second metal film F4. The portions of the second metal film F4 configured as the source lines 227 are different from the portions of the second metal film F4 configured as the second connection lines 239 (the second line). The gate electrodes 223A are portions of the gate lines 226. The source electrodes 223B are portions of the source lines 227 and are disposed to overlap the gate electrodes 223A, respectively, via the gate insulating film F2. The TFTs 223 are arranged in a surface area of the array substrate 221 such that the TFTs 223 are not arranged in a section of the surface area. Thus, the surface area of the array substrate 221 includes the display area AA (the arrangement area) in which the TFTs 223 are arranged and the non-display area NAA (the non-arrangement area) in which no TFT 223 is arranged. The gate lines 226 include the first gate lines 226α (the first scanning lines) and the second gate lines 226β (the second scanning lines). The first gate lines 226α extend in the display area AA and the non-display area NAA. The second gate lines 226β extend in the display area AA and the non-display area NAA and include the non-display area sections that extend in the non-display area. The non-display area sections of the second gate lines 226β are shorter than the non-display area sections of the first gate lines 226α. The overlapping area of the overlapping portion of the first gate line 226α and the second connection line 239 (the second line) is greater than the overlapping area of the overlapping portion of the second gate lines 226β and the second connection line 239 (the second line).

According to such a configuration, with the TFTs 223 being driven based on the signals supplied via the gate lines 226, the pixel electrodes 224 are charged at a potential based on the signals supplied to the source lines 227. The second gate lines 226β include the non-display area sections extending in the non-display area NAA and the non-display area sections of the second gate lines 226β are shorter than the non-display area sections of the first gate lines 226α. The gate electrodes 223A of the TFTs 223, which are arranged in the display area AA and not arranged in the non-display area NAA, are portions of the gate lines 226. For example, the gate electrodes 223A are wide sections of the gate lines 226. Therefore, a total of overlapping areas of the overlapping portions of the second gate line 226β and the source lines 227 is greater than a total of overlapping areas of the overlapping portions of the first gate line 226α and the source lines 227. Accordingly, the parasitic capacitance that is created between the second gate line 226β and the source lines 227 is greater than the parasitic capacitance that is created between the first gate line 226α and the source lines 227. On the other hand, the overlapping area of the overlapping portion of the first gate line 226α and the second connection line 239 (the second line) is greater than the overlapping area of the overlapping portion of the second gate line 226β and the second connection line 239 (the second line). Accordingly, the parasitic capacitance that is created between the first gate line 226α and the second connection line 239 (the second line) is greater than the parasitic capacitance that is created between the second gate line 226β and the second connection line 239 (the second line). The above-described configuration can reduce the difference between a total of the parasitic capacitance that is created between the first gate line 226α and the source lines 227 and the parasitic capacitance that is created between the second connection line 239 and the first gate line 226α and a total of the parasitic capacitance that is created between the second gate line 226β and the source lines 227 and the parasitic capacitance that is created between the second connection line 239 and the second gate line 226β.

This embodiment includes the TFTs 223, the gate lines 226, the source lines 227, and the pixel electrodes 224. The TFTs 223 include the gate electrodes 223A, the source electrodes 223B, and the drain electrodes 223C. The gate lines 226 extend along the first direction and are connected to the gate electrodes 223A. The source lines 227 extend along the second direction and are connected to the source electrodes 223B. The pixel electrodes 224 are connected to the drain electrodes 223C. The first lines include the gate lines 226. The source lines 227 are portions of the second metal film F4. The portions of the second metal film F4 configured as the source lines 227 are different from the portions of the second metal film F4 configured as the second connection line 239 (the second line). The gate electrodes 223A are portions of the gate lines 226. The source electrodes 223B are portions of the source lines 227 and are disposed to overlap the gate electrodes 223A, respectively, via the gate insulating film F2. The TFTs 223 are arranged in a surface area of the array substrate 221 such that the TFTs 223 are not arranged in a section of the surface area. Thus, the surface area of the array substrate 221 includes the display area AA in which the TFTs 223 are arranged and the non-display area NAA in which no TFT 223 is arranged. The gate lines 226 include the first gate lines 226α and the second gate lines 226β. The first gate lines 226α extend in the display area AA and the non-display area NAA. The second gate lines 226β extend in the display area AA and the non-display area NAA and include the non-display area sections that extend in the non-display area. The non-display area sections of the second gate lines 226β are shorter than the non-display area sections of the first gate lines 226α. The overlapping area of the overlapping portion of the first gate line 226α and the first connection electrode 233 that is connected to two sub lines 232 (third lines) sandwiching the first gate line 226α is greater than the overlapping area of the overlapping portion of the second gate lines 226β and the first connection electrode 233 that is connected to two sub lines (the third lines) sandwiching the second gate lines 226β.

According to such a configuration, with the TFTs 223 being driven based on the signals supplied via the gate lines 226, the pixel electrodes 224 are charged at a potential based on the signals supplied to the source lines 227. The second gate lines 226β include the non-display area sections extending in the non-display area NAA and the non-display area sections of the second gate lines 226β are shorter than the non-display area sections of the first gate lines 226α. The gate electrodes 223A of the TFTs 223, which are arranged in the display area AA and not arranged in the non-display area NAA, are portions of the gate lines 226. For example, the gate electrodes 223A are wide sections of the gate lines 226. Therefore, a total of overlapping areas of the overlapping portions of the second gate line 226β and the source lines 227 is greater than a total of overlapping areas of the overlapping portions of the first gate line 226α and the source lines 227. Accordingly, the parasitic capacitance that is created between the second gate line 226β and the source lines 227 is greater than the parasitic capacitance that is created between the first gate line 226α and the source lines 227. On the other hand, the overlapping area of the overlapping portion of the first gate line 226α and the first connection electrode 233 that is connected to the two sub lines 232 (the third lines) sandwiching the first gate line 226α is greater than the overlapping area of the overlapping portion of the second gate line 226β and the first connection electrode 233 that is connected to the two sub lines (the third lines) sandwiching the second gate line 226β. Accordingly, the parasitic capacitance that is created between the first gate line 226α and the first connection electrode 233 that is connected to the two sub lines 232 sandwiching the first gate line 226α is greater than the parasitic capacitance that is created between the second gate line 226β and the first connection electrode 233 that is connected to the two sub lines 232 sandwiching the second gate line 226β. The sub lines 232 (the third lines, fourth lines) are connected to the second connection line 239 (the second line, connection line) via the second connection electrode 134 (refer to FIG. 21). The above-described configuration can reduce the difference between a total of the parasitic capacitance that is created between the first gate line 226α and the source lines 227 and the parasitic capacitance that is created between the second connection line 239 (the second line) and the first gate line 226α and a total of the parasitic capacitance that is created between the second gate line 226β and the source lines 227 and the parasitic capacitance that is created between the second connection line 239 (the second line) and the second gate line 226β.

Fourth Embodiment

A fourth embodiment will be described with reference to FIG. 28. The fourth embodiment includes second connection electrodes 334 and the number of second connection electrodes 334 differs from that of the first embodiment. Configuration, functions, and effects similar to those of the first embodiment may not be described.

Figure 28:
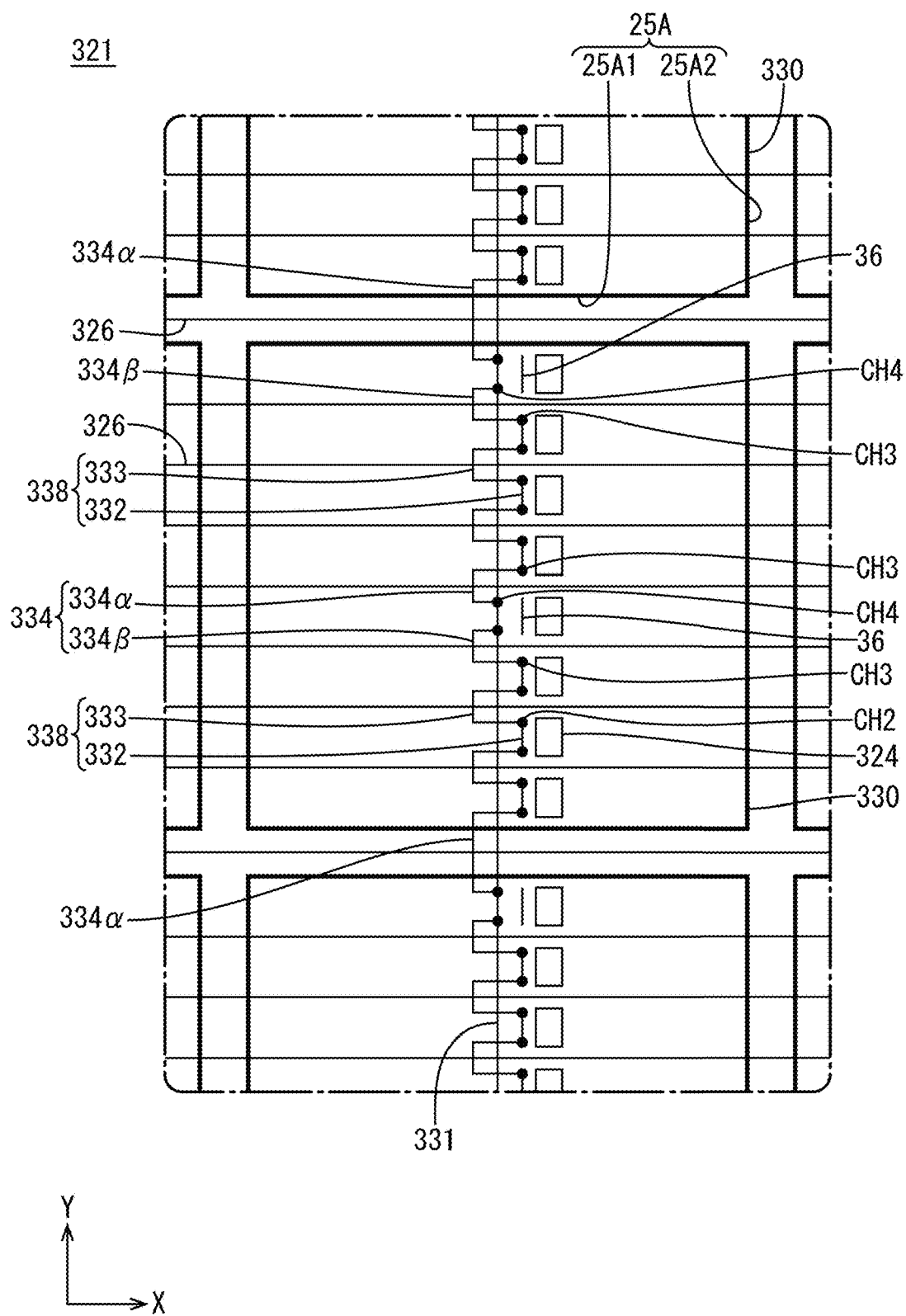
FIG. 28 is a plan view schematically illustrating connection configurations of touch electrodes, touch lines, and sub lines included in an array substrate according to a fourth embodiment.

FIG. 28 is a plan view schematically illustrating a connection pattern of touch electrodes 330, touch lines 331, and sub lines 332 in an array substrate 321. The touch line 331 illustrated in FIG. 28 is connected to the touch electrode 330 that is disposed at a position upper than the uppermost touch electrode 330 in FIG. 28. The configuration other than the touch line 331 illustrated in FIG. 28 is similar to that in FIG. 10 and the configuration is illustrated with being simplified.

As illustrated in FIG. 28, the second connection electrodes 334 are disposed adjacent to the edges of the touch electrode 330 with respect to the Y-axis direction and also disposed in a middle section of the touch electrode 330 with respect to the Y-axis direction. Specifically, a second connection electrode 334α and a second connection electrode 334β are disposed in the middle section of the touch electrode with respect to the Y-axis direction. The second connection electrode 334α and the second connection electrode 334β are disposed in the middle section of the touch electrode 30 to cross two gate lines 326, respectively, that sandwich the pixel electrode 324 with respect to the Y-axis direction. The second connection electrode 334α is disposed on an upper side with respect to the second connection electrode 334β in FIG. 28. The second connection electrode 334α is connected to the sub line 332 that is adjacent to and on an upper side with respect to the gate line 326 crossing the second connection electrode 334α. The second connection electrode 334β is connected to the sub line 332 that is adjacent to and on a lower side with respect to the gate line 326 crossing the second connection electrode 334β. The second connection electrode 334α and the second connection electrode 334β are connected to a section of the touch line 331 that is between the two gate lines 326 crossing the second connection electrode 334α and the second connection electrode 334β, respectively. Between the second connection electrode 334α that is disposed in the middle section of the touch electrode 330 and the second connection electrode 334β that is disposed adjacent to the upper edge of the touch electrode 330 with respect to the Y-axis direction, the sub lines 332 and the gate lines 326 are arranged alternately with respect to the Y-axis direction. The first connection electrodes 333 connected to the sub lines 332 and the sub lines 332 that are disposed between the second connection electrode 334α and the second connection electrode 334β are configured as a first connection line 338. Between the second connection electrode 334β that is disposed in the middle section of the touch electrode 330 and the second connection electrode 334α that is disposed adjacent to the lower edge of the touch electrode 330 with respect to the Y-axis direction, the sub lines 332 and the gate lines 326 are arranged alternately with respect to the Y-axis direction. The first connection electrodes 333 connected to the sub lines 332 and the sub lines 332 that are disposed between the second connection electrode 334β and the second connection electrode 334α are configured as another first connection line 338. The two first connection lines 338 are connected to the section of the touch line 331 that crosses the touch electrode 330. Redundancy of the touch line 331 connected to the two first connection lines 338 is further improved compared to the first embodiment. Each of the two first connection lines 338 has a length that is slightly smaller than a half dimension of one side of the touch electrode 330.

Fifth Embodiment

A fifth embodiment will be described with reference to FIG. 29. The fifth embodiment includes second connection electrodes 434 that are arranged in a different manner from that in the first embodiment. Configuration, functions, and effects similar to those of the first embodiment may not be described.

Figure 29:
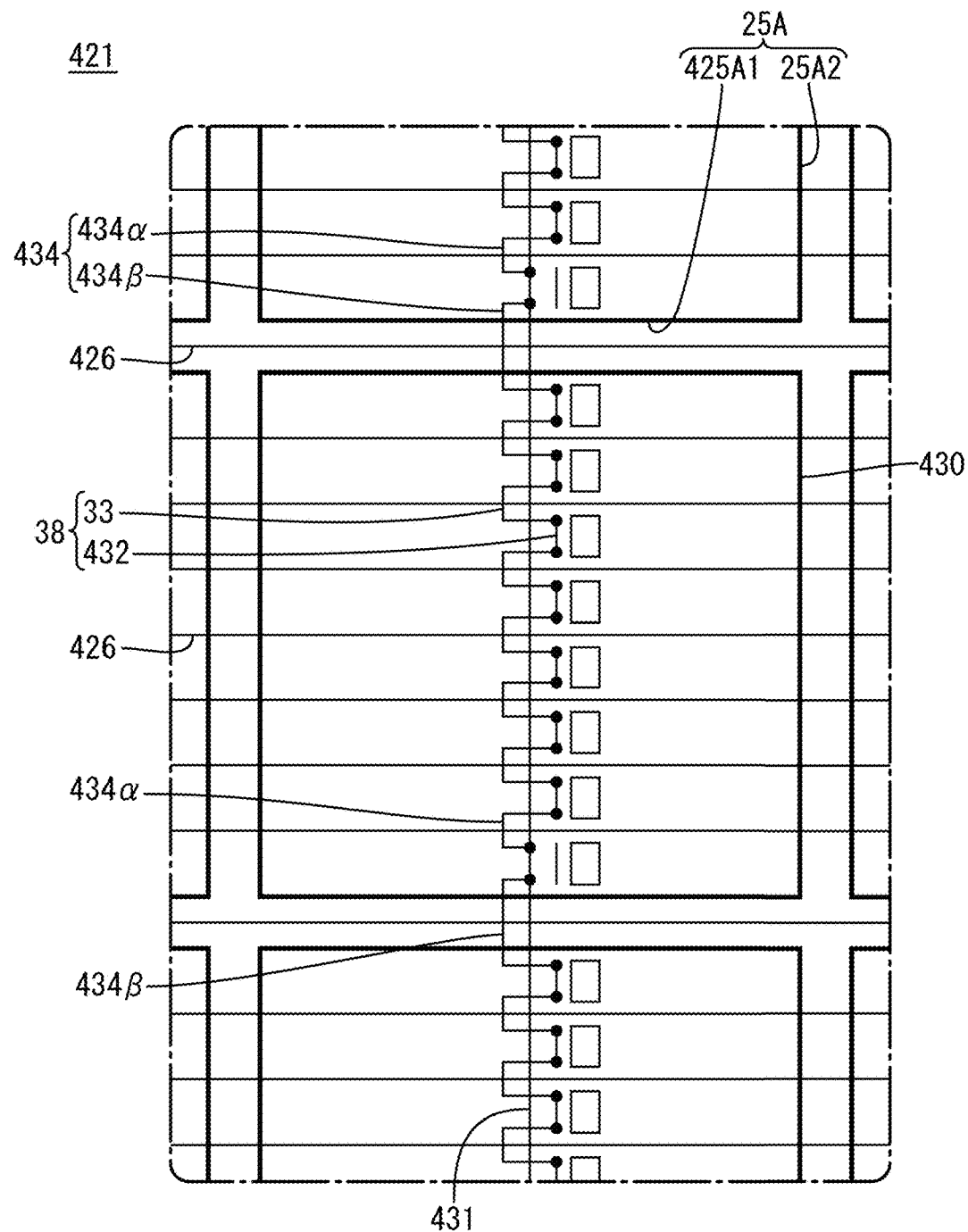
FIG. 29 is a plan view schematically illustrating connection configurations of touch electrodes, touch lines, and sub lines included in an array substrate according to a fifth embodiment.

FIG. 29 is a plan view schematically illustrating a connection pattern of touch electrodes 430, touch lines 431, and sub lines 432 in an array substrate 421. The touch line 431 illustrated in FIG. 29 is connected to the touch electrode 430 that is disposed at a position upper than the uppermost touch electrode 430 in FIG. 29. The configuration other than the touch line 431 illustrated in FIG. 29 is similar to that in FIG. 10 and the configuration is illustrated with being simplified.

In this embodiment, as illustrated in FIG. 29, the arrangement of a second connection electrode 434α and a second connection electrode 434β is reversed from that of the first embodiment. Specifically, the second connection electrode 434β is disposed to straddle a first slit 425A1 defining each of the two touch electrodes 430 that are adjacent to each other in the Y-axis direction and are not connected to the touch line 431 in FIG. 29. The second connection electrode 434β is disposed to cross the gate line 426 that is in the first slit 425A1. The second connection electrode 434α is disposed to cross the gate line 426 that is adjacent to and on an upper side with respect to the gate line 426 that is in the first slit 425A1 defining each of the two touch electrodes 430 with respect to the Y-axis direction in FIG. 29. The gate line 426 crossing the second connection electrode 434α is disposed away from the gate line 426 that is in the first slit 425A1. With the second connection electrodes 434 being arranged as illustrated in FIG. 29, the operations and effects similar to those of the first embodiment can be obtained.

Sixth Embodiment

A sixth embodiment will be described with reference to FIG. 30. The sixth embodiment includes second connection electrodes 534 and the number of second connection electrodes 534 differs from that in the first embodiment. Configuration, functions, and effects similar to those of the first embodiment may not be described.

Figure 30:
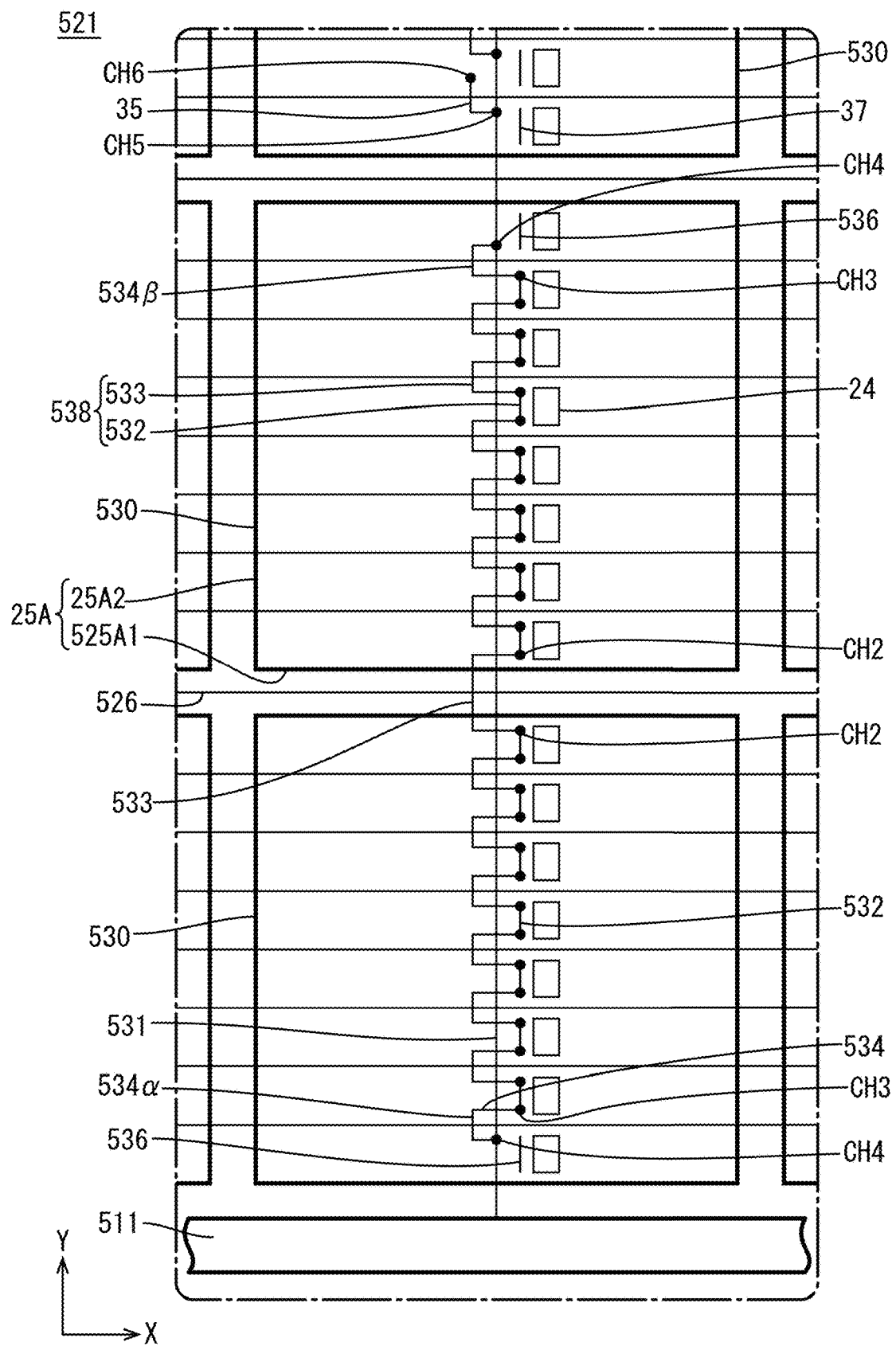
FIG. 30 is a plan view schematically illustrating connection configurations of a driver, touch electrodes, touch lines, and sub lines included in an array substrate according to a sixth embodiment.

FIG. 30 is a plan view schematically illustrating a connection pattern of a driver 511, touch electrodes 530, touch lines 531, and sub lines 532 in an array substrate 521. The configuration illustrated in FIG. 29 is similar to that in FIG. 10 except that the driver 511 is illustrated. The configuration is illustrated with being simplified in FIG. 30.

As illustrated in FIG. 30, two second connection electrodes 534 are connected to one touch line 531. One of the two second connection electrodes 534 is disposed near an edge of the touch electrode 530 close to the driver 511 and another one is disposed near an edge of another touch electrode 530 that is close to a target touch electrode 530 to be connected to the touch line 531. Specifically, a second connection electrode 534α included in the two second connection electrodes 534 is disposed to cross the gate line 526 that is closest to the driver 511 with respect to the Y-axis direction. The gate line 526 crossing the second connection electrode 534α overlaps the touch electrode 530 that is closest to the driver 511 with respect to the Y-axis direction. A second connection electrode 534β included in the two second connection electrodes 534 is disposed to cross the gate line 526 that is a second one from the target touch electrode 530 to be connected to the touch line 531 with respect to the Y-axis direction. The gate line 526 disposed in a first slit 525A1 that is between the target touch electrode 530 to be connected to the touch line 531 and the touch electrode 530 that is adjacent to the target touch electrode on the driver 511 side is defined as the gate line 526 in the first slit 525A1. The gate line 526 crossing the second connection electrode 534β is disposed adjacent to and away from the gate line 526 in the first slit 525A1 at an interval to be closer to the driver 511. The sub lines 532 that are disposed between the two second connection electrodes 534 with respect to the Y-axis direction are connected to the two second connection electrodes 534 and the first connection electrodes 533. The sub lines 532 and the first connection electrodes 533 are configured as a first connection line 538. The length of the first connection line 538 is greater than a dimension of one side of the touch electrode 530 and is close to a length of a section of the touch line 531 extending from the driver 511 to the target touch electrode 530. Compared to the first connection line 38 of the first embodiment (refer to FIG. 10), the number of sub lines 532 and the number of first connection electrodes 533 included in the first connection line 538 increase and the number of first dummy lines 536 decreases. Therefore, a resistance of the touch line 531 connected to the first connection line 538 is further reduced compared to the first embodiment. In this embodiment, the first connection electrodes 533 include the first connection electrode 533 that straddles the first slit 525A1 defining each of the touch electrodes 530 that are adjacent to each other with respect to the Y-axis direction.

Seventh Embodiment

A seventh embodiment will be described with reference to FIG. 31. Unlike the first embodiment, the seventh embodiment includes second connection electrodes 634 that are connected to a source line 627 (the second line). Configuration, functions, and effects similar to those of the first embodiment may not be described.

Figure 31:
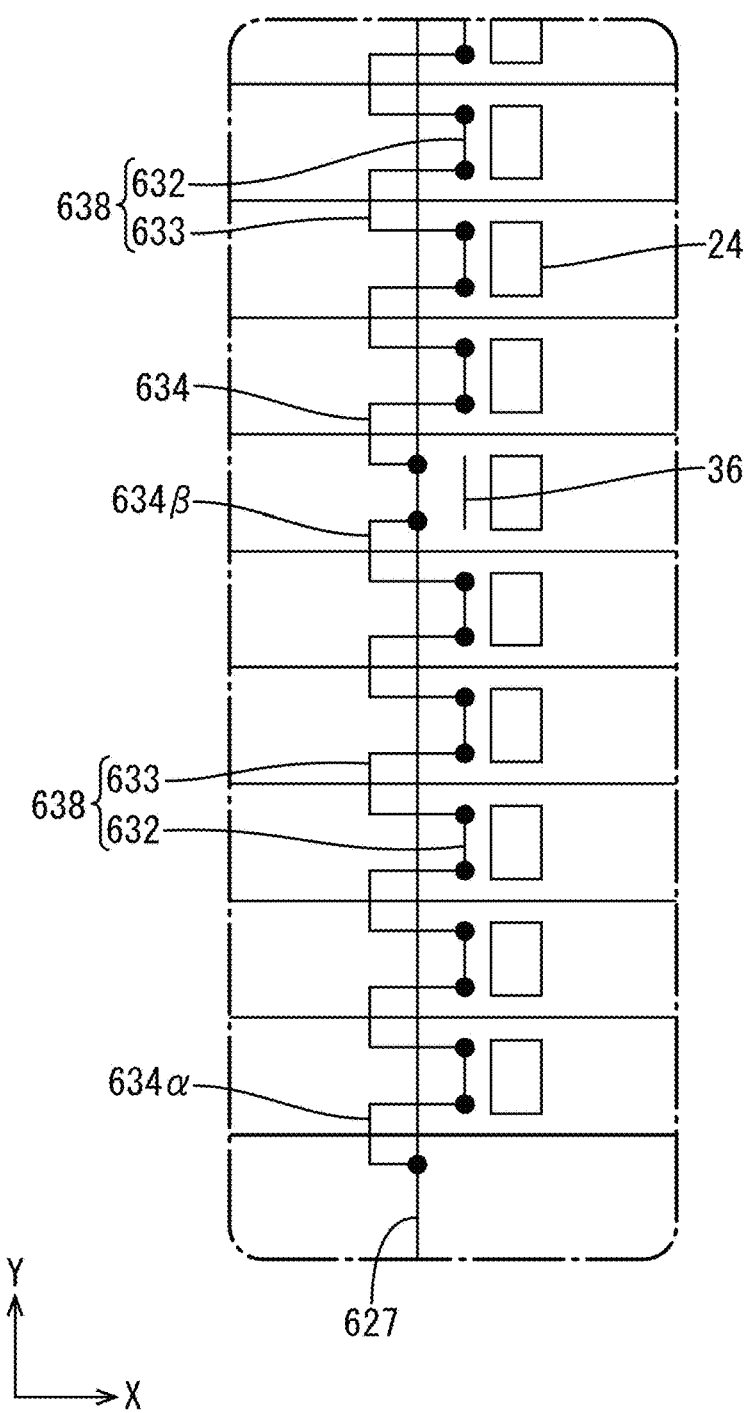
FIG. 31 is a plan view schematically illustrating connection configurations of source lines and sub lines included in an array substrate according to a seventh embodiment.

FIG. 31 is a plan view schematically illustrating a connection pattern of source lines 627 and sub lines 632 in an array substrate 621. The configuration illustrated in FIG. 31 is similar to that in FIG. 10 except that the source line 627 is illustrated instead of the touch line 31 and the touch electrodes 30 are not illustrated. The configuration is illustrated with being simplified in FIG. 31.

As illustrated in FIG. 31, the source line 627 according to this embodiment is connected to the second connection electrodes 634. The source line 627 includes contact portions that are connected to the second connection electrodes 634, respectively. The second connection electrode 634 is connected to the source line 627 and the sub line 632. The sub lines 632 are disposed to overlap the source line 627 via the gate insulating film F2 (refer to FIG. 12). A second connection electrode 634α and a second connection electrode 634β are disposed such that the sub lines 632 and the first connection electrodes 633 are disposed between the second connection electrode 634α and the second connection electrode 634β with respect to the Y-axis direction. The sub lines 632 and the first connection electrodes 633 that are disposed between the second connection electrode 634α and the second connection electrode 634β are configured as a first connection line 638. The first connection lines 638 are connected to the source line 627. According to such a configuration, a resistance of the source line 627 is reduced and redundancy is improved. Since a resistance of the source line 627 is reduced, the width of the source line 627 can be reduced. With the width of the source line 627 being reduced, an area having no lines is increased and an area where the pixels PX are disposed in the surface area of the array substrate 621 is increased. This increases an aperture ratio. The source line 627 is not connected to the third connection electrodes 35.

Eighth Embodiment

An eighth embodiment will be described with reference to FIG. 32. The eighth embodiment includes a common line 44 (the second line) in addition to the configuration of the first embodiment. Configuration, functions, and effects similar to those of the first embodiment may not be described.

Figure 32:
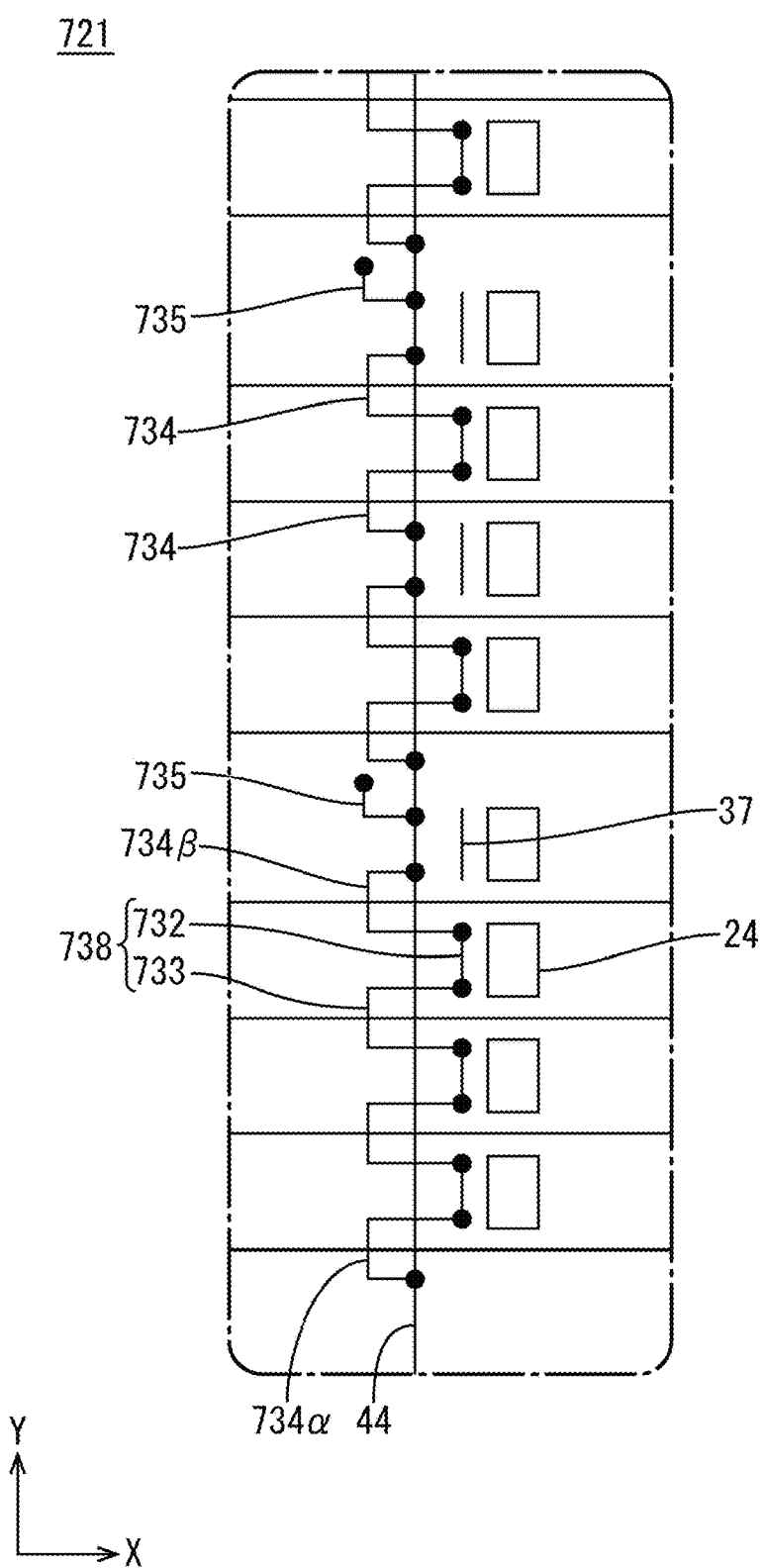
FIG. 32 is a plan view schematically illustrating connection configurations of a common line and sub lines included in an array substrate according to an eighth embodiment.

FIG. 32 is a plan view schematically illustrating a connection pattern of the common line 44 in an array substrate 721. The configuration illustrated in FIG. 32 is similar to that in FIG. 10 except that the common line 44 is illustrated instead of the touch line 31 and the touch electrodes 30 are not illustrated. The configuration is illustrated with being simplified in FIG. 32.

As illustrated in FIG. 32, the array substrate 721 includes the common line 44 that is connected to the common electrode 25 (refer to FIG. 4). In the array substrate 721 according to this embodiment, the common electrode 25 is not divided into sections and no touch line 31 is disposed. Namely, the liquid crystal panel 10 according to this embodiment does not have the touch panel function. Common potential signals are supplied from the signal supply section (such as the driver 11) to the common electrode 25 via the common line 44. The common line 44 is a portion of the second metal film F4 (refer to FIG. 4). The portion of the second metal film F4 configured as the common line 44 is different from the portions of the second metal film F4 configured as the source lines 27. The common line 44 is connected to second connection electrodes 734 and third connection electrodes 735. The common line 44 has first contact portions that are connected to the second connection electrodes 734, respectively, and second contact portions that are connected to the third connection electrodes 735, respectively. The third connection electrodes 735 are connected to the common electrode 25 and the common line 44.

The second connection electrodes 734 are connected to the common line 44 and the sub lines 732. The sub lines 732 are disposed to overlap the common line 44 via the gate insulating film F2 (refer to FIG. 12). A second connection electrode 734α and a second connection electrode 734β are disposed such that the sub lines 732 and the first connection electrodes 733 are disposed between the second connection electrode 734α and the second connection electrode 734β with respect to the Y-axis direction. The sub lines 732 and the first connection electrodes 733 that are disposed between the second connection electrode 734α and the second connection electrode 734β are configured as a first connection line 738. The first connection lines 738 are connected to the common line 44. According to such a configuration, a resistance of the common line 44 is reduced and redundancy is improved. Since a resistance of the common line 44 is reduced, the width of the common line 44 can be reduced. With the width of the common line 44 being reduced, an area having no lines is increased and an area where the pixels PX are disposed in the surface area of the array substrate 721 is increased. This increases an aperture ratio.

Other Embodiments

The technology described herein is not limited to the embodiments described above and illustrated by the drawings. For example, the following embodiments will be included in the technical scope of the present technology.

(1) In the configurations of the first to sixth embodiments, the number of second connection electrodes 34, 134, 334, 434, 534 connected to one touch line 31, 131, 231, 331, 431, 531 may be altered from the number described in the drawings as appropriate. As the number of second connection electrodes 34, 134, 334, 434, 534 connected to one touch line 31, 131, 231, 331, 431, 531 increases, redundancy is preferably improved.

(2) In the configuration of the second embodiment, the number of second connection electrodes 134 connected to one second connection line 39 may be altered from the number described in the drawing as appropriate. As the number of second connection electrodes 134 connected to one second connection line 39 increases, redundancy is preferably improved.

(3) In the configuration of the seventh embodiment, the number of second connection electrodes 634 connected to one source line 627 may be altered from the number described in the drawing as appropriate. As the number of second connection electrodes 634 connected to one source line 627 increases, redundancy is preferably improved.

(4) In the configuration of the eighth embodiment, the number of second connection electrodes 734 connected to one common line 44 may be altered from the number described in the drawing as appropriate. As the number of second connection electrodes 734 connected to one common line 44 increases, redundancy is preferably improved.

(5) In the configurations of the first to sixth embodiments, the first connection electrode 33, 133, 233, 333, 533 or the second connection electrode 34, 134, 334, 434, 534 may be disposed to cross any one of the gate lines 26, 126, 226, 326, 426, 526 that overlap the target touch electrode 30, 130, 330, 430, 530 that is connected to the touch line 31, 131, 231, 331, 431, 531. In such a configuration, the arrangement of the first connection electrodes 33, 133, 233, 333, 533, the second connection electrodes 34, 134, 334, 434, 534, and the third connection electrodes 35, 135 with respect to the section of the touch line 31, 131, 231, 331, 431, 531 disposed on the target touch electrode 30, 130, 330, 430, 530 to be connected may be similar to the arrangement of the first connection electrodes 133, the second connection electrodes 134, and the fourth connection electrodes 40 with respect to the second connection line 39 in the second embodiment (refer to FIG. 21) but may be other arrangement.

(6) In the configurations of the first to sixth embodiments, the second connection electrode 34, 134, 334, 434, 534 may be disposed not to straddle the first slit 25A1, 425A1, 525A1 that defines each of the touch electrodes 30, 130, 330, 430, 530 that are adjacent to each other in the Y-axis direction. Namely, all the second connection electrode 34, 134, 334, 434, 534 may be disposed to cross the gate lines 26, 126, 226, 326, 426, 526 that overlap the touch electrodes 30, 130, 330, 430, 530.

(7) The configurations of the first to fifth embodiments may include the first connection electrode 33, 133, 233, 333 that straddles the first slit 25A1, 425A1 defining each of the touch electrodes 30, 130, 330, 430, 530 being adjacent to each other in the Y-axis direction.

(8) In the configurations of the first to sixth embodiments, the second connection electrodes 34, 134, 334, 434, 534 (the first connection lines) may be connected to some of the touch lines 31, 131, 231, 331, 431, 531 and the rest of the touch lines 31, 131, 231, 331, 431, 531 may not be connected to the second connection electrodes 34, 134, 334, 434, 534. For example, the second connection electrodes 34, 134, 334, 434, 534 may be connected to the touch lines 31, 131, 231, 331, 431, 531 having a large distance from the driver 11, 511 to the respective target touch electrodes 30, 130, 330, 430, 530. The second connection electrodes 34, 134, 334, 434, 534 may not be connected to the touch lines 31, 131, 231, 331, 431, 531 having a small distance from the driver 11, 511 to the respective target touch electrodes 30, 130, 330, 430, 530. Resistances of the touch lines 31, 131, 231, 331, 431, 531 having a large distance from the driver 11, 511 to the respective target touch electrodes 30, 130, 330, 430, 530 tend to be higher than resistances of the touch lines 31, 131, 231, 331, 431, 531 having a small distance from the driver 11, 511 to the respective target touch electrodes 30, 130, 330, 430, 530. With the touch lines 31, 131, 231, 331, 431, 531 having a large distance from the driver 11, 511 to the respective target touch electrodes 30, 130, 330, 430, 530 being connected to the second connection electrodes 34, 134, 334, 434, 534, the resistances of the lines can be reduced effectively.

(9) In the configurations of the first to sixth embodiments, the arrangement interval between the touchlines 31, 131, 231, 331, 431, 531 with respect to the X-axis direction may be altered as appropriate. For example, the touch lines 31, 131, 231, 331, 431, 531 may be arranged to be adjacent to all the source lines 27, 227, respectively, at intervals from the respective source lines 27, 227.

(10) In the configuration of the second embodiment, the arrangement and the number of first connection electrodes 133, the second connection electrodes 134, and the fourth connection electrodes 40 may be altered from those illustrated in the drawing.

(11) In the configuration of the third embodiment, one or two of the second connection line 239 including the wide section 239A (refer to FIG. 25), the second connection line 239 including the narrow section 239B (refer to FIG. 26), and the first connection electrode 233 including the wide section 233B (refer to FIG. 27) may not be provided.

(12) In the configuration of the third embodiment, the touch lines 231 crossing the first gate lines 226α may include wide sections that cross the first gate lines 226α.

(13) In the configuration of the third embodiment, at least one of the second connection electrode 34, the third connection electrode 35, and the fourth connection electrode 40 crossing the first gate line 226α may include a wide section that crosses the first gate lines 226α.

(14) In the configuration of the third embodiment, the two sub lines 232 that are connected to the first connection electrode 233 having the wide section 233B may be connected to the touch line 231.

(15) In the configuration of the third embodiment, the touch line 231 crossing the second gate lines 226β may include a narrow section that crosses the second gate lines 226β.

(16) In the configuration of the third embodiment, at least one of the first connection electrode 233, the second connection electrode 34, the third connection electrode 35, and the fourth connection electrode 40 that cross the second gate line 226β may include a narrow section that crosses the second gate line 226β.

(17) In the configuration of the third embodiment, the source line 227 and the touch line 231 may extend further upward than the curved portion AA2 of the display area AA.

(18) The configuration of each of the third to sixth embodiments may be applied to one of the second connection line 39 of the second embodiment, the source line 627 of the seventh embodiment, and the common line 44 of the eighth embodiment.

(19) In the configuration of the seventh embodiment, the common electrode 25 may not be divided into sections and the touch lines 31 may not be included.

(20) The pixel electrodes 24, 124, 224, 324 may be portions of the first transparent electrode film F6 and the common electrode 25 (the touch electrodes 30, 130, 330, 430, 530) may be portions of the second transparent electrode film F8. In such a configuration, the first connection electrodes 33, 133, 233, 333, 533, 633, 733, the second connection electrodes 34, 134, 334, 434, 534, 634, 734, and the third connection electrodes 35, 135, 735 may be portions of the second transparent electrode film F8 that differ from the portion of the second transparent electrode film F8 configured as the common electrode 25.

(21) The first connection electrodes 33, 133, 233, 333, 533, 633, 733, the second connection electrodes 34, 134,

334, 434, 534, 634, 734, and the third connection electrodes 35, 135, 735 may be portions of the first transparent electrode film F6 that differ from the portion of the first transparent electrode film F6 configured as the common electrode 25.

(22) Two gate lines 26, 126, 226, 326, 426, 526 may be disposed between two pixel electrodes 24, 124, 224, 324 that are adjacent to each other in the Y-axis direction. Accordingly, the number of source lines 27, 227, 627 may be reduced. With such a configuration, the source line 27, 227, 627 may not be disposed in an area between the two pixel electrodes 24, 124, 224, 324 that are adjacent to each other in the X-axis direction. Therefore, the touch line 31, 131, 231, 331, 431, 531 may be disposed in the area between the two pixel electrodes. With such a configuration, each of the first connection electrodes 33, 133, 233, 333, 533, 633, 733, the second connection electrodes 34, 134, 334, 434, 534, 634, 734, the third connection electrodes 35, and the fourth connection electrode 40 may cross the two gate lines 26, 126, 226, 326, 426, 526.

(23) The semiconductor film F3 may be made of polysilicon (LIPS).

(24) The display mode of the liquid crystal panel 10 may be the IPS mode.

(25) The touch panel pattern may use a mutual-capacitance method other than the self-capacitance method.

(26) The plan-view shape of the liquid crystal panel 10 may be a vertically-long rectangular shape, a square shape, a circular shape, a semicircular shape, an oval shape, and a trapezoidal shape.

(27) The liquid crystal panel 10 may be a reflective liquid crystal panel or a semitransmissive liquid crystal panel other than the transmissive liquid crystal panel.

(28) Display panels other than the liquid crystal panel 10 (such as organic electro luminescence display panels and microcapsule-based electrophoretic display (EPD) panels) may be used.

(29) The array substrate 21, 121, 221, 321, 421, 521, 621, 721 may be included in devices (such as X-ray inspection device) other than the display panel.

The invention claimed is:

1. An active matrix substrate comprising:
    first lines extending along a first direction and being arranged at intervals with respect to a second direction that crosses the first direction, the first lines being portions of a first conductive film; and
    a first insulating film included in an upper layer than the first conductive film;
    a second line extending along the second direction and crossing the first lines via the first insulating film, the second line being a portion of a second conductive film included in an upper layer than the first insulating film;
    at least two third lines extending along the second direction and disposed to overlap the second line via the first insulating film and sandwiching one first line of the first lines with respect to the second direction, the at least two third lines being portions of the first conductive film that are different from the portions of the first conductive film configured as the first lines;
    a second insulating film included in an upper layer than the second conductive film;
    a first connection electrode included in an upper layer than the second insulating film, the first connection electrode crossing the one first line via the first insulating film and the second insulating film, the first connection electrode being connected to the at least two third lines that sandwich the one first line; and
    a second connection electrode included in an upper layer than the second insulating film, the second connection electrode crossing another first line of the first lines that is different from the one first line, the second connection electrode being connected to the second line and one of the at least two third lines.

2. The active matrix substrate according to claim 1, further comprising:
    a position detection electrode included in an upper layer than the second insulating film; and
    a position detection line extending along the second direction and connected to the position detection electrode, the position detection line being configured as the second line.

3. The active matrix substrate according to claim 2, wherein
    the first lines include overlapping first lines overlapping the position detection electrode that is connected to the position detection line, the overlapping first lines cross the position detection line via the first insulating film, and
    the active matrix substrate further comprises a third connection electrode included in an upper layer than the second insulating film and overlapping the position detection electrode, the third connection electrode crossing at least one of the overlapping first lines via the first insulating film and the second insulating film, and the third connection electrode being connected to the position detection line and the position detection electrode.

4. The active matrix substrate according to claim 2, further comprising:
    switching components included in a lower layer than the second insulating film;
    pixel electrodes included in an upper layer than the second insulating film and connected to the switching components, respectively; and
    a third insulating film included in an upper layer than the second insulating film, wherein
    the position detection electrode is a portion of a first transparent electrode film,
    the pixel electrodes are portions of a second transparent electrode film and disposed to overlap the position detection electrode via the third insulating film,
    the first connection electrode and the second connection electrode are portions of one of the first transparent electrode film and the second transparent electrode film, the one of the first transparent electrode film and the second transparent electrode film being included in an upper layer than the third insulating film, and
    the portions of the one of the first transparent electrode film and the second transparent electrode film configured as the first connection electrode and the second connection electrode are different from the portion of the first transparent electrode film configured as the position detection electrode or the portions of the second transparent electrode film configured as the pixel electrodes.

5. The active matrix substrate according to claim 4, wherein the first connection electrode and the second connection electrode are portions of the second transparent electrode film that are different from the portions of the second transparent electrode film configured as the pixel electrodes.

6. The active matrix substrate according to claim 2, further comprising:
    switching components;

scanning lines extending along the first direction and connected to the switching components, the scanning lines being configured as the first lines; and a signal line extending along the second direction and connected to the switching components, the signal line being a portion of the second conductive film that is different from the portion of the second conductive film configured as the position detection line, and the signal line being arranged at an interval from the position detection line with respect to the first direction.

7. The active matrix substrate according to claim 2, further comprising a connection line extending along the second direction and overlapping the position detection electrode, the connection line including two end sections that are connected to the position detection electrode.

8. The active matrix substrate according to claim 7, wherein the first lines include a crossing first line that overlaps the position detection electrode that is connected to the connection line, the crossing first line crosses the connection line via the first insulating film, and the active matrix substrate further comprises a fourth connection electrode included in an upper layer than the second insulating film and overlapping the position detection electrode, the fourth connection electrode crossing the crossing first line via the first insulating film and the second insulating film, the fourth connection electrode being connected to the connection line and the position detection electrode.

9. The active matrix substrate according to claim 8, further comprising at least two fourth lines disposed to overlap the connection line via the first insulating film, wherein the crossing first line includes at least two crossing first lines that cross the two end sections of the connection line, respectively, the at least two fourth lines extend along the second direction and overlap the connection line via the first insulating film and sandwiching one crossing first line of the crossing first lines, the at least two fourth lines are portions of the first conductive film that are different from the portions of the first conductive film configured as the first lines, the fourth connection electrode includes at least two fourth connection electrodes that cross the at least two crossing first lines, the active matrix substrate further comprises a fifth connection electrode included in an upper layer than the second insulating film, the fifth connection electrode crossing the one crossing first line via the first insulating film and the second insulating film, the fifth connection electrode being connected to the at least two fourth lines that sandwich the one crossing first line, and a sixth connection electrode included in an upper layer than the second insulating film, the sixth connection electrode crossing another crossing first line of the crossing first lines, the sixth connection electrode being connected to the connection line and one of the at least two fourth lines.

10. The active matrix substrate according to claim 1, further comprising a dummy line that is a portion of the first conductive film that is different from the portions of the first conductive film configured as the first lines, the dummy line extending along the second direction and overlapping the second line via the first insulating film, wherein the dummy line is disposed such that the another first line crossing the second connection electrode is sandwiched between the dummy line and one of the at least two third lines that is connected to the second connection electrode, and the dummy line is not connected to the second connection electrode.

11. The active matrix substrate according to claim 1, wherein the second connection electrode is connected to the second line at a position such that the another first line is sandwiched between the position and one of the at least two third lines that is connected to the second connection electrode with respect to the second direction.

12. The active matrix substrate according to claim 1, further comprising:

switching components including first electrodes, second electrodes, and a third electrodes;

scanning lines extending along the first direction and connected to the first electrodes, the scanning lines being configured as the first lines;

a signal line extending along the second direction and connected to the second electrodes; and pixel electrodes connected to the third electrodes, wherein the signal line is a portion of the second conductive film that is different from the portion of the second conductive film configured as the second line, the first electrodes are portions of the scanning lines, the second electrodes are portions of the signal line and disposed to overlap the first electrodes via the first insulating film, the active matrix substrate includes a surface area including an arrangement area in which the switching components are disposed and a non-arrangement area in which no switching components is disposed, the scanning lines include a first scanning line and a second scanning line, the first scanning line extends in the arrangement area and the non-arrangement area and includes a first non-arrangement section that is disposed in the non-arrangement area, the second scanning line extends in the arrangement area and the non-arrangement area and includes a second non-arrangement section that is disposed in the non-arrangement area and the second non-arrangement section is shorter than the first non-arrangement section, and an area of an overlapping portion of the first scanning line and the second line is greater than an area of an overlapping portion of the second scanning line and the second line.

13. The active matrix substrate according to claim 1, further comprising:

switching components including first electrodes, second electrodes, and a third electrodes;

scanning lines extending along the first direction and connected to the first electrodes, the scanning lines being configured as the first lines;

a signal line extending along the second direction and connected to the second electrodes; and pixel electrodes connected to the third electrodes, wherein the signal line is a portion of the second conductive film that is different from the portion of the second conductive film configured as the second line, the first electrodes are portions of the scanning lines, the second electrodes are portions of the signal line and disposed to overlap the first electrodes via the first insulating film, the active matrix substrate includes a surface area including an arrangement area in which the switching components are disposed and a non-arrangement area in which no switching components is disposed, the scanning lines include a first scanning line and a second scanning line, the first scanning line extends in the arrangement area and the non-arrangement area and includes a first non-arrangement section that is disposed in the non-arrangement area, the second scanning line extends in the arrangement area and the non-arrangement area and includes a second non-arrangement section that is disposed in the non-arrangement area and the second non-arrangement section is shorter than the first non-arrangement section, and an area of an overlapping portion of the first scanning line and another first connection electrode that is connected to another two third lines sandwiching the first scanning line is greater than an area of an overlapping portion of the second scanning line and the first connection electrode that is connected to the at least two third lines sandwiching the second scanning line.

14. A display device comprising:
the active matrix substrate according to claim 1; and
an opposed substrate opposed to the active matrix substrate.

15. The active matrix substrate according to claim 9, wherein
the sixth connection electrode includes at least two sixth connection electrodes that are disposed between the at least two fourth connection electrodes with respect to the second direction, and
the fifth connection electrode includes at least two fifth connection electrodes that are disposed between the at least two sixth connection electrodes with respect to the second direction.

* * * * *